United States Patent
Derezhenets et al.

(10) Patent No.: US 12,444,411 B1
(45) Date of Patent: *Oct. 14, 2025

(54) MULTIPLE RESULTS PRESENTATION

(71) Applicant: Amazon Technologies, Inc., Seattle, WA (US)

(72) Inventors: Denys Derezhenets, Etobicoke (CA); Igor Adirin, Coquitlam (CA); Gaurav Mehrotra, Markham (CA)

(73) Assignee: Amazon Technologies, Inc., Seattle, WA (US)

( * ) Notice: Subject to any disclaimer, the term of this patent is extended or adjusted under 35 U.S.C. 154(b) by 230 days.

This patent is subject to a terminal disclaimer.

(21) Appl. No.: 18/461,634

(22) Filed: Sep. 6, 2023

(51) Int. Cl.
G10L 15/18 (2013.01)
G10L 13/02 (2013.01)
G10L 15/22 (2006.01)

(52) U.S. Cl.
CPC .......... *G10L 15/1822* (2013.01); *G10L 13/02* (2013.01); *G10L 15/22* (2013.01); *G10L 2015/223* (2013.01)

(58) Field of Classification Search
CPC ..... G10L 15/1822; G10L 13/02; G10L 15/22; G10L 2015/223
See application file for complete search history.

(56) References Cited

U.S. PATENT DOCUMENTS

| | | | |
|---|---|---|---|
| 11,516,434 B1 * | 11/2022 | Agrawal | H04M 3/567 |
| 12,307,163 B1 * | 5/2025 | Konda | G06F 3/167 |
| 2015/0381702 A1 * | 12/2015 | Heeter | G06F 3/04842 715/716 |
| 2021/0334067 A1 * | 10/2021 | Thakkar | G06F 3/167 |
| 2025/0109950 A1 * | 4/2025 | Allen | G06V 20/58 |

\* cited by examiner

*Primary Examiner* — Abul K Azad
(74) *Attorney, Agent, or Firm* — Pierce Atwood LLP

(57) ABSTRACT

In some embodiments, a natural language understanding (NLU) hypothesis may be determined for a natural language input to a device and a first component may be used to obtain first visual content corresponding to a first skill associated with the first NLU hypothesis. A second component may also be used to obtain second visual content corresponding to a second skill. The device may be caused to output a first graphical user interface (GUI) element including the first visual content and a second GUI element including the second visual content. In response to a subsequent input to the device corresponding to the second GUI element, the device may be caused to output content corresponding to the second skill.

20 Claims, 21 Drawing Sheets

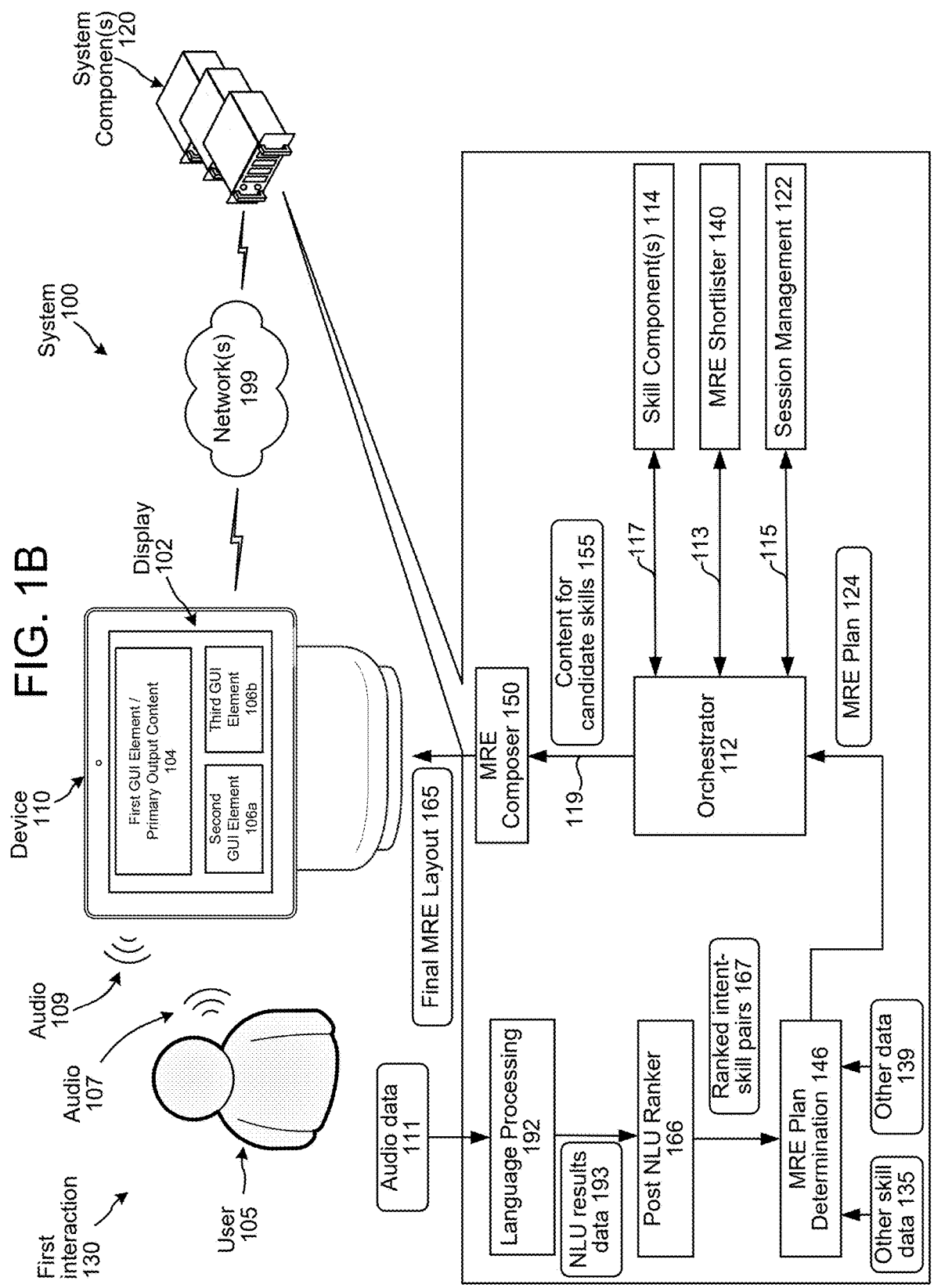

FIG. 1D (A) 160

| User ID | Session ID | Skill ID | Permitted Resources | Utilized Resources |
|---|---|---|---|---|
| UID1 | SID1 | SK1 | AC1, AD1, EW1, WW1, SO1 | AC1, AD1, EW1 |
| UID1 | SID2 | SK2 | EW2 | EW2 |
| UID1 | SID3 | SK3 | EW3 | EW3 |
| UID1 | SID4 | SK4 | WW1 | WW1 |

161, 162, 163, 164

(B) 160

| User ID | Session ID | Skill ID | Available Resources | Utilized Resources |
|---|---|---|---|---|
| UID1 | SID2 | SK2 | AC1, AD1, EW1, SO1 | AC1, AD1, EW1 |
| UID1 | SID4 | SK4 | WW1 | WW1 |
| UID1 | SID5 | SK5 | EW2 | EW2 |
| UID1 | SID6 | SK6 | EW3 | EW3 |

162, 164, 168, 169

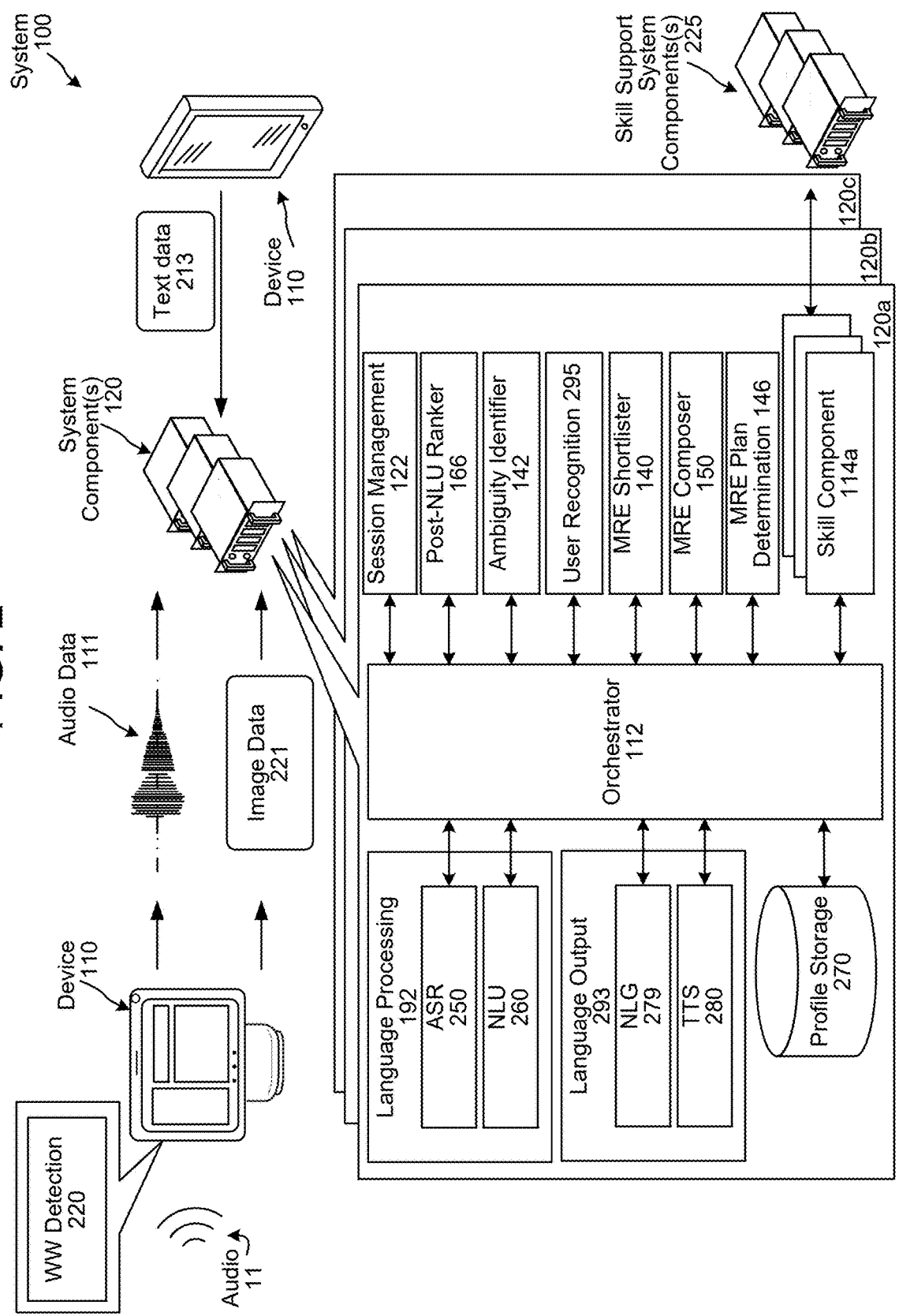

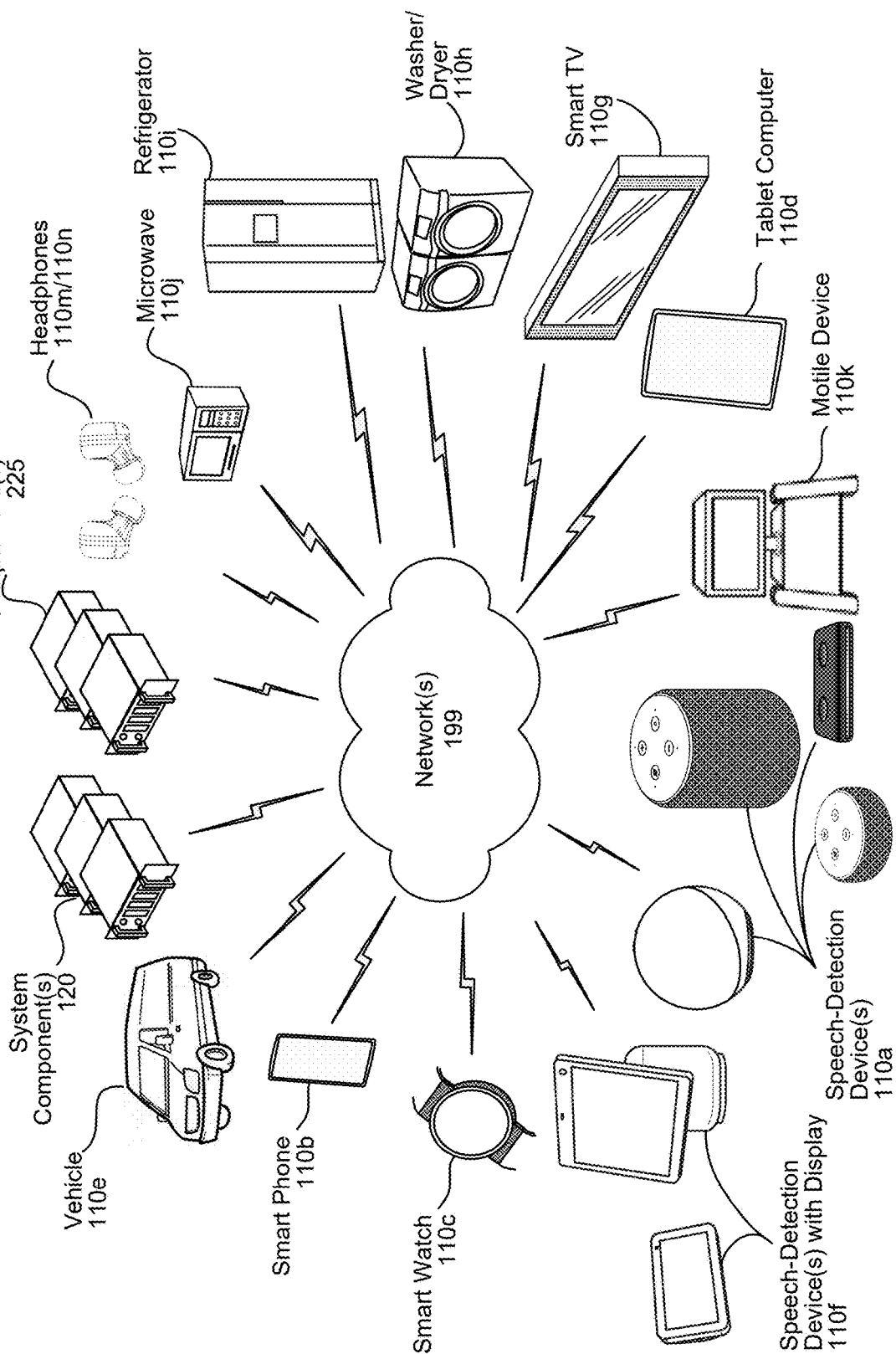

MULTIPLE RESULTS PRESENTATION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B is a conceptual diagram illustrating a first example implementation of virtual assistant system for providing visual outputs corresponding to selectable actions, according to some embodiments of the present disclosure.

FIG. 1D shows an example table that may be used by the session management component shown in FIGS. 1A-1C, 2 and 3, according to some embodiments of the present disclosure.

FIG. 2 is a conceptual diagram of example components of the system(s) shown in FIGS. 1A-1C, according to some embodiments of the present disclosure.

FIG. 14 illustrates an example of a computer network for use with the overall system, according to embodiments of the present disclosure.

DETAILED DESCRIPTION

Figure 1A:
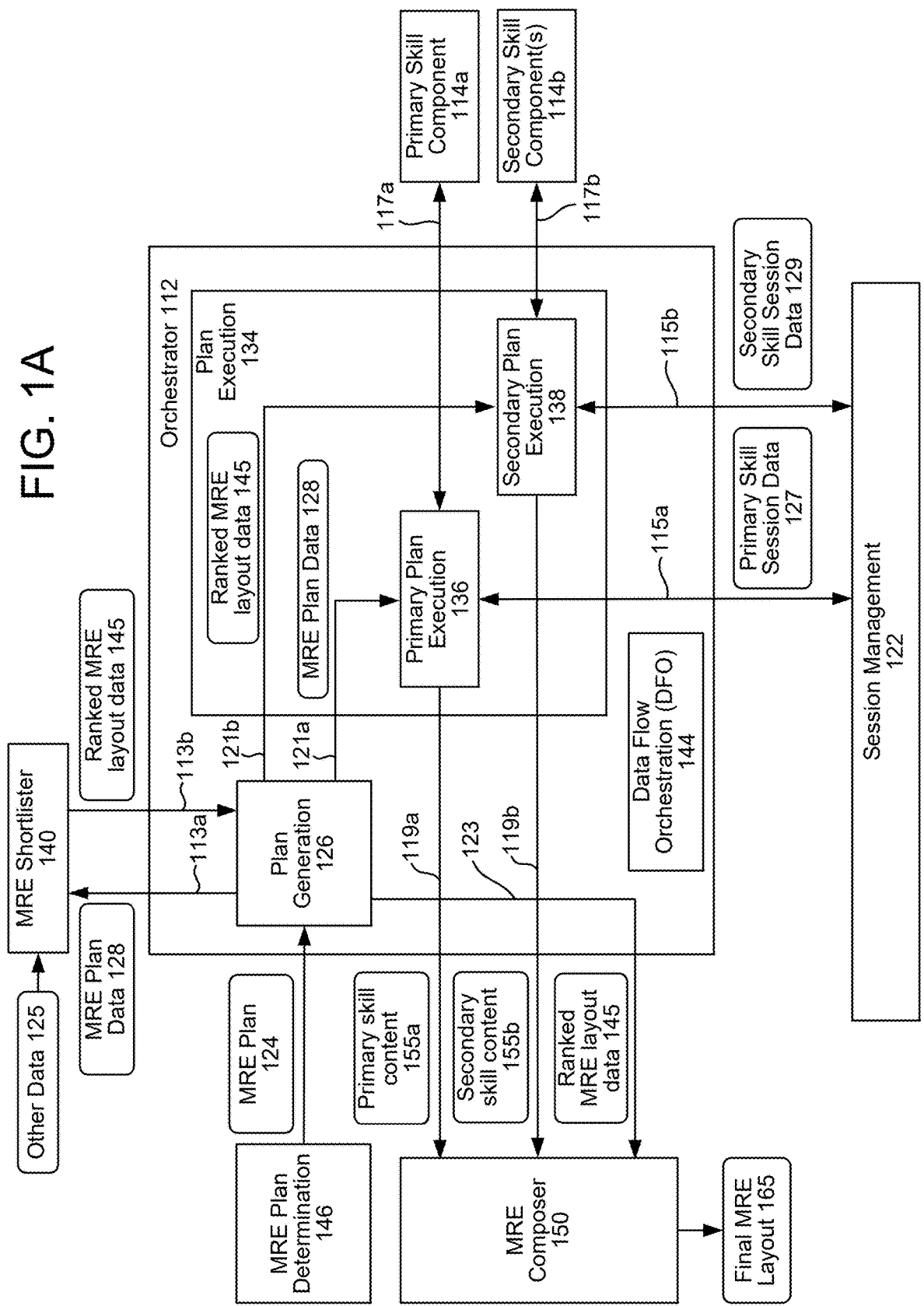
FIG. 1A is a conceptual diagram illustrating example components of the orchestrator shown in FIGS. 1B and 1C, as well as the manner in which such components can interact with other components of the system, according to some embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Virtual assistant systems can be configured to respond to spoken commands. For example, in response to an utterance by a user, a virtual assistant system may perform ASR and NLU processing on audio data corresponding to the utterance to ascertain an intent of the user, may determine data responsive to the intent (for example, by invoking a skill or other type of application), and may perform NLG and TTS processing to generate an audible response to the utterance. When the determined intent relates to the taking of an action (e.g., viewing of video from a Ring camera), the virtual assistant system may further generate instructions to cause one or more components (e.g., a camera at the user's front door and/or a display device that can present images from the camera) to take the action. As a more detailed example, the user may utter "Alexa, show me my front door," and, in response, the system may begin streaming video from a Ring camera located at the user's front door to the user's device (e.g., an Echo Show, tablet, television, in-car display, phone, etc.) and also cause the user's device to output the audio response "Showing video from front door."

Occasions may arise in which the virtual assistant system is unable to definitively ascertain (e.g., predict with sufficient confidence) an interpretation of an utterance. For instance, in response to the utterance "Show me the echo show," the system may be uncertain as to whether the user (1) wishes to view a television show with "Echo" in the title, (2) wishes to view Echo Show products available for purchase, or (3) wishes to view the camera feed of the user's Echo Show by "dropping in" (e.g., establish a pre-authorized communication session). In certain circumstances, the virtual assistant may (A) select the NLU result having the highest confidence score, and thus potentially get it wrong if the selected NLU result did not correspond to the user's actual intent, or (B) request clarification as to the user's intent before selecting an action to perform.

Further, occasions may also arise in which the virtual assistant system may identify one or more skills, experiences, or groups of additional information that may be of interest to a user. Such identification may occur independent of processing of a received user request and/or may occur in relation to a received user request. For instance, the system may determine that a user may be interested in (A) one or more skills/intents corresponding to lower-ranking NLU results, (B) one or more skills that do not correspond to lower-ranking NLU result but that have been determined to be of potential interest to the user (for example, based on past interactions, other user profile data, etc.), (C) one or more skills corresponding to predicted next actions of the user (for example, a user typically following one query with another), and/or (D) information and/or skill(s) corresponding to available advertising content, etc.

Some virtual assistant systems are configured to create only a single session in response to a particular user input (e.g., a single session corresponding to a top-ranking NLU result for a verbal input), with that single session identifying only a single skill component that is to be invoked to provide a response to the user input. Such systems may thus employ only a single component to interact with the identified skill to obtain output content responsive to the user input.

Offered is are technical solutions that may include one or more components configured to allow the creation of multiple different sessions in response to a single user input, with individual sessions identifying different applications that may be invoked to generate output content responsive to the user input, and/or to enable simultaneous interaction with multiple different applications to obtain such output content. As explained with respect to examples below, the provision of such component(s) may allow the virtual assistant system to leverage a display of a user device to facilitate user selection of one or more actions that can potentially be taken in response to a user input. The combined audio and visual experience provided by the disclosed system is referred to herein as a multiple results experience (MRE), which is enabled by various components and techniques described herein.

Figure 1C:
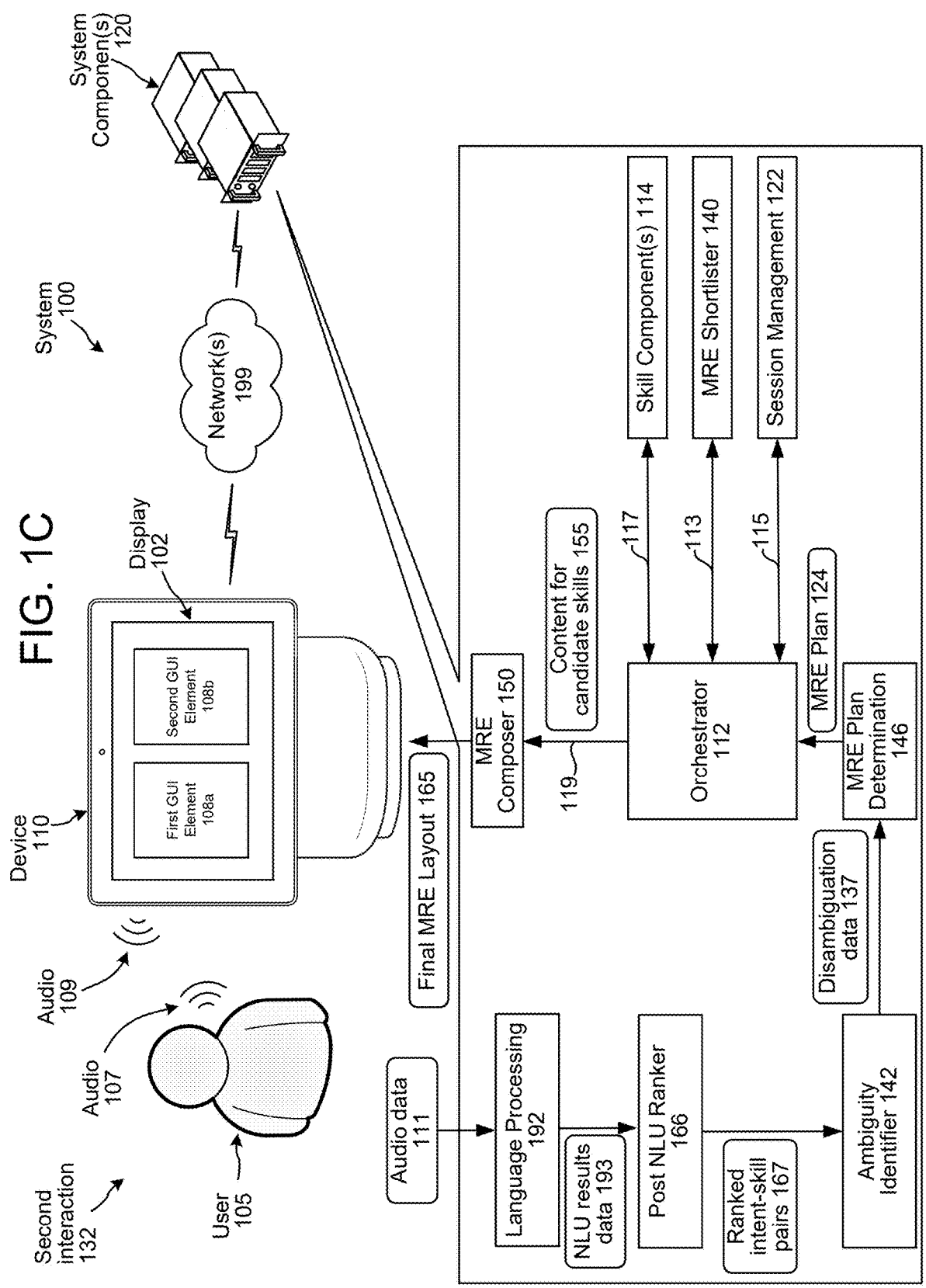
FIG. 1C is a conceptual diagram illustrating a second example implementation of virtual assistant system for providing visual outputs corresponding to selectable actions, according to some embodiments of the present disclosure.

FIGS. 1A-1C show an example virtual assistant system 100 (sometimes referred to herein as simply "the system") that is configured to enable an MRE interaction with a user 105. FIG. 1A illustrates details of an example implementation of an orchestrator component 112 that is shown in FIGS. 1B and 1C, as well as the manner in which the orchestrator component 112 interacts with various other components of the system 100. The virtual assistant system 100 can offer different visual outputs for the purpose of providing an MRE interaction depending on the circumstances of the user's interaction with the system 100. Two such examples are shown in FIGS. 1B and 1C, with FIG. 1B illustrating a first interaction 130 which results in a first arrangement of GUI elements 104, 106 on a display 102 of a voice-enabled device 110 and FIG. 1C illustrating a second interaction 132 which results in a second arrangement of GUI elements 108 on the display 102. Such interactions may involve the same or different devices and the same or different users depending on the circumstances. For example, one device may capture audio of an utterance while another device may present the GUI elements while still another device may output audio responsive to the utterance, depending on system configuration and arrangement of device(s) proximate to the user 105.

As shown in FIGS. 1B and 1C, in addition to one or more voice-enabled devices 110 local to respective users 5, the system 100 may include one or more virtual assistant/natural language command processing system components 120 and one or more skill support system components 225 (shown in FIG. 2) connected across one or more networks 199.

As illustrated in FIG. 1B, to enable the first interaction 130 with the user 105, the system component(s) 120 may, in some implementations, include one or more language processing components 192, a post-NLU ranker component 166, an MRE plan determination component 146, one or more skill components 114, an MRE shortlister component 140, a session management component 122, an MRE composer component 150, as well as the orchestrator component 112 which is configured to interact with each of the foregoing components (e.g., as indicated by arrows 113, 115, 117, and 119 in FIG. 1B). As illustrated in FIG. 1C, to enable the second interaction 132 with the user 105, in addition to the components shown in FIG. 1B, the system component(s) 120 may also include an ambiguity identifier component 142.

FIG. 1A illustrates example components of the orchestrator component 112, as well as the manner in which such components may interact with the MRE plan determination component 146, the session management component 122, the MRE shortlister component 140, the skill component(s) 114, and the MRE composer component 150 to enable the first interaction 130 and the second interaction 132.

Example configurations of the system component(s) 120, including the language processing component(s) 192, the post-NLU ranker component 166, the ambiguity identifier component 142, the MRE plan determination component 146, the session management component 122, MRE shortlister component 140, and the MRE composer component 150, and the manner in which such components may be operated to enable an MRE interaction with the user 105, are described in detail below. Although the figures and discussion of the present disclosure illustrate certain steps in a particular order, the steps described may be performed in a different order (as well as certain steps and/or components removed or added) without departing from the present disclosure.

In the example scenario shown in FIG. 1B, as part of the first interaction 130, in response to audio 107 corresponding to an utterance by the user 105, the display 102 of the device 110 may present one or more graphical user interface (GUI) elements 104, 106a, and 106b. A first GUI element 104 may represent a primary output (as represented by its larger size) while a second GUI elements 106a and a third GUI element 106b may represent secondary output, as explained below.

In some implementations, the display 102 may present primary output content as part of the first GUI element 104 in addition to other, secondary, output content as part of the second GUI element 106a and the third GUI element 106b. This example may correspond, for instance, to a scenario in which the system component(s) 120 have determined to take a particular action in response to the audio 107, including outputting the primary output content, for a top-scoring NLU result, but have also determined to present the user 105 with options for instructing the system 100 to take one or more other actions. Such other actions may include, for example, taking an action corresponding to a lower-ranking NLU result, taking a predicted next action identified by the system 100, presenting content of an advertisement or other information of potential interest to the user 105 (e.g., a movie trailer). Accordingly, in such a scenario, the GUI element 104 may correspond to an action that the system 100 has actually taken in response to the received audio 107, whereas the GUI elements 106a and 106b may correspond to actions that the system 100 can potentially take in response to a further user input (e.g., by selecting one of the GUI elements 106a, 106b via a touchscreen).

As one example of the scenario shown in FIG. 1B, the system component(s) 120 may determine that the audio 107 represents a request to play a particular song and, in response, may instruct one or more skill support system components 225 (e.g., a music streaming service) to send audio data for the song to the device 110, thus causing the device 110 to output audio (e.g., as one portion of audio 109) corresponding to the song. The system component(s) 120 may also determine synthesized speech acknowledging the command (such as "playing your song"), the output audio of which may also be included in audio 109. The system component(s) 120 may additionally instruct the device 110 to present (e.g., as part of the GUI element 104 on the display 102) an image of an album cover for an album in which the song is included as well as cause the device 110 to output the synthesized audio response (e.g., as another portion of the audio 109) to the user's utterance (e.g., "Playing Song A"). In such a scenario, the first GUI element 106a may correspond, for example, to a lower ranked NLU result identified by the system component(s) 120 (e.g., playing a game having the same name as the song, playing the same song by a different artist, etc.), and the second GUI element 106b may correspond, for example, to an action the system 100 has predicted the user 105 may wish to take after listening to the song (e.g., learning more about the artist, hearing additional music by the artist, buying an album by the artist, etc.). Advantageously, the visual presentation of the GUI elements 106a, 106b may facilitate the selection of one or more actions other than that corresponding to a top ranked NLU result for an utterance by the user 105 without interrupting the user's ongoing experience with an audible request for potential clarification.

As another example of the scenario shown in FIG. 1B, the system component(s) 120 may determine that the top-ranking NLU result for the audio 107 represents a request to view video from a Ring camera in the user's living room. The system component(s) 120 may thus instruct one or more skill support system components 225 to begin sending video data from the user's Ring camera to the device 110, e.g., as the primary output content of the GUI element 104, and may also cause the device 110 to output an audio response (e.g., as a portion of the audio 109) to the user's utterance (e.g., "Showing video from your living room camera"). In addition, the system component(s) 120 may also cause the device 110 to present one or more options (e.g., as GUI elements 106) to select a lower ranking NLU result (e.g., "Shop for ring cameras") or otherwise invoke or explore other skills that might be of interest to the user 105 and potentially related to the original command (e.g., "Call police"). Once again, the visual presentation of the GUI elements 106a, 106b may facilitate the selection of one or more actions other than that corresponding to a top ranked NLU result for an utterance by the user 105 without interrupting the user's ongoing experience with an audible request for potential clarification.

In the example scenario shown in FIG. 1C, as part of the second interaction 132, in response to audio 107 corresponding to an utterance by the user 105, the display 102 of the device 110 may present multiple GUI elements 108a, 108b corresponding to different actions that the system 100 can potentially take in response to the received audio 107. As shown, the GUI elements 108a and 108b may be of similar size and may represent different content, as explained below. This example scenario may correspond, for instance, to a circumstance in which the system component(s) 120 have determined that NLU results corresponding to the audio 107 are sufficiently ambiguous to warrant intervention by the user 105 to resolve the ambiguity. Unlike the scenario shown in FIG. 1B, due to a determined ambiguity (described below), the system component(s) 120 may not automatically take an action corresponding to a determined intent of the user 105 and thus may not cause the device 110 to output primary content corresponding to a particular intent. Instead, for the second interaction 132, the system component(s) 120 may cause the device 110 to present the user 105 with two or more GUI elements 108 to enable the user to resolve the determined ambiguity.

In some implementations, the GUI elements 106, 108 may include visual information (e.g., images or other visual content) relating to different possible actions that can be taken by the system 100 to make it easier for the user 105 to determine an appropriate action to select. For instance, if one of the selectable actions is to output audio corresponding to an album by a particular musical artist, a GUI element 106, 108 for that action may include an image of an album cover for the album. (Primary GUI element 104 may also include one or more images.)

In some implementations, the GUI elements 106, 108 may be selectable (e.g., via a touch screen interface, spoken command, or the like) to cause the system 100 to take one or more corresponding actions, e.g., via one or more skill support system components 225. Further, in some implementations, the system component(s) 120 may additionally or alternatively cause the device 110 to output a request for user input corresponding to the GUI elements 106, 108. The device 110 may present such a request via an audible output (such as a beep or synthesized speech), via a touchscreen interface, or via some other mechanism. The display of visual content corresponding to the respective actions that can potentially be taken may assist the user in understanding the available actions and responding appropriately, even when such response is made verbally. (Primary GUI element 104 may also be selectable to perform an action, such as pause content output, provide additional information such as lyrics, or the like.)

In some implementations, the system 100 may determine information about interactions with the GUI elements 106, 108 that are presented to a user 105 as well as the instances in which the user 105 selects one or more of the GUI elements 106, 108 that are so presented. The system 100 may use the data accumulated regarding the GUI elements to improve the ability of the system 100 to accurately ascertain the intent of the user 105, such as by retraining or enhancing one or more machine learning (ML) models that are used for NLU processing, selection of potential content to display, etc.

Example operations of the system component(s) 120, including the language processing component(s) 192, the post-NLU ranker component 166, the ambiguity identifier component 142, the MRE plan determination component 146, the orchestrator component 112, the skill component(s) 114, the MRE shortlister component 140, the session management component 122, and the MRE composer component 150, for the purpose of enabling an MRE interaction with the user 105 will now be described.

As shown in FIGS. 1B and 1C, the device 110 may receive audio 107 corresponding to a spoken natural language input originating from the user 105. The device 110 may, for example, process audio following detection of a wakeword. The device 110 may generate audio data 111 corresponding to the audio 107, and may send the audio data 111 to the system component(s) 120. As shown, the system component(s) 120 may include one or more language processing components 192 configured to process the audio data 111 to generate NLU results data 193, as well as a post-NLU ranker component 166 configured to process the NLU results data 193 to generate ranked intent-skill pairs 167.

As shown in FIG. 1B, to enable the provision of the first interaction 130, the ranked intent-skill pairs 167 may be provided to the MRE plan determination component 146. The MRE plan determination component 146 may process the ranked intent-skill pairs 167, and possibly other data (as described below), to determine an MRE plan 124 for the first interaction 130.

Figure 8:
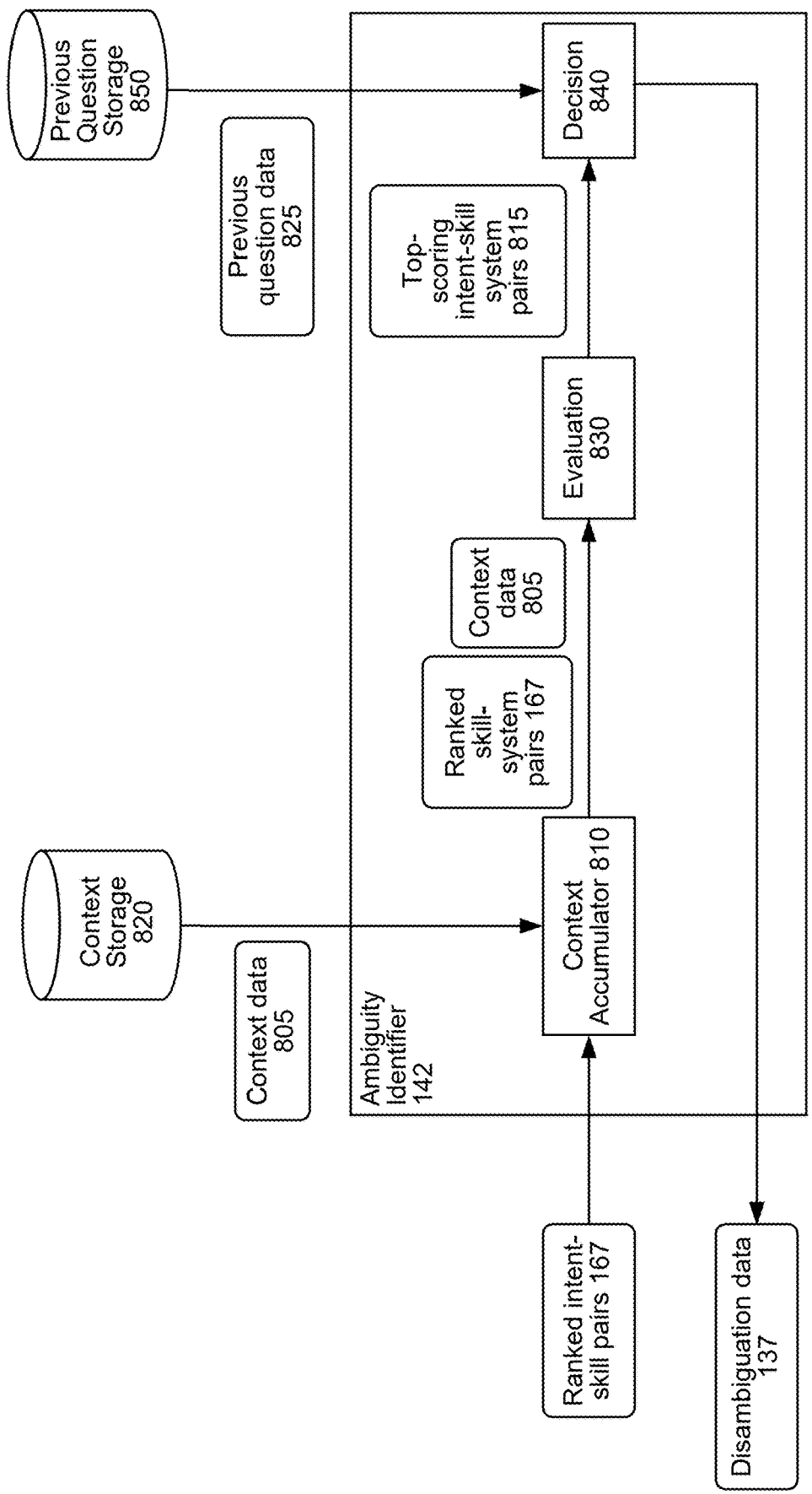
FIG. 8 is a conceptual diagram illustrating how the ambiguity identifier component shown in FIGS. 1C, 2 and 3 may operate according to some embodiments of the present disclosure.

As shown in FIG. 1C, to enable the provision of the second interaction 132, the ranked intent-skill pairs 167 may additionally or alternatively be provided to the ambiguity identifier component 142. As described in detail below in connection with FIG. 8, the ambiguity identifier component 142 may process the ranked intent-skill pairs 167, together with other data (e.g., context data 805 and/or previous question data 825, as shown in FIG. 8, or other data) to determine whether a certain level of ambiguity exists between two or more top ranked NLU results. When the ambiguity identifier component 142 determines that more than a threshold level of ambiguity exists between two or more top ranked NLU results, the ambiguity identifier component 142 may output disambiguation data 137 representing two or more NLU results (and corresponding skills) that are in need of disambiguation. The threshold level of ambiguity may be determined in a variety of ways, as described below. In one example, if the scores associated with certain NLU hypotheses are within a certain range of each other, the threshold level of ambiguity may be met. As shown in FIG. 1C, such disambiguation data 137 may be provided to the MRE plan determination component 146 to enable the MRE plan determination component 146 to determine an MRE plan 124 for the second interaction 132, as described below in connection with FIG. 9.

In either circumstance, the MRE plan 124 that is produced by the MRE plan determination component 146 may include MRE plan data 128 (shown in FIG. 1A) that identifies a set of skills that can potentially be invoked in response to the user input. For the first interaction 130, the MRE plan data 128 may identify a primary skill (e.g., corresponding to a highest-ranking NLU hypothesis) that is to be invoked as a part of the multimodal (e.g., audio and visual) experience being provided to the user 105, as well as one or more secondary skills that can potentially be made selectable by the user 105 (e.g., by causing the device 110 to present one or more secondary GUI elements 106). For the second interaction 132, the MRE plan data 128 may not identify a primary skill and may instead identify only two or more secondary skills that can potentially be made selectable by the user 105 (e.g., by causing the device 110 to present one or more secondary GUI elements 108).

As shown in FIG. 1B, in some implementations, to facilitate the provision of the first interaction 130, the MRE plan determination component 146 may also receive other skill data 135 representing other actions/skills that can potentially be taken by the system 100. For instance, in some implementations, the other skills data 135 may represent (A) one or more skills that do not correspond to lower-ranking NLU result but that have been determined to be of potential interest to the user (for example, based on past interactions, other user profile data, etc.), (B) one or more skills corresponding to predicted next actions of the user, (C) information and/or skill(s) corresponding to available advertising content, etc. As indicated, the MRE plan determination component 146 may process the ranked intent-skill pairs 167 and the other skills data 135 (representing other available actions/skills), together with other data 139 (e.g., as described in connection with FIG. 9), to determine the MRE plan 124.

Example operations that may be performed by the language processing component(s) 192, the post-NLU ranker component 166, the ambiguity identifier component 142, and the MRE plan determination component 146 to generate the MRE plan 124 are further described below in connection with FIGS. 2-9.

The device 110 may send the audio data 111 to the system component(s) 120 via an application that is installed on the device 110 and associated with the system component(s) 120. An example of such an application is the Amazon Alexa application that may be installed on a smart phone, tablet, or the like. In some implementations, the device 110 may additionally or alternatively receive text data 213 (see FIG. 2) corresponding to natural language inputs originating from the user 105, and send the text data 213 to the system component(s) 120. The device 110 may also receive output data from the system component(s) 120, and generate a synthesized speech output. The device 110 may include a camera for capturing image and/or video data for processing by the system component(s) 120. Examples of various devices 110 are further illustrated in FIG. 14. The system component(s) 120 may be remote system such as a group of computing components located geographically remote from the device 110 but accessible via the network 199 (for example, servers accessible via the internet). The system component(s) 120 may also include a remote system that is physically separate from the device 110 but located geographically close to the device 110 and accessible via the network 199 (for example, a home server located in a same residence as the device 110). The system component(s) 120 may also include some combination of the foregoing, for example, where certain components/operations are performed via a home server(s) and others are performed via a geographically remote server(s).

To facilitate either of the first interaction 130 or the second interaction 132, the MRE plan determination component 146 may send the MRE plan 124 to the orchestrator component 112 for processing. In particular, as shown in FIG. 1A, in some implementations, the MRE plan determination component 146 may send the MRE plan 124 to a plan generation component 126 of the orchestrator component 112. As illustrated, in some implementations, the orchestrator component 112 may include a data flow orchestration (DFO) component 144 that is configured to facilitate the transport of messages amongst components of the system 100. In some implementations, for example, the DFO component 144 may construct a directed acyclic dependency graph of components and transfer messages between them, thus effectively operating as an in-memory message bus. The DFO component 144 may thus enable the passing of messages amongst the components of the system 100 by way of a publisher-subscriber model.

Although not illustrated in FIG. 1A, in response to receipt of a natural language input (e.g., audio data 111 representing an utterance of the user 5), the plan generation component 126 of the orchestrator component 112 may collect information about the state of the device 110, session information corresponding to the device 110 (e.g., information obtained from the session management component 122 that identifies currently active sessions involving the device 110 and/or one or more skill components 114), multi-device contextual information, etc., and provide that information to the language processing component(s) 192, the post-NLU ranker component 166, and/or the MRE plan determination component 146 to enable the MRE plan determination component 146 to generate the MRE plan 124 for the received natural language input. After the MRE plan determination component 146 has formulated the MRE plan 124, the plan generation component 126 may receive the MRE plan 124 from the MRE plan determination component 146 (e.g., via the message bus established by the DFO component 144).

As depicted in FIG. 1A, in some implementations, the orchestrator component 112 may additionally include a plan execution component 134 that includes both a primary plan execution component 136 and one or more secondary plan execution components 138. In some implementations, the primary plan execution component 136 and the secondary plan execution component(s) 138 may correspond to different software modules of the orchestrator component 112 that are executed in response to receipt of respective inputs, e.g., MRE plan data 128 that identifies a primary skill (see arrow 121a) or the ranked MRE layout data 145 (see arrow 121b), from the plan generation component 126. In some implementations, the secondary plan execution component(s) 138 may perform a subset of the operations that are performed by the primary plan execution component 136 and may exclude certain operations that are not needed to complete tasks and/or acquire data for secondary skills. For instance, because responsive audio output may not be produced for secondary skills (as such skills may produce only visual output by way of the secondary GUIs 106, 108), in some implementations, operations for generating or acquiring audio data corresponding to secondary skills may be omitted from the operations that are performed by the secondary plan execution component(s) 138.

Still referring to FIG. 1A, the plan generation component 126 may send the MRE plan data 128 to both the plan execution component 134 (see arrow 121a) and the MRE shortlister component 140 (see arrow 113a). When the primary plan execution component 136 receives the MRE plan data 128 from the plan generation component 126 and the MRE plan data 128 identifies a primary skill, the primary plan execution component 136 may immediately begin taking steps to invoke the primary skill identified in the MRE plan data 128. Examples of such steps are described in more detail further below. Invoking the primary skill immediately, e.g., without awaiting receipt of the ranked MRE layout data 145 from the MRE shortlister component 140, as described below, may help reduce delays in providing a primary response to the user 5 following detection of an utterance soliciting such a response, thus improving the experience of the user 5.

Meanwhile, as described in more detail below in connection with FIG. 10, the MRE shortlister component 140 may process the MRE plan data 128 received from the plan generation component 126 (e.g., per the arrow 113a), together with other data 125 (e.g., the profile data 1025, context data 1035, and MRE layout templates 1045 shown in FIG. 10), to determine ranked MRE layout data 145. The plan generation component 126 may receive the ranked MRE layout data 145 from the MRE shortlister component 140 (see arrow 113b) and pass the ranked MRE layout data 145 to the plan execution component 134 (see arrow 121b). When the secondary plan execution component(s) 138 receive the ranked MRE layout data 145 from the plan generation component 126, the secondary plan execution component(s) 138 may begin taking steps to invoke the secondary skill(s), possibly in a limited fashion (as noted previously), identified in the ranked MRE layout data 145. As the MRE plan data 128 may already identify the secondary skill(s) that are to be invoked, in some implementations, the ranked MRE layout data 145 may simply include references to the corresponding secondary skill data that is included in the MRE plan data 128, as well as identifiers of display windows (e.g., secondary GUI elements 106, 108) in which the MRE shortlister component 140 has determined visual content for the secondary skill(s) is to be presented. Accordingly, although not shown in FIG. 1A, in such implementations, the plan generation component 126 may additionally provide at least some of the MRE plan data 128 to the secondary plan execution component(s) 138 for such purposes.

The session management component 122 may be responsible for managing the lifecycles of sessions that interact with skill components 114. An example table 160 that may be populated with data concerning active sessions is shown in FIG. 1D. Although FIG. 1D shows active session data for only a single user (e.g., the user associated with the user identifier (ID) "UID1"), it should be appreciated the table 160 may actually contain session data for a very large number of distinct user. Each row in the table 160 may represent data for a respective active session that is associated with the user associated with the user ID "UID1." As indicated, each such session may be associated with a unique session ID (e.g., session ID "SID1") and the table 160 may include an skill ID (e.g., skill ID "SK1") that identifies the skill for which the session has been created. Two states (i.e., states (A) and (B)) are illustrated). As explained in more detail below, version (A) of the table 160 may correspond to a state of the table 160 following the first interaction 130 (shown in FIG. 1B), where content for a primary skill (e.g., skill SK1) is output by the device 110 (including the provision of visual content for the skill within a primary GUI element 104) and visual content for two secondary skills (e.g., skills SK2 and SK3) is included within respective secondary GUI elements 106a, 106b. Version (B) of the table 160, on the other hand, may correspond to a state of the table 160 after the user 105 has provided a subsequent input selecting one of the secondary skills (e.g., SK2) represented in the state (A) (e.g., by selecting a GUI element 106 or providing an utterance or other natural language input corresponding to one of the secondary skills).

When the MRE plan data 128 received by the primary plan execution component 136 identifies a primary skill, the primary plan execution component 136 may call the session management component 122 to request creation of a session for the skill that is to be invoked. As illustrated in FIG. 1A, in some implementations, the primary plan execution component 136 may send primary skill session data 127 to the session management component 122 to create a session for the primary skill, e.g., by writing a new row of data to the table 160. The primary skill session data 127 may correspond, for example, to the data that is written to a row 161 within the version (A) of the table 160 shown in FIG. 1D.

As shown in FIG. 1D, in addition to the user ID "UID1" (identifying an account of the user 5) and the session ID "SID1" uniquely identifying a session for the primary skill, the row 161 includes an identifier of the primary skill (e.g., "SK1"), identifiers of "permitted resources" (corresponding to resources the primary skill is permitted to use), and identifiers of "utilized resources" (corresponding to the resources the primary skill is actually using). In the illustrated example, the permitted resources for the primary skill "SK1" include (A) an "audio content" resource "AC1" (e.g., a speaker of the device 110 or an associated device that can be used to output music or other audio content for the skill "SK1"), (B) an "audio dialog" resource "AD1" (e.g., one or more components enabling an audio dialog with the user 5 via the device 110), (C) an "emitted window" resource "EW1" (e.g., corresponding to a window of the device 110 for the primary GUI element 104), (D) a "widget window" resource "WW1" (e.g., corresponding to a window of the device 110 dedicated to the presentation of data for various widgets (e.g., a timer countdown), and (E) a "screen overlay" resource "SO1" (e.g., corresponding to an overlay that can be presented on the screen of the device 110). Row 161 of version (A) of the table 160 further indicates that the primary skill "SK1" is currently using (1) the audio content resource "AD1" (e.g., by causing the device 110 to output music), (2) the audio dialog resource "AD1" (e.g., by outputting audio dialog describing the music that is being output), and (3) the emitted window resource "EW1" (e.g., by displaying an album cover for the artist for which music is being output).

When the secondary plan execution component(s) 138 receive the ranked MRE layout data 145 from the plan generation component 126, the secondary plan execution component(s) 138 may call the session management component 122 to request creation of session(s) for the secondary skill(s) that are identified in the ranked MRE layout data 145. As illustrated in FIG. 1A, in some implementations, the secondary plan execution component(s) 138 may send secondary skill session data 129 to the session management component 122 to create respective sessions for the secondary skill(s), e.g., by writing new row(s) of data to the table 160. The second skill session data 129 may correspond, for example, to the data that is written to rows 162 and 163 within the version (A) of the table 160 shown in FIG. 1D. In some implementations, the secondary skill session data 129 for all of the identified secondary skills may be stored (either locally at the orchestrator component 112 or by the session management component 122) in parallel, e.g., as part of a batch request. In other implementations, separate requests may be made to store secondary skill session data 129 for respective skills.

As shown in FIG. 1D, in addition to the user ID "UID1" (identifying an account of the user 5) and the session IDs "SID2" and "SD3" uniquely identifying sessions for the secondary skills, the rows 162 and 163 include identifiers of the secondary skills (e.g., "SK2" and "SK3"), identifiers of "permitted resources" (corresponding to resources the secondary skills are permitted to use), and identifiers of "utilized resources" (corresponding to the resources the secondary skills are actually using). In the illustrated example, the row 162 indicates that the only resources the skills "SK2" and "SK3" are permitted to use, and the only resources the skills "SK2" and "SK3" are actually using, are the emitted window resources "EW2" and "EW2," respectively. The emitted window resources "EW2" and "EW2" may correspond, for example, the windows for the secondary GUIs 106a and 106b shown in FIG. 1B.

The data in row 164 of the version (a) of the table 160 may correspond, for example, to skill that is running in the background for the device 110, such a timer for a particular task (e.g., a "pasta timer"). In the illustrated example, the row 164 indicates that the only resource the skill "SK4" is permitted to use, and the only resource the skill "SK4" is actually using, is widget window resource "WW1."

In some implementations, the primary skill session data 127 and/or the secondary skill session data 129 may alternatively be stored locally at the orchestrator component 112 (or elsewhere), rather than being sent to the session management component 122 and/or persisted in memory of the session management component 122 (e.g., within the table 160). In any case, as alluded to previously, the secondary skill session data 129 may subsequently be retrieved by the plan generation component 126 when a subsequent input is received by the device 110 (e.g., a subsequently detected utterance or touchscreen input selecting one of the secondary GUI elements 106, 108) and may be used to ascertain an intent of the user 5 to invoke a skill component 114 identified by the secondary skill session data 129. For instance, in some implementations, the language processing component(s) 192, the post-NLU ranker component 166, or some other component, may determine that at least a portion of received input data (e.g., a portion of received audio data 111 or an input corresponding to selection of a secondary GUI element 106) matches or otherwise corresponds to a portion of the previously determined secondary skill session data 129, such the skill ID of the secondary skill component 114b, an emitted window ID of the secondary GUI element 106, etc. In some implementations, e.g., when the secondary skill session data 129 is not persisted to the session management component 122, data identifying the current display output of the device 110 may additionally or alternatively be obtained and used by the plan generation component 126 (or another component), possibly together with secondary skill session data 129 stored locally at the orchestrator component 112, to infer the secondary skill sessions that are currently active for the device 110.

Version (B) of the table 160 shown in FIG. 1D illustrates how the version (A) of the table 160 may be modified in response to the user 5 providing an input selecting the secondary skill "SK2," as described above. In response to such an input, the skill "SK2" may be become a primary skill. As such, additional resources (e.g., the audio content resource "AC1," the audio dialog resource "AD1," the emitted window resource "EW1," and the screen overlay resource "SO1") may be made available to, and possibly used by, the skill "SK2." Further, one or more other skills (e.g., skills "SK4" and "SK5" corresponding to predicted next actions following execution of the skill "SK2") may be identified and visual content for such other skills may be presented within secondary GUI elements (e.g., via the emitted windows resources "EW2" and "EW3").

In some implementations, multiple secondary plan execution components 138 may operate in parallel to invoke the respective secondary skill components 114b that are identified in the secondary skill session data 129. In other implementations, the same secondary plan execution component may invoke the secondary skill components 114b that are identified in the secondary skill session data 129 sequentially, e.g., one at a time.

As alluded to previously, individual skill components 114 may use one or more resources to provide output for the device 110, such as (A) audio content resources, (B) audio dialog resources, (C) widget window resources, (D) emitted window resources, and (E) screen overlay resources. Accordingly, in some implementations, the primary skill session data 127 and/or the secondary skill session data 129 may identify both: (1) which resources the indicated skill is permitted to use, and (2) which resources the indicated skill is actually using.

When the primary plan execution component 136 invokes a skill component 114 for an active session, the primary plan execution component 136 may consult the primary skill session data 127 to determine the resources that the primary plan execution component 136 is permitted to request to be used to implement the primary skill. In some implementations, for primary skills, the primary skill session data 127 may include no restrictions with respect to permitted resources. Creating a session for a primary skill in this fashion may permit the primary skill to be invoked in such a way that any audio experience currently being provided to the user 5, e.g., outputting of music, will be interrupted.

In a similar fashion, when a secondary plan execution component 138 invokes a skill component 114 for an active session, the secondary plan execution component 138 may consult the secondary skill session data 129 to determine the resources that the secondary plan execution component 138 is permitted to request to be used to implement the secondary skill. In some implementations, for secondary skills, the secondary skill session data 129 may identify only a subset of the permitted resources of the secondary skill component 114b that a secondary plan execution component 138 is permitted to request to be used to implement the secondary skill. For example, in some implementations, identifiers of audio content resources and/or audio dialog resources may be omitted from the secondary skill session data 129, thus precluding the secondary plan execution component 138 from requesting the use of those resources from the secondary skill component 114b. As such, the secondary plan execution component 138 may instruct the secondary skill component 114b to send only particular types of directives, e.g., directives to present secondary GUI elements 106, 108. Creating of a session for a secondary skill in this fashion may cause the secondary skill to be invoked without interrupting an audio experience currently being provided to the user 5, e.g., outputting of music.

In some implementations, the primary skill session data 127 and/or the secondary skill session data 129 may also include other information that may be used by the system 100 in other ways. For example, the primary skill session data 127 and/or the secondary skill session data 129 may include metadata that identifies things such as the locale from which a request originated, the agent to which a request was directed (e.g., Alexa, Disney, Samuel L. Jackson, etc.), thus enabling a response from that same agent to be generated when user 5 interacts with same session, etc.

In some implementations, it may be desirable for content (e.g., visual content) for secondary skills to be provided from a source other than the secondary skill component 114b for the skill. For example, another system component (not illustrated in FIGS. 1A-C) may be designated as a proxy for purposes of providing visual content for inclusion in secondary GUI elements 106, 108. In such implementations, after a session is created for the secondary skill, the component(s) 138 may invoke the proxy component, rather than the secondary skill component 114b, to obtain content for the secondary GUI elements 106, 108. The determination of whether to retrieve content from a secondary skill component 114b or a proxy component may determined on a case-by-case basis and may be based, for example, on the content of the MRE plan data 128, content of the secondary skill session data 129 and/or data stored locally at the orchestrator component 112 (e.g., data identifying the individual skills, or types of skills, for which the proxy component is to be invoked).

Figure 1E:
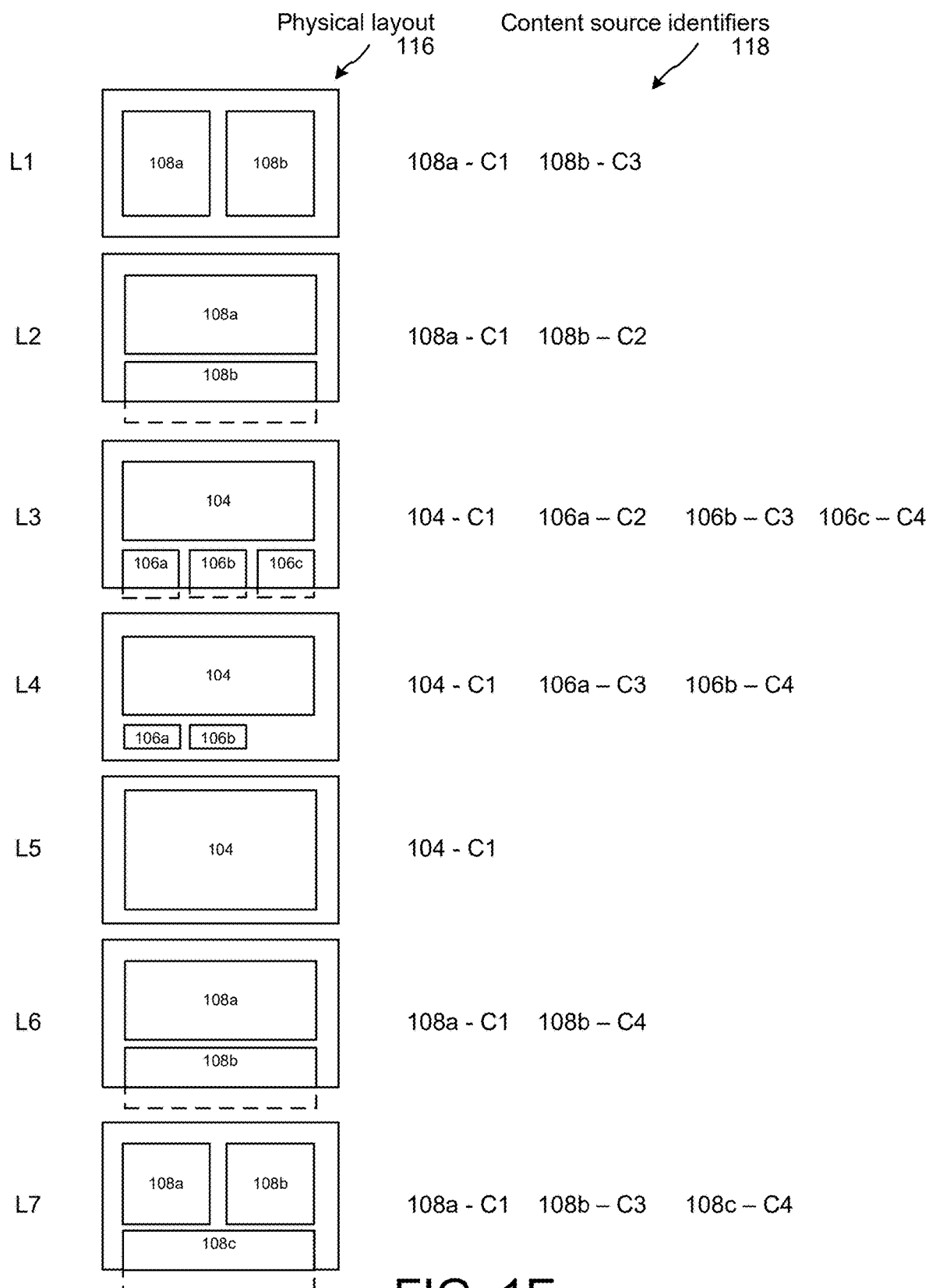
FIG. 1E shows an example set of ranked multiple results experience (MRE) layouts that may be output by the MRE shortlister component shown in FIGS. 1A-1C, 2 and 3, according to some embodiments of the present disclosure.

An example set of ranked MRE layout data 145, labeled L1 through L7, that may be output by the MRE shortlister component 140 is shown in FIG. 1E. In certain configurations, layout L1 may be the highest ranked (e.g., most preferred) layout and may be used when two potential responses have a similar rank in terms of displaying to a user, layout L2 may be the next ranked (e.g., next most preferred) layout and may be used when one potential response is slightly higher ranked than another, and so on. As shown in FIG. 1E, each layout of the ranked MRE layout data 145 may include both (A) an indication 116 of the physical locations of GUI elements 104, 106, 108 on the screen 102 of the device 110, and (B) identifiers 118 of sources of output content (labeled C1, C2, C3, and C4 in FIG. 1F) for the skill(s) that can potentially be represented by those GUI elements 104, 106. For example, in layout L1, the GUI element 108a may display content from source C1 while the GUI element 108b may show content from source C3. While in layout L2, the GUI element 108a may show content from source C1 while the GUI element 108b may show content from source C2. As illustrated, in layout L2, the GUI element 108b may not be fully shown on the display but the user may scroll through the screen to see the remainder of the GUI element 108b (as indicated by the dotted lines). Other layouts (e.g., layouts L3, L6, L7) may also have GUI elements which are not shown fully upon initial presentation. As can be appreciated, these are example layouts and other layouts may also be used.

Referring again to FIG. 1A, in addition to sending the ranked MRE layout data 145 to the secondary plan execution component(s) 138, the plan generation component 126 may send (see arrow 123) the ranked MRE layout data 145 to the MRE composer component 150. As explained in more detail below in connection with FIG. 11, the MRE composer component 150 may await receipt of primary skill content 155a (e.g., from the primary skill component 114a) and/or secondary skill content 155b (e.g., from one or more of the secondary skill components 114b or a proxy component) from the sources identified for the respective GUI elements 104, 106, 108 represented in the ranked MRE layout data 145, and depending on which of the GUI elements 104, 106, 108 the MRE composer component 150 is able to successfully populate with content, the MRE composer component 150 may output final MRE layout data 165. In some implementations, for example, the final MRE layout data 165 may correspond to the highest ranked layout of the ranked MRE layout data 145 whose GUI elements 104, 106, 108 the MRE composer component 150 was able to populate with content from the identified content sources. As illustrated in FIGS. 1B and 1C, the MRE composer component 150 may then cause the device 110 to present the GUI elements 104, 106, 108 in accordance with the final MRE layout data 165.

In certain configurations the system 100 may use different ranges of similarity to determine which MRE layout to present. For example, if the confidence value/scores for two different particular NLU hypothesis are within a first range of each other, the system 100 may determine that there is insufficient data to select between them without presenting a choice to the user and may thus determine that a threshold level of ambiguity has been met and may thus select an MRE layout 165 and/or perform corresponding operations corresponding to the second interaction 132 described in connection with FIG. 1C. In another example, the system 100 may determine that the confidence value/scores for two different particular NLU hypothesis are outside of the first range of each other (thus indicating that disambiguation by the user 5 may not be needed). But the system 100 may also determine that the confidence value/scores for two different particular NLU hypothesis are within a second range of each other, where the second range may be wider/larger than the first range, thus indicating that while the system 100 may proceed without explicit user disambiguation, it may be desirable to present to the user 5 some information regarding a second (or third, etc.) NLU hypothesis, just in case such information may be useful. In such as situation the system may select an MRE layout 165 and/or perform corresponding operations corresponding to the first interaction 130 described in connection with FIG. 1B. In still another example, the system 100 may determine that the confidence value/scores for two different particular NLU hypothesis are both outside of the first range of each other and outside the second range of each other. In such a situation the system may determine not to present information regarding a second (or third) NLU hypothesis.

Figure 1F:
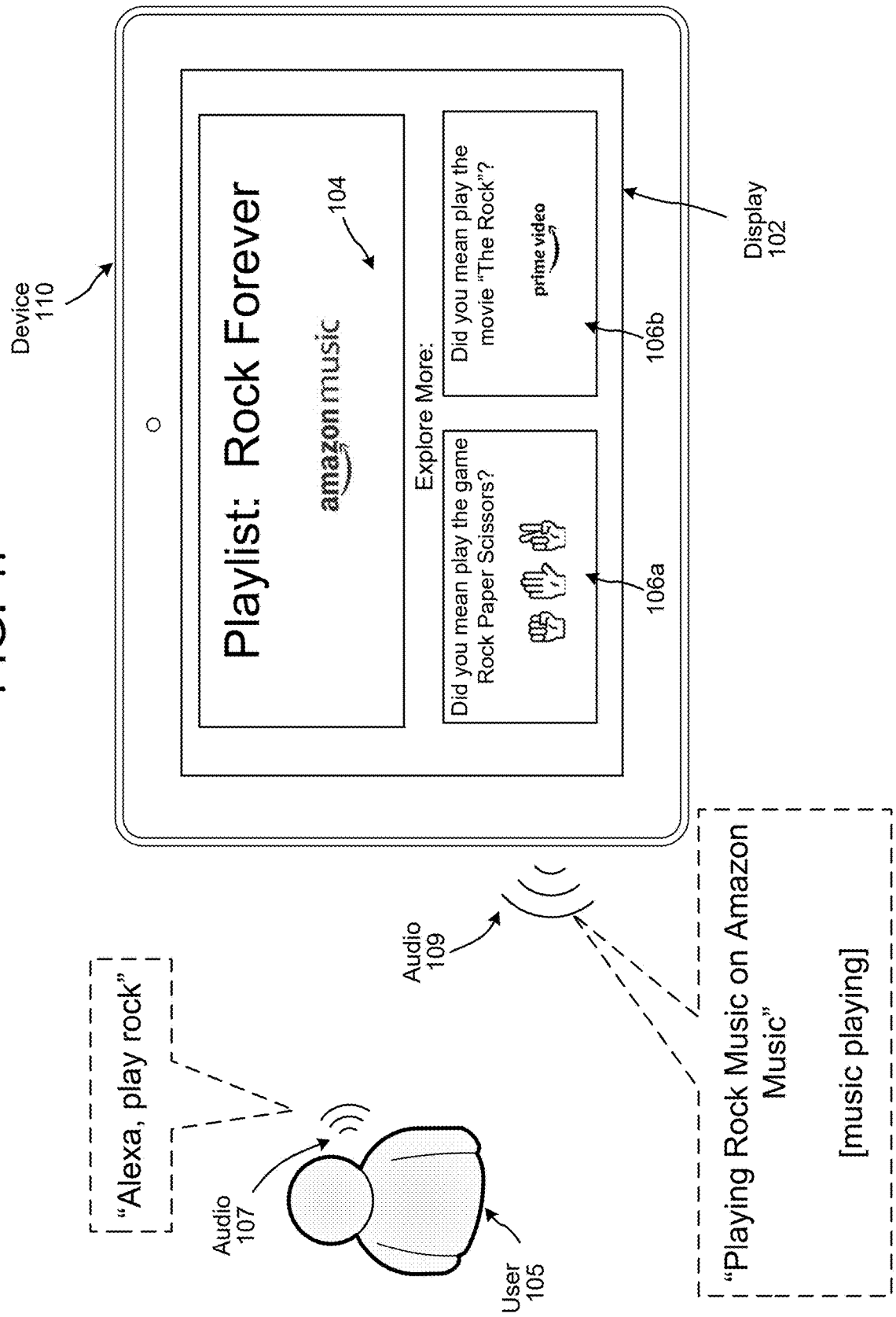
FIG. 1F is a conceptual drawing showing an instance of a display of a device according to an instance of the first example implementation as shown in FIG. 1B.

FIG. 1F illustrates a device 110 with a display 102 according to one example of how the device may display results according to a type of the first interaction 130 such as that discussed above in reference to FIG. 1B. In the example of FIG. 1F, a user 105 may speak an utterance such as "Alexa, play rock." The audio 107 of the utterance is captured by one or more microphones (such as those of device 110) and processed as described above. The top candidate NLU hypothesis (as determined through the speech processing described herein) may determine an intent to play rock music using a music playing skill (for example Amazon music). Another, lower scoring, NLU hypothesis (as determined through the speech processing described herein) may determine an intent to play the game "rock paper scissors) using a game skill. Still another, even lower scoring, NLU hypothesis (as determined through the speech processing described herein) may determine an intent to play the movie "The Rock" using a movie skill, such as Prime Video. The system may configure output audio data (for example using TTS) which will output audio 109 to the user that includes synthesized speech such as "playing rock music on Amazon Music" and then plays the actual music from the music skill. Thus the output audio 109 may include an indication of the output corresponding to the top scoring NLU hypothesis as well as the presumed desired content (e.g., the actual music).

The system may also determine MRE layout data 165 that corresponds to the three different NLU hypotheses. For example, the MRE layout data 165 may cause the device 110 to present on its display 102 a primary GUI element 104 that corresponds to the top scoring NLU hypothesis and visually indicates the corresponding results and/or invoked skill, for example showing (as seen in FIG. 1F) that the device is playing the playlist "Rock Forever" using the skill Amazon Music. The MRE layout data 165 may also cause the device 110 to present on its display 102 a second GUI element 106a which displays to the user 105 some information about the second NLU hypothesis, for example asking if the user meant to play the game "rock paper scissors" instead. If the user were to make a selection corresponding to the second NLU hypothesis (for example by speaking a corresponding command or touching the second GUI element 106a), the system 100 may cease the music output and instead launch the game skill to play rock paper scissors. Further, the MRE layout data 165 may also cause the device 110 to present on its display 102 a third GUI element 106b which displays to the user 105 some information about the third NLU hypothesis, for example asking if the user meant to play the movie "The Rock" (for example through the skill Prime Video) instead. If the user were to make a selection corresponding to the third NLU hypothesis (for example by speaking a corresponding command or touching the third GUI element 106b), the system 100 may cease the music output and instead launch the movie skill to play the movie "The Rock." As can be appreciated, a similar display may be made to present additional information types such as those discussed in reference to FIG. 1B. Further, the display 102 may comprise a variety of different GUI element arrangements, such as those discussed in reference to FIG. 1E. As can be appreciated, in certain circumstances one or more GUI elements may correspond to different NLU hypotheses while other GUI element(s) (which may be displayed at the same time and/or as part of a same group) may correspond to additional information/predicted next actions.

Although a number of examples discussed herein may illustrate different NLU hypotheses as corresponding to different skills it can be appreciated that a first NLU hypothesis may correspond to the same skill as a different, second NLU hypothesis. In such circumstances, the first and second NLU hypotheses may differ in other ways such as corresponding to different intents that go with the same skill, different entities to be acted upon, etc. For example, a user command of "play music" may be processed by the system 100 to result in different NLU hypotheses such as a first NLU hypothesis of [Skill:AmazonMusic; Intent:<PlayMusic>; Entity:<PopPlaylist>], a second NLU hypothesis of [Skill:AmazonMusic; Intent:<PlayMusic>; Entity:<ClassicalPlaylist>], a third NLU hypothesis of [Skill:RadioPlayer; Intent:<StreamStation>; Entity:<TopPopStation>], etc. Various different interpretations (e.g., NLU hypotheses) may correspond to a particular natural language input and the interpretations may be similar in a number of ways and/or different in a number of ways.

Figure 1G:
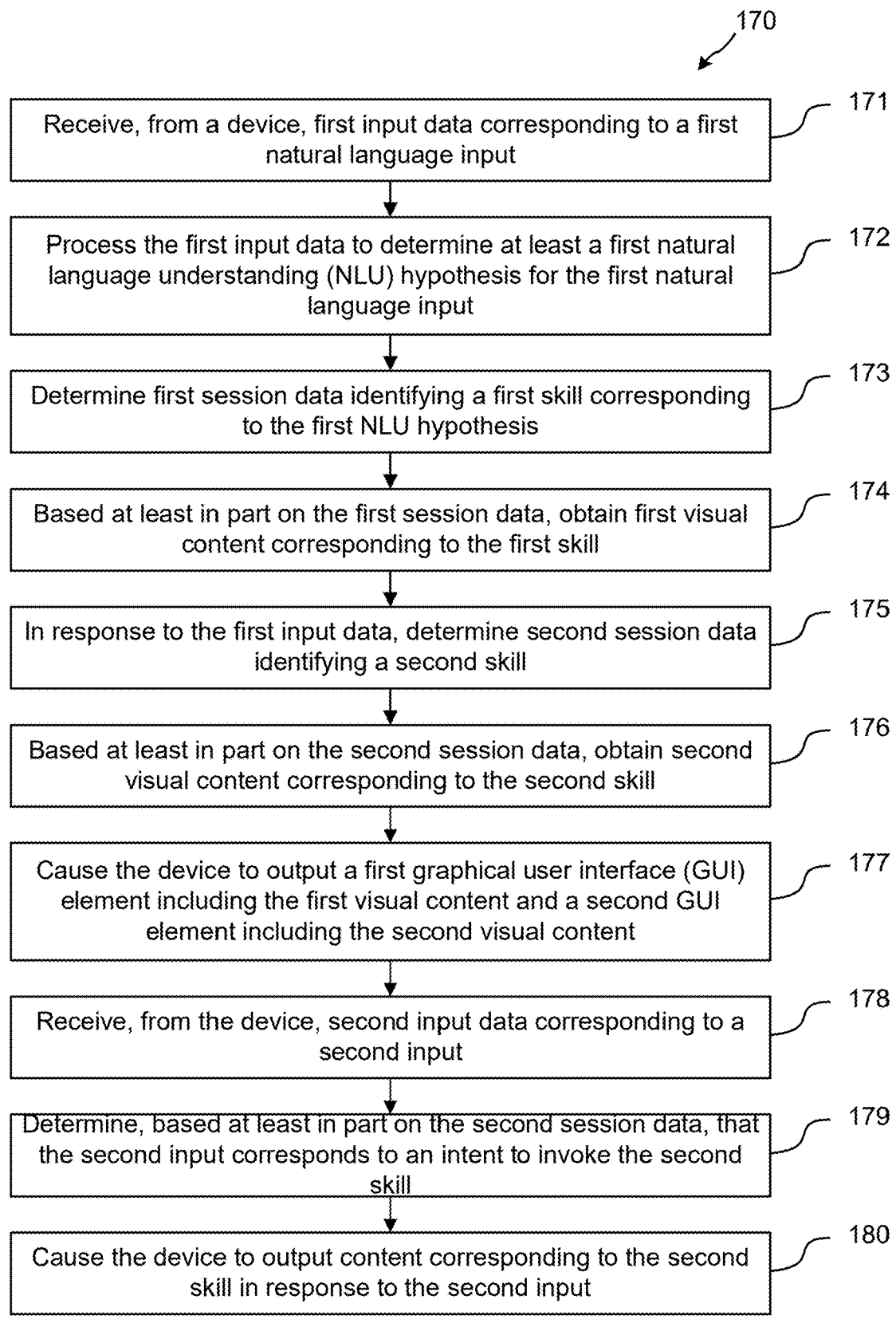
FIG. 1G is a flowchart illustrating a first example routine that may be performed by one or more of the system components, according to some embodiments of the present disclosure.

FIG. 1G shows a first example routine 170 that may be performed by the system 100 in accordance with some embodiments of the present disclosure.

At a step 171 of the routine 170, first input data (e.g., the audio data 111) corresponding to a first natural language input (e.g., the audio 107) may be received from a device (e.g., the device 110).

At a step 172 of the routine 170, the first input data (e.g., the audio data 111) may be processed (e.g., by the language processing component 192 and/or the post-NLU ranker component 166) to determine at least a first natural language understanding (NLU) hypothesis for the first natural language input.

At a step 173 of the routine 170, first session data (e.g., the primary skill session data 127) identifying a first skill (e.g., primary skill component 114a) corresponding to the first NLU hypothesis may be determined.

At a step 174 of the routine 170, first visual content (e.g., primary skill content 155a) corresponding to the first skill (e.g., the primary skill component 114a) may be obtained based at least in part on the first session data (e.g., the primary skill session data 127).

At a step 175 of the routine 170, second session data (e.g., the secondary skill session data 129) identifying a second skill (e.g., the secondary skill component 114b) may be determined in response to the first input data (e.g., the audio data 111).

At a step 176 of the routine 170, second visual content (e.g., secondary skill content 155b) corresponding to the second skill (e.g., the secondary skill component 114b) may be obtained based at least in part on the second session data (e.g., the secondary skill session data 129).

At a step 177 of the routine 170, the device (e.g., the device 110) may be caused to output a first graphical user interface (GUI) element (e.g., the primary GUI element 104) including the first visual content (e.g., the secondary skill content 155b) and a second GUI element (e.g., a secondary GUI element 106) including the second visual content (e.g., the secondary skill content 155b).

At a step 178 of the routine 170, second input data corresponding to a second input (e.g., audio data 111 corresponding to a subsequent utterance or an indicator of a user input selecting the secondary GUI element 106) may be received from the device (e.g., the device 110).

At a step 179 of the routine 170, it may be determined, based at least in part on the second session data (e.g., the secondary skill session data 129), that the second input (e.g., audio data 111 corresponding to a subsequent utterance or an indicator of a user input selecting the secondary GUI element 106) corresponds to an intent to invoke the second skill (e.g., the secondary skill component 114b).

At a step 180 of the routine 170, the device (e.g., the device 110) may be caused to output content (e.g., audio or visual content) corresponding to the second skill (e.g., the secondary skill component 114b) in response to the second input.

Figure 1H:
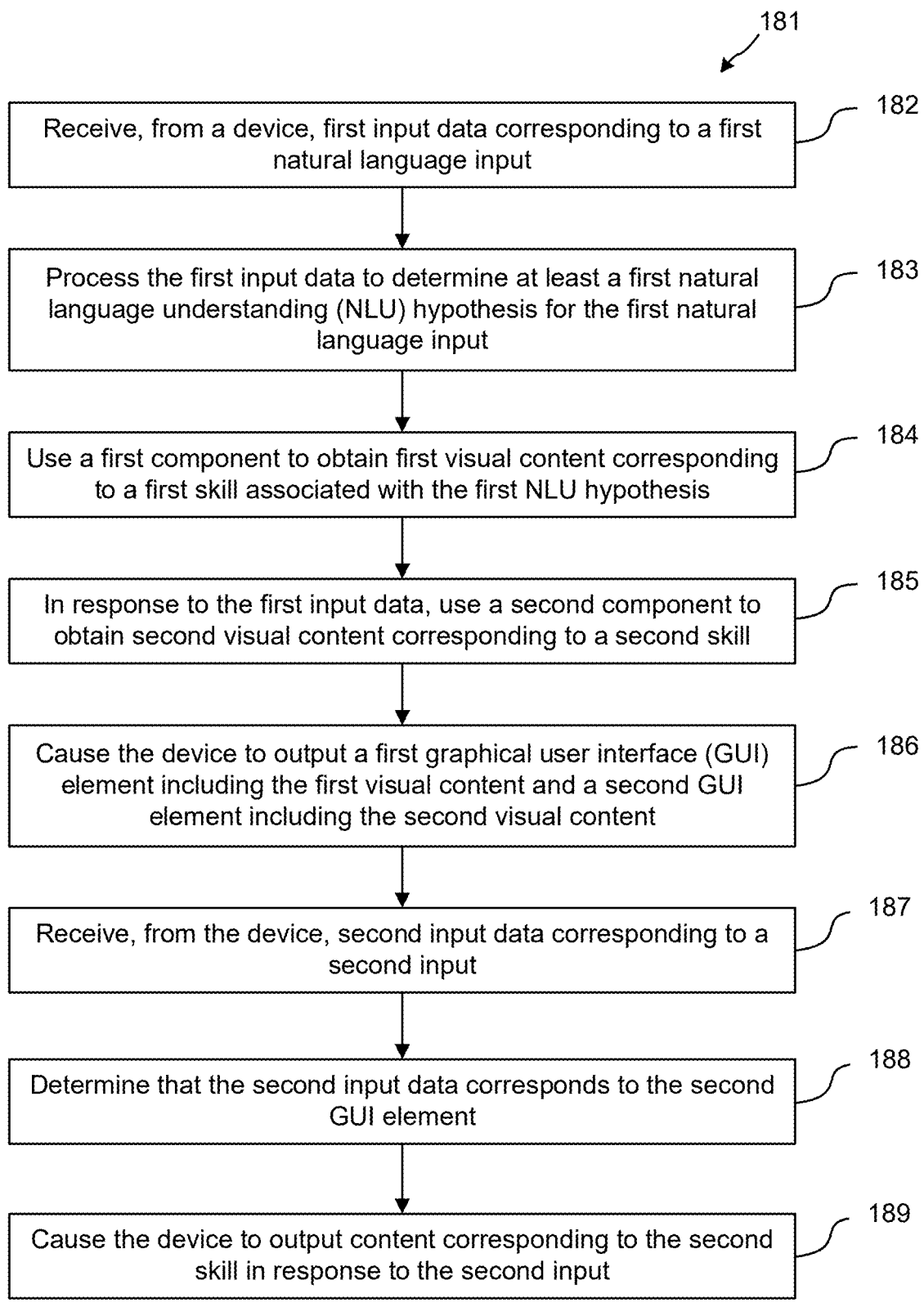
FIG. 1H is a flowchart illustrating a second example routine that may be performed by one or more of the system components, according to some embodiments of the present disclosure.

FIG. 1H shows a second example routine 181 that may be performed by the system 100 in accordance with some embodiments of the present disclosure.

At a step 182 of the routine 181, first input data (e.g., the audio data 111) corresponding to a first natural language input (e.g., the audio 107) may be received from a device (e.g., the device 110).

At a step 183 of the routine 181, the first input data (e.g., the audio data 111) may be processed to determine at least a first natural language understanding (NLU) hypothesis for the first natural language input (e.g., the audio 107).

At a step 184 of the routine 181, a first component (e.g., the primary plan execution component 136) may be used to obtain first visual content (e.g., the primary skill content 155a) corresponding to a first skill (e.g., the primary skill component 114a) associated with the first NLU hypothesis.

At a step 185 of the routine 181, a second component (e.g., a secondary plan execution component 138) may be used to obtain second visual content (e.g., the secondary skill content 155b) corresponding to a second skill (e.g., the secondary skill component 114b) in response to the first input data (e.g., the audio data 111).

At a step 186 of the routine 181, the device (e.g., the device 110) may be caused to output a first graphical user interface (GUI) element (e.g., the primary GUI element 104) including the first visual content (e.g., the primary skill content 155a) and a second GUI element (e.g., a secondary GUI element 106) including the second visual content (e.g., the secondary skill content 155b).

At a step 187 of the routine 181, second input data corresponding to a second input (e.g., audio data 111 corresponding to a subsequent utterance or an indicator of a user input selecting the secondary GUI element 106) may be received by the device (e.g., the device 110).

At a step 188 of the routine 181, it may be determined that the second input data (e.g., audio data 111 corresponding to a subsequent utterance or an indicator of a user input selecting the secondary GUI element 106) corresponds to the second GUI element (e.g., the secondary GUI element 106).

At a step 189 of the routine 181, the device (e.g., the device 110) may be caused to output content (e.g., audio or visual content) corresponding to the second skill (e.g., the secondary skill component 114b) in response to the second input.

The system 100 may operate using various components as described in FIG. 2. The various components may be located on same or different physical devices. Communication between various components may occur directly or across the network(s) 199. Each device 110 may include one or more audio capture component(s), such as a microphone or array of microphones of a device 110, that captures audio 11 and creates corresponding audio data. Once speech is detected in audio data representing the audio 11, the device 110 may determine if the speech is directed at the device 110/system component(s) 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa." In another example, input to the system 100 may be in form of text data 213, for example, as a result of a user typing an input into a user interface of the device 110. Other input forms may include indications that the user 105 has pressed a physical or virtual button on the device 110, the user has made a gesture, etc. The device 110 may also capture images using camera(s) of the device 110 and may send image data 221 representing those image(s) to the system component(s) 120. The image data 221 may include raw image data or image data processed by the device 110 before it is sent to the system component(s) 120. The image data 221 may be used in various manners by different components of the system to perform operations such as determining whether a user is directing an utterance to the system, interpreting a user command, responding to a user command, etc.

The wakeword detection component 220 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 220 and/or input is detected by an input detector, the device 110 may "wake" and begin transmitting audio data 111, representing the audio 11, to the system component(s) 120. The audio data 111 may include data corresponding to the wakeword; in other embodiments, the portion of the audio corresponding to the wakeword is removed by the device 110 prior to sending the audio data 111 to the system component(s) 120. In the case of touch input detection or gesture based input detection, the audio data may not include a wakeword.

In some implementations, the system 100 may include more than one system component(s) 120. In such implementations, respective system component(s) 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detection component 220 may result in sending audio data to a first for processing while detection of the wakeword "Computer" by the wakeword detector may result in sending audio data to a second system for processing. In some implementations, the system 100 may have separate wakewords and system component(s) 120 for different skills/systems (e.g., "Dungeon Master" for a game play skill/system) and/or such skills/systems may be coordinated by one or more skill components 114 of the system component(s) 120.

The device 110 may also include a system directed input detector (not illustrated). (The system component(s) 120 may also include a system directed input detector which may operate in a similar manner.) The system directed input detector may be configured to determine whether an input to the system 100 (for example, speech, a gesture, etc.) is directed to the system 100 or not directed to the system 100 (for example, directed to another user, etc.). The system directed input detector may work in conjunction with the wakeword detection component 220. If the system directed input detector determines an input is directed to the system 100, the device 110 may "wake" and begin sending captured data for further processing (for example, processing audio data using the language processing component(s) 192/392). If data is being processed, the device 110 may indicate such to the user 105, for example, by activating or changing the color of an illuminated output (such as a light emitting diode (LED) ring), displaying an indicator on a display (such as a light bar across the display), outputting an audio indicator (such as a beep), or otherwise informing the user 105 that input data is being processed. If the system directed input detector determines an input is not directed to the system 100 (such as a speech or gesture directed to another user), the device 110 may discard the data and take no further action for processing purposes. In this way the system 100 may prevent processing of data not directed to it, thus protecting user privacy. As an indicator to the user 105, however, the system 100 may output an audio, visual, or other indicator when the system directed input detector is determining whether an input is potentially device directed. For example, the device 110 may output an orange indicator while considering an input, and may output a green indicator if a system directed input is detected. Other such configurations are possible.

Upon receipt of the audio data 111 by the system component(s) 120, the audio data 111 may be sent to an orchestrator component 112. The orchestrator component 112 may include memory and logic that enables the orchestrator component 112 to transmit various pieces and forms of data to various components of the system, as well as perform other operations as described herein.

The orchestrator component 112 may send the audio data 111 to one or more language processing components 192. The language processing component(s) 192 (sometimes also referred to as spoken language understanding (SLU) component(s)) may include an automatic speech recognition (ASR) component 250 and a natural language understanding (NLU) component 260. The ASR component 250 may transcribe the audio data 111 into text data. The text data output by the ASR component 250 may represent one or more than one (e.g., in the form of an N-best list) ASR hypotheses for speech represented in the audio data 111. The ASR component 250 may interpret the speech in the audio data 111 based on a similarity between the audio data 111 and pre-established language models. For example, the ASR component 250 may compare the audio data 111 with models for sounds (e.g., acoustic units such as phonemes, senons, phones, etc.) and sequences of sounds to identify words that match the sequence of sounds of the speech represented in the audio data 111. The ASR component 250 may send the text data it generates to the NLU component 260, via, in some embodiments, the orchestrator component 112. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein. The ASR component 250 is described in greater detail below with regard to FIG. 4.

The NLU component 260 may receive the text data from the ASR component 250. The NLU component 260 may attempt to make a semantic interpretation of the phrase(s) or statement(s) represented in the text data it receives by determining one or more meanings associated with the phrase(s) or statement(s) represented in the text data. The NLU component 260 may determine an intent representing an action that a user desires be performed and may determine information that allows a device (e.g., the device 110, the system component(s) 120, a skill component 114, the skill support system component(s) 225, etc.) to execute the intent. For example, if the text data corresponds to "play the 5$^{th}$ Symphony by Beethoven," the NLU component 260 may determine an intent that the system 100 output music and may identify "Beethoven" as an artist/composer and "5$^{th}$ Symphony" as the piece of music to be played. For further example, if the text data corresponds to "what is the weather," the NLU component 260 may determine an intent that the system 100 output weather information associated with a geographic location of the device 110. In another example, if the text data corresponds to "turn off the lights," the NLU component 260 may determine an intent that the system 100 turn off lights associated with the device 110 or the user 105. However, if the NLU component 260 is unable to resolve the entity—for example, because the entity is referred to by an anaphora, such as "this song" or "my next appointment"—the language processing component(s) 192 may send a decode request to one or more other language processing component(s) 192 for information regarding the entity mention and/or other context related to the utterance. The language processing component(s) 192 may augment, correct, or base results data upon the audio data 111 as well as any data received from the other language processing component(s) 192.

The NLU component 260 may return NLU results data 193 (shown in FIG. 6) (which may include tagged text data, indicators of intent, etc.) back to the orchestrator component 112. The orchestrator component 112 may forward the NLU results data to a post-NLU ranker component 166 which may incorporate other information to rank potential interpretations determined by the NLU component 260 as well as to evaluate other skill data 135 to determine an MRE plan 124. The local device 110 may also include its own post-NLU ranker 366, which may operate similarly to the post-NLU ranker component 166. The NLU component 260, post-NLU ranker component 166 and other components are described in greater detail below with regard to FIGS. 5 and 6.

A skill component may be software running on the system component(s) 120 that is akin to a software application. That is, a skill component 114 may enable the system component(s) 120 to execute specific functionality in order to provide data or produce some other requested output. In some implementations, a skill component 390 may be embodied by software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 114. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 114 may operate in conjunction between the system component(s) 120 and other devices, such as the device 110, in order to complete certain functions. Inputs to a skill component 114 may come from speech processing interactions or through other interactions or input sources. A skill component 114 may include hardware, software, firmware, or the like that may be dedicated to a particular skill component 114 or shared among different skill components 114.

One or more skill support system components 225 may communicate with one or more skill components 114 within the system component(s) 120 and/or directly with the orchestrator component 112 or with other components. The skill support system component(s) 225 may be configured to perform one or more actions. An ability to perform such action(s) may sometimes be referred to as a "skill." That is, a skill may enable one or more skill support system components 225 to execute specific functionality in order to provide data or perform some other action requested by a user. For example, a weather service skill may enable one or more skill support system component(s) 225 to provide weather information to the system component(s) 120, a car service skill may enable one or more skill support system component(s) 225 to book a trip with respect to a taxi or ride sharing service, an order pizza skill may enable one or more skill support system component(s) 225 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with one or more skill components 114 dedicated to interacting with the skill support system component(s) 225. Unless expressly stated otherwise, reference to a skill, skill device, or skill component may include a skill component 114 operated by the system component(s) 120 and/or skill operated by the skill support system component(s) 225. Moreover, the functionality described herein as a skill or skill may be referred to using many different terms, such as an action, bot, app, or the like. The skill component(s) 114 and/or skill support system component(s) 225 may return output data to the orchestrator component 112.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) 120 may include a dialog manager component (not illustrated) that manages and/or tracks a dialog between the user 105 and the device 110. As used herein, a "dialog" may refer to multiple related user inputs and system 100 outputs (e.g., through device(s) 110) between the system 100 and the user 105 that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, the user 105 may open a dialog with the system 100 to request a food delivery in a spoken utterance and the system may respond by displaying images of food available for order and the user 105 may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component may associate a dialog session identifier with the dialog upon determining that the user 105 is engaging in a dialog with the device 110. The dialog manager component may track a user input and the corresponding system generated response to the user input as a turn. The dialog session identifier may correspond to multiple turns of user input and corresponding system generated response. The dialog manager component may transmit data identified by the dialog session identifier directly to the orchestrator component 112 or another component. Depending on system configuration, the dialog manager component may determine the appropriate system generated response to give to a particular utterance or user input of a turn. Or creation of the system generated response may be managed by another component of the system (e.g., the language output component 293, the NLG component 279, the orchestrator component 112, etc.) while the dialog manager component selects the appropriate responses. Alternatively, one or more other components of the system component(s) 120 (e.g., the ambiguity identifier component 142, the MRE shortlister component 140 and/or the MRE composer component 150) may determine/select responses using techniques described herein. The text of a system generated response may be sent to a TTS component 280 for creation of audio data corresponding to the response. The audio data may then be sent to a user device (e.g., the device 110) for ultimate output to the user 105. Alternatively (or in addition) a dialog response may be returned in text or some other form.

The dialog manager component may receive the ASR hypothesis/hypotheses (e.g., text data) and, possibly with the assistance of the NLU component 260 and/or the post-NLU ranker component 166, make a semantic interpretation of the phrase(s) or statement(s) represented therein. That is, the dialog manager component may determine one or more meanings associated with the phrase(s) or statement(s) represented in the text data based on words represented in the text data. The dialog manager component may determine a goal corresponding to an action that a user 105 desires be performed as well as pieces of the text data that allow a device (e.g., the device 110, the system component(s) 120, the skill component(s) 114, the skill support system component(s) 225, etc.) to execute the intent. If, for example, the text data corresponds to "what is the weather," the dialog manager component may determine that that a system component 120 is to output weather information associated with a geographic location of the device 110. In another example, if the text data corresponds to "turn off the lights," the dialog manager component may determine that a system 120 is to turn off lights associated with a device 110 or a user 105. In some implementations, the NLU component 260 and/or the post-NLU ranker component 166 may assist the dialog manager component with determining NLU results data 193 and ranked intent-skill pairs 167 (as described below in connection with FIGS. 5 through 7), or otherwise performing one or more of the foregoing tasks.

The dialog manager component may send the NLU results data 193 and/or the ranked intent-skill pairs 167 (e.g., as determined by the NLU component 260 and the post-NLU ranker component 166) to one or more skill components 114. If the NLU results data 193 includes a single NLU hypothesis, the orchestrator component 112 may send the ranked intent-skill pairs 167 to the skill component(s) 114 associated with the NLU hypothesis. In some implementations, if the results data includes an N-best list of NLU hypotheses, the orchestrator component 112 may send the top scoring NLU hypothesis to one or more skill components 114 associated with the top scoring NLU hypothesis and/or may send the N-best list to the ambiguity identifier component 142 and/or the MRE shortlister component 140 for further processing, as described in more detail below. In some implementations, the N-best list may be sent to the ambiguity identifier component 142 if a difference between the confidence scores of two or more top ranking NLU hypotheses is less than a threshold. In some implementations, the N-best list may be sent to the MRE shortlister component 140 if the device 110 from which the natural language request originated includes a display 102 that could be used to resolve an ambiguity amongst multiple NLU hypotheses and/or output content for a top ranking NLU hypothesis while simultaneously enabling the selection of skill output content for one or more other NLU hypotheses, as described herein.

The system component(s) 120 may include one or more language output components 293. The language output component(s) 293 may include a natural language generation (NLG) component 279 and a text-to-speech (TTS) component 280. The NLG component 279 may generate text for purposes of TTS output to a user. For example, the NLG component 279 may generate text corresponding to instructions relating to a particular action for the user 105 to perform. The NLG component 279 may generate appropriate text for various outputs as described herein. The NLG component 279 may include one or more machine learning (ML) models configured to output text appropriate for a particular input. The text output by the NLG component 279 may become input for the TTS component 280. Alternatively or in addition, the TTS component 280 may receive text data from a skill component 114 or other system component (e.g., the ambiguity identifier component 142 or the MRE composer component 150) for output.

The NLG component 279 may include one or more trained ML models. The NLG component 279 may generates text data from dialog data received by the dialog manager component such that the output text data has a natural feel and, in some embodiments, includes words and/or phrases specifically formatted for a requesting individual. The NLG component 279 may use templates to formulate responses. Additionally or alternatively, the NLG component 279 may include one or more models trained from the various templates for forming the output text data. For example, the NLG component 279 may analyze transcripts of local news programs, television shows, sporting events, or any other media program to obtain common components of a relevant language and/or region. As one illustrative example, the NLG component 279 may analyze a transcription of a regional sports program to determine commonly used words or phrases for describing scores or other sporting news for a particular region. The NLG component 279 may further receive, as inputs, a dialog history, an indicator of a level of formality, and/or a command history or other user history such as the dialog history.

The NLG component 279 may generate dialog data based on one or more response templates. Further continuing the example above, the NLG component 279 may select a template in response to the question, "What is the weather currently like?" of the form: "The weather currently is $weather_information$." The NLG component 279 may analyze the logical form of the template to produce one or more textual responses including markups and annotations to familiarize the response that is generated. In some embodiments, the NLG component 279 may determine which response is the most appropriate response to be selected. The selection may, therefore, be based on past responses, past questions, a level of formality, and/or any other feature, or any other combination thereof. Responsive audio data representing the response generated by the NLG component 279 may then be generated using the text-to-speech component 280.

The TTS component 280 may generate audio data (e.g., synthesized speech) from text data using one or more different methods. Text data input to the TTS component 280 may come from a skill component 114, the orchestrator component 112, or another component of the system, e.g., the ambiguity identifier component 142 or the MRE composer component 150. In one method of synthesis called unit selection, the TTS component 280 may match text data against a database of recorded speech. The TTS component 280 may select matching units of recorded speech and concatenate the units together to form audio data. In another method of synthesis called parametric synthesis, the TTS component 280 may vary parameters such as frequency, volume, and noise to create audio data including an artificial speech waveform. Parametric synthesis may use a computerized voice generator, sometimes called a vocoder.

The system component(s) 120 may include a user recognition component 295 that recognizes one or more users using a variety of data. However, the disclosure is not limited thereto, and the device 110 may include a user recognition component 395 instead of and/or in addition to the user recognition component 295 of the system component(s) 120 without departing from the disclosure. The user recognition component 395 may operate similarly to the user recognition component 295.

The user-recognition component 295 may take as input the audio data 111 and/or text data output by the ASR component 250. The user-recognition component 295 may perform user recognition by comparing audio characteristics in the audio data 111 to stored audio characteristics of users. The user-recognition component 295 may also perform user recognition by comparing biometric data (e.g., fingerprint data, iris data, etc.), received by the system 100 in correlation with the present user input, to stored biometric data of users assuming user permission and previous authorization. The user-recognition component 295 may additionally or alternatively perform user recognition by comparing image data (e.g., including a representation of at least a feature of a user 105), received by the system 100 in correlation with the present user input, with stored image data including representations of features of different users. The user-recognition component 295 may perform additional or different user recognition processes, including those known in the art.

The user-recognition component 295 may determine scores indicating whether user input originated from a particular user. For example, a first score may indicate a likelihood that the user input originated from a first user, a second score may indicate a likelihood that the user input originated from a second user, etc. The user-recognition component 295 may also determine an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system.

The system 100 (either on the device 110, system component(s) 120, or a combination thereof) may include a profile storage 270 for storing a variety of information related to individual users, groups of users, devices, etc., that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier/user profile identifier. Each user profile may include various user identifying data. Each user profile may also include data corresponding to preferences of the user 105. Each user profile may also include preferences of the user 105 and/or one or more device identifiers, representing one or more devices 110 of the user 105. For instance, the user account may include one or more IP addresses, MAC addresses, and/or device identifiers, such as a serial number, of each additional electronic device 110 associated with the identified user account. When a user 105 logs into to an application installed on a device 110, the user profile (associated with the presented login information) may be updated to include information about the device 110, for example with an indication that the device is currently in use. Each user profile may include identifiers of skills that the user 105 has enabled. When a user 105 enables a skill, the user 105 may be providing the system component(s) 120 with permission to allow the skill to execute with respect to the user's natural language user inputs. If a user 105 does not enable a skill, the system component(s) 120 may not invoke the skill to execute with respect to the user's natural language user inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users 5 associated with the device 110. For example, a household device's profile may include the user identifiers of users 5 of the household.

The ambiguity identifier component 142 may evaluate the ranked intent-skill pairs 167 determined by the post-NLU ranker component 166 to identify circumstances in which the user 105 is to be prompted for input to disambiguate two or more of the top ranking intent-skill pairs 167. As noted above, and as also described below in connection with FIG. 8, the ambiguity identifier component 142 may process the ranked intent-skill pairs 167, together with other data (e.g., context data 805 and/or previous question data 825, as shown in FIG. 8) to determine whether a high level of ambiguity exists between two or more of the top ranking intent-skill pairs 167. When the ambiguity identifier component 142 determines that more than a threshold level of ambiguity exists between two or more top ranking ranked intent-skill pairs 167, the ambiguity identifier component 142 may output disambiguation data 137 representing two or more NLU results (and corresponding skills) that are in need of disambiguation. Such disambiguation data 137 may be provided to the MRE plan determination component 146 for processing.

Figure 9:
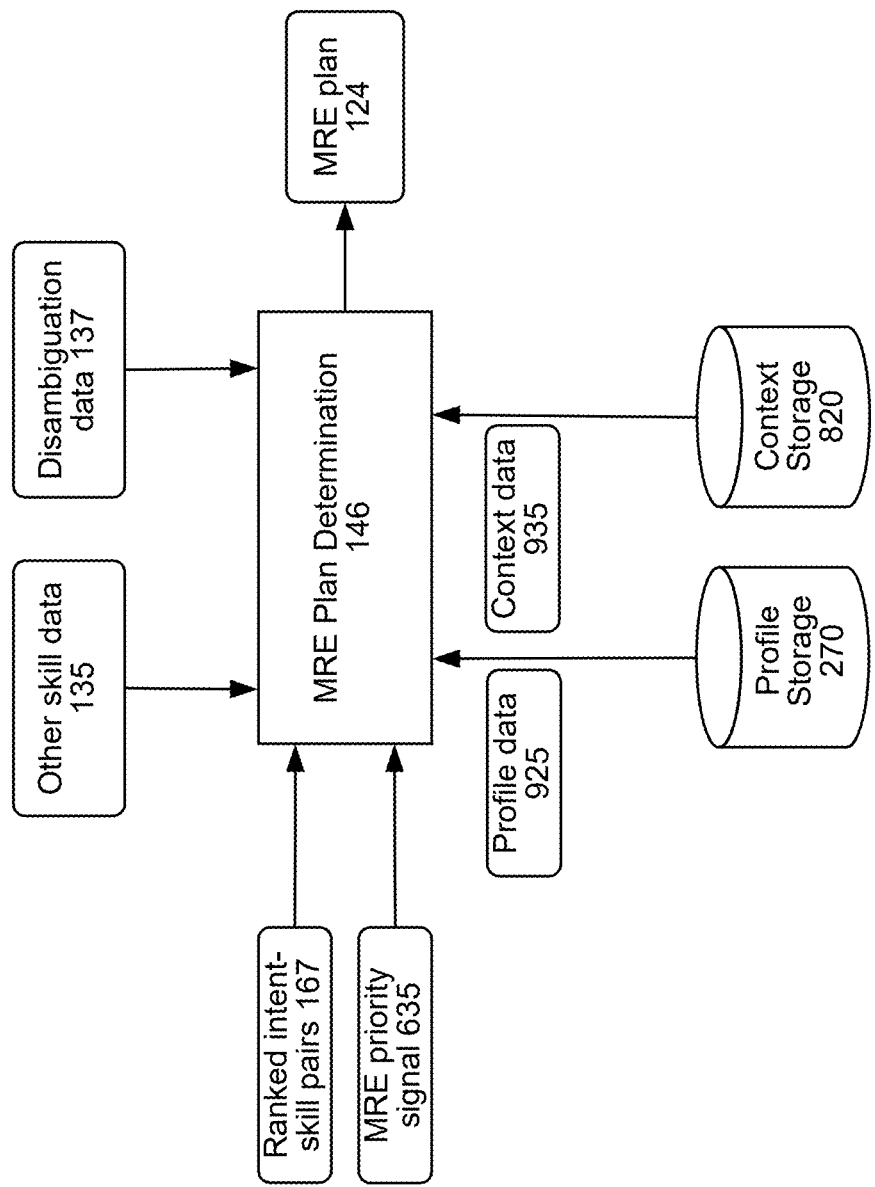
FIG. 9 is a conceptual diagram illustrating how the MRE plan determination component shown in FIGS. 1A-1C, 2 and 3 may operate according to some embodiments of the present disclosure.

As noted above, as described in more detail below in connection with FIG. 9, the MRE plan determination component 146 may process the ranked intent-skill pairs 167, and possibly disambiguation data 137 generated by the ambiguity identifier component 142 and/or other data (e.g., profile data 925, context data 935 and/or an MRE priority signal 635, as shown in FIG. 9), to determine an MRE plan 124, e.g., to facilitate the first interaction 130 described in connection with FIG. 1B or the second interaction 132 described in connection with FIG. 1C.

As noted above, and as also described in more detail below in connection with FIG. 10, the MRE shortlister component 140 may process the MRE plan data 128, together with other data 125 (e.g., the profile data 1025, context data 1035, and MRE layout templates 1045 shown in FIG. 10), to determine ranked MRE layout data 145 that can be used by the secondary plan execution component(s) 138 and the MRE composer component 150 to generate the final MRE layout data 165 for the display 102 of the device 110.

As noted above, and as also described below in connection with FIG. 11, the MRE composer component 150 may await receipt of content from the sources identified for the respective GUI elements 104, 106, 108 represented in the ranked MRE layout data 145 generated by the MRE shortlister component 140, and depending on which of the GUI elements 104, 106, 108 the MRE shortlister component 140 is able to successfully populate with content, the MRE composer component 150 may output final MRE layout data 165. In some implementations, for example, the final MRE layout data 165 may correspond to the highest ranked layout of the ranked MRE layout data 145 whose GUIs 104, 106, 108 the MRE composer component 150 was able to fully populate with content from the identified content sources (e.g., skills). The MRE composer component 150 may then cause the device 110 to present the GUI elements 104, 106, 108 in accordance with the final MRE layout data 165.

Figure 3:
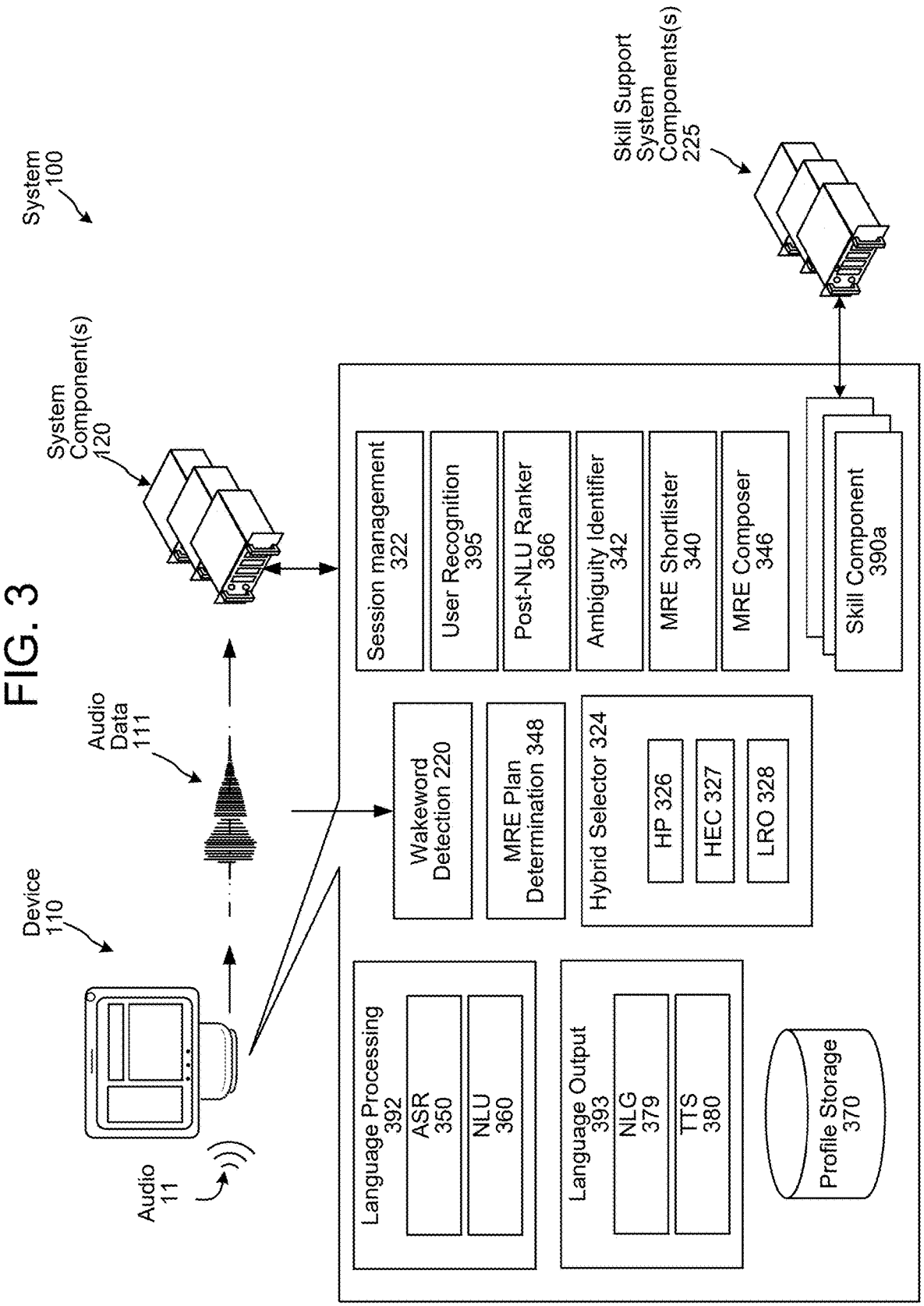
FIG. 3 is a conceptual diagram illustrating example components that may be included in a device, according to some embodiments of the present disclosure.

Although the components of FIG. 2 may be illustrated as part of the system component(s) 120, the device 110, or otherwise, the components may be arranged in other device(s) (such as in device 110 if illustrated in system component(s) 120 or vice-versa, or in other device(s) altogether) without departing from the disclosure. FIG. 3 illustrates such a configured device 110.

In at least some embodiments, the system component(s) 120 may receive the audio data 111 from the device 110, to recognize speech corresponding to a spoken input in the received audio data 111, and to perform functions in response to the recognized speech. In at least some embodiments, these functions involve sending directives (e.g., commands), from the system component(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 2, the device 110 may include a wakeword detection component 220 configured to compare the audio data 111 to stored models used to detect a wakeword (e.g., "Alexa") that indicates to the device 110 that the audio data 111 is to be processed for determining NLU output data (e.g., slot data that corresponds to a named entity, label data, and/or intent data, etc.). In at least some embodiments, a hybrid selector 324, of the device 110, may send the audio data 111 to the wakeword detection component 220. If the wakeword detection component 220 detects a wakeword in the audio data 111, the wakeword detection component 220 may send an indication of such detection to the hybrid selector 324. In response to receiving the indication, the hybrid selector 324 may send the audio data 111 to the system component(s) 120 and/or the ASR component 350. The wakeword detection component 220 may also send an indication, to the hybrid selector 324, representing a wakeword was not detected. In response to receiving such an indication, the hybrid selector 324 may refrain from sending the audio data 111 to the system component(s) 120, and may prevent the ASR component 350 from further processing the audio data 111. In this situation, the audio data 111 can be discarded.

The device 110 may conduct its own speech processing using on-device language processing components, such as one or more SLU/language processing components 392 (which may include an ASR component 350 and an NLU component 360), similar to the manner discussed herein with respect to the language processing component(s) 192 (or the ASR component 250 and the NLU component 260) of the system component(s) 120. The language processing component(s) 392 may operate similarly to the language processing component(s) 192, the ASR component 350 may operate similarly to the ASR component 250, and the NLU component 360 may operate similarly to the NLU component 260. The device 110 may also internally include, or otherwise have access to, other components such as one or more skill components 390 capable of executing commands based on NLU output data or other results determined by the device 110/system component(s) 120 (which may operate similarly to the skill components 114), a user recognition component 395 (configured to process in a similar manner to that discussed herein with respect to the user recognition component 295 of the system component(s) 120), profile storage 370 (configured to store similar profile data to that discussed herein with respect to the profile storage 270 of the system component(s) 120), a dialog manager component (not illustrated—configured to process in a similar manner to that discussed herein with respect to the dialog manager component of the system component(s) 120), a session management component 322 (configured to process in a similar manner to that discussed herein with respect to the session management component 122 of the system component(s) 120), an ambiguity identifier component 342 (configured to process in a similar manner to that discussed herein with respect to the ambiguity identifier component 142 of the system component(s) 120), an MRE plan determination component 348 (configured to process in a similar manner to that discussed herein with respect to the MRE plan determination component 146 of the system component(s) 120), an MRE shortlister component 340 (configured to process in a similar manner to that discussed herein with respect to the MRE shortlister component 140 of the system component(s) 120), an MRE composer component 346 (configured to process in a similar manner to that discussed herein with respect to the MRE composer component 150 of the system component(s) 120), or other components. In at least some embodiments, the profile storage 370 may only store profile data for a user or group of users specifically associated with the device 110. Similar to as described above with respect to the skill component 114, a skill component 390 may communicate with the skill support system component(s) 225. The device 110 may also have its own language output component 393 which may include the NLG component 379 and the TTS component 380. The language output component 393 may operate similarly to the language processing component 293, the NLG component 379 may operate similarly to the NLG component 279, and the TTS component 380 may operate similarly to the TTS component 280.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s) 120.

The hybrid selector 324, of the device 110, may include a hybrid proxy (HP) 326 configured to proxy traffic to/from the system component(s) 120. For example, the HP 326 may be configured to send messages to/from a hybrid execution controller (HEC) 327 of the hybrid selector 324. For example, command/directive data received from the system component(s) 120 can be sent to the HEC 327 using the HP 326. The HP 326 may also be configured to allow the audio data 111 to pass to the system component(s) 120 while also receiving (e.g., intercepting) such audio data 111 and sending that audio data 111 to the HEC 327.

In at least some embodiments, the hybrid selector 324 may further include a local request orchestrator (LRO) 328 configured to notify the ASR component 350 about the availability of new audio data 111 that represents user speech, and to otherwise initiate the operations of local language processing when new audio data 111 becomes available. In general, the hybrid selector 324 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 120 and chooses to use that remotely-determined directive data.

Thus, when the audio data 111 is received, the HP 326 may allow the audio data 111 to pass through to the system component(s) 120 and the HP 326 may also input the audio data 111 to the on-device ASR component 350 by routing the audio data 111 through the HEC 327 of the hybrid selector 324, whereby the LRO 328 notifies the ASR component 350 of the audio data 111. At this point, the hybrid selector 324 may wait for response data from either or both of the system component(s) 120 or the local language processing components. However, the disclosure is not limited thereto, and in some examples the hybrid selector 324 may send the audio data 111 only to the local ASR component 350 without departing from the disclosure. For example, the device 110 may process the audio data 111 locally without sending the audio data 111 to the system component(s) 120.

The local ASR component 350 may be configured to receive the audio data 111 from the hybrid selector 324, and to recognize speech in the audio data 111, and the local NLU component 360 may be configured to determine a user intent from the recognized speech, and to determine how to act on the user intent by generating NLU output data which may include directive data (e.g., instructing a component to perform an action). Such NLU output data may take a form similar to that as determined by the NLU component 260 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (e.g., output by the NLU component 360) may be selected as usable to respond to a natural language user input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language user input, to use directive data received from the system component(s) 120, assuming a remote response is even received (e.g., when the device 110 is able to access the system component(s) 120 over the network(s) 199), or to determine output audio requesting additional information from the user 105.

The device 110 and/or the system component(s) 120 may associate a unique identifier with each natural language user input. The device 110 may include the unique identifier when sending the audio data 111 to the system component(s) 120, and the response data from the system component(s) 120 may include the unique identifier to identify which natural language user input the response data corresponds.

In at least some embodiments, the device 110 may include, or be configured to use, one or more skill components 390 that may work similarly to the skill component(s) 114 implemented by the system component(s) 120. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill support system components 225. For example, one or more skill support system component(s) 225 may be located in a remote environment (e.g., separate location) such that the device 110 may only communicate with the skill support system component(s) 225 via the network(s) 199. However, the disclosure is not limited thereto. For example, in at least some embodiments, one or more skill support system components 225 may be configured in a local environment (e.g., home server and/or the like) such that the device 110 may communicate with the skill support system component(s) 225 via a private network, such as a local area network (LAN).

As used herein, a "skill" may refer to a skill component 114/390, one or more skill support system components 225, or a combination of a skill component 114/390 and one or more corresponding skill support system components 225.

Similar to the manner discussed with regard to FIG. 2, the local device 110 may be configured to recognize multiple different wakewords and/or perform different categories of tasks depending on the wakeword. Such different wakewords may invoke different processing components of the local device 110 (not illustrated in FIG. 3). For example, detection of the wakeword "Alexa" by the wakeword detection component 220 may result in sending audio data to certain language processing components 392/skill components 390 for processing while detection of the wakeword "Computer" by the wakeword detection component 220 may result in sending audio data different language processing components 392/skill components 390 for processing.

Figure 4:
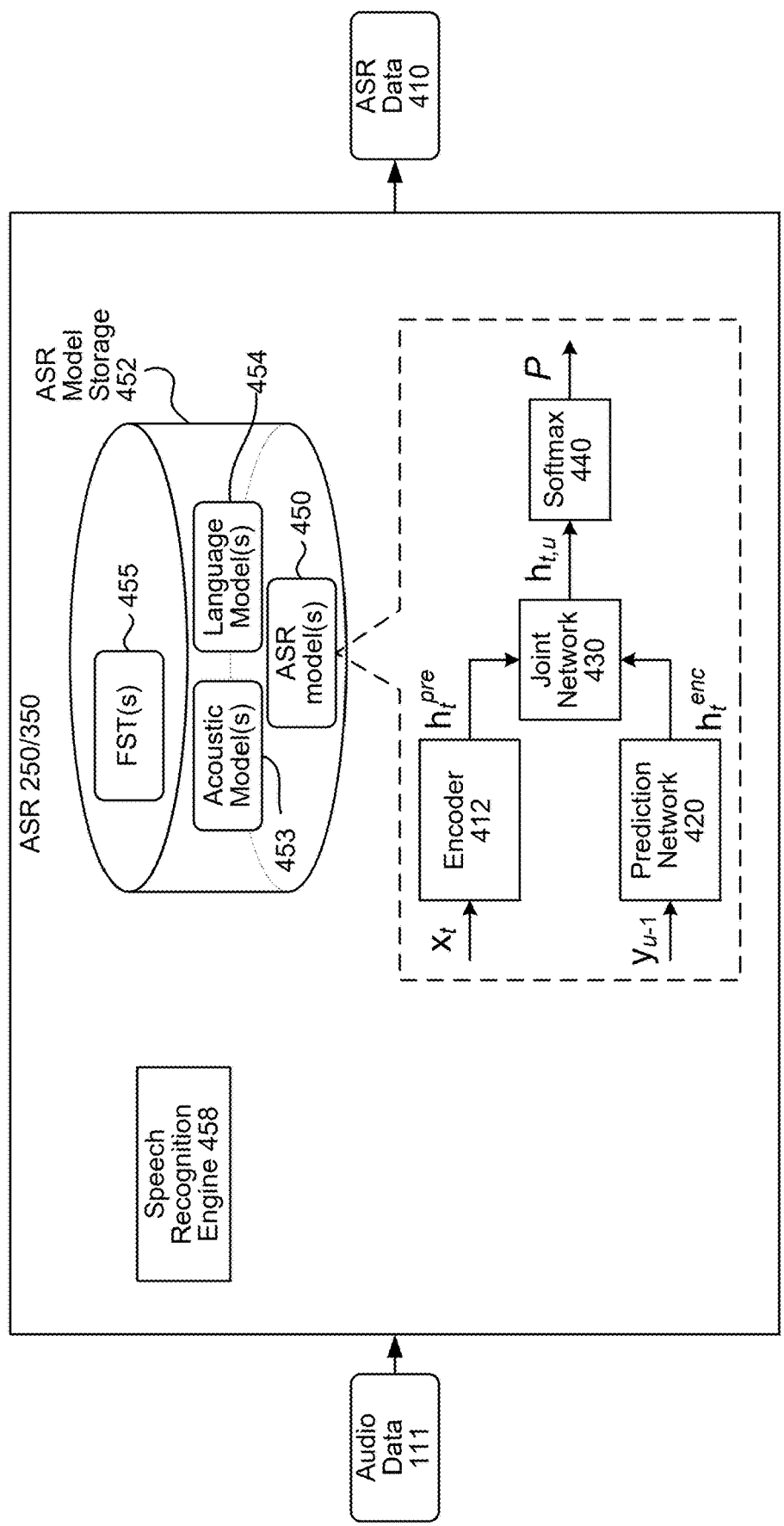
FIG. 4 is a conceptual diagram of an example ASR component, according to some embodiments of the present disclosure.

FIG. 4 is a conceptual diagram of an ASR component 250/360, according to embodiments of the present disclosure. The ASR component 250 may interpret a spoken natural language input based on the similarity between the spoken natural language input and pre-established language models 454 stored in an ASR model storage 452. For example, the ASR component 250 may compare the audio data with models for sounds (e.g., subword units or phonemes) and sequences of sounds to identify words that match the sequence of sounds spoken in the natural language input. Alternatively, the ASR component 250 may use a finite state transducer (FST) 455 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 453 stored in the ASR model storage 452), and the likelihood that a particular word, which matches the sounds, would be included in the sentence at the specific location (e.g., using a language or grammar model 454). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 458. The ASR component 250 may receive audio data 111 (for example, received from a local device 110 having processed audio detected by a microphone by an acoustic front end (AFE) or other component). The speech recognition engine 458 may compare the audio data 111 with one or more acoustic models 453, one or more language models 454, one or more FST(s) 455, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the system component(s) 120 encoded, in which case they may be decoded by the speech recognition engine 458 and/or prior to processing by the speech recognition engine 458.

In some implementations, the ASR component 250 may process the audio data 111 using one or more ASR models 450. The ASR model(s) 450 may include, for example, a recurrent neural network, such as an RNN-T. An example RNN-T architecture is illustrated in FIG. 4. The ASR model(s) 450 may predict a probability (y|x) of labels y= $(y_1, \ldots y_u)$ given acoustic features x=$(x_1, \ldots, x_t)$. During inference, the ASR model(s) 450 may generate an N-best list using, for example, a beam search decoding algorithm. The ASR model(s) 450 may include an encoder 412, a prediction network 420, a joint network 430, and a softmax 440. The encoder 412 may be similar or analogous to an acoustic model (e.g., similar to the acoustic model 453 described below), and may process a sequence of acoustic input features to generate encoded hidden representations. The prediction network 420 may be similar or analogous to a language model (e.g., similar to the language model 454 described below), and may process the previous output label predictions, and map them to corresponding hidden representations. The joint network 430 may be, for example, a feed forward neural network (NN) that may process hidden representations from both the encoder 412 and prediction network 420, and predict output label probabilities. The softmax 440 may be a function implemented (e.g., as a layer of the joint network 430) to normalize the predicted output probabilities.

The speech recognition engine 458 may process the audio data 111 with reference to information stored in the ASR model storage 452. Feature vectors of the audio data 111 may arrive at the system component(s) 120 encoded, in which case they may be decoded prior to processing by the speech recognition engine 458.

The speech recognition engine 458 may attempt to match received feature vectors to language acoustic units (e.g., phonemes) and words as known in the stored acoustic model(s) 453, the language model(s) 454, and the FST(s) 455. For example, audio data 111 may be processed by the acoustic model(s) 453 to determine acoustic unit data. The acoustic unit data may include indicators of acoustic units detected in the audio data 111 by the ASR component 250. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model(s) 454 (and/or using the FST(s) 455) to determine ASR data 410. The ASR data 410 may include one or more hypotheses. One or more of the hypotheses represented in the ASR data 410 may then be sent to further components (such as the NLU component 260) for further processing as discussed herein. The ASR data 410 may include representations of text of an utterance, such as words, subword units, or the like.

The speech recognition engine 458 may compute scores for the feature vectors based on acoustic information and language information. The acoustic information (such as identifiers for acoustic units and/or corresponding scores) may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 458 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 458 may use the acoustic model(s) 453 to attempt to match received audio feature vectors to words or subword acoustic units. An acoustic unit may be a senone, phoneme, phoneme in context, syllable, part of a syllable, syllable in context, or any other such portion of a word. The speech recognition engine 458 may compute recognition scores for the feature vectors based on acoustic information and language information. The acoustic information may be used to calculate an acoustic score representing a likelihood that the intended sound represented by a group of feature vectors match a subword unit. The language information may be used to adjust the acoustic score by considering what sounds and/or words are used in context with each other, thereby improving the likelihood that the ASR component 250 outputs ASR hypotheses that make sense grammatically.

The speech recognition engine 458 may use a number of techniques to match feature vectors to phonemes or other acoustic units, such as diphones, triphones, etc. One common technique involves the use of Hidden Markov Models (HMMs). HMMs may be used to determine probabilities that feature vectors match phonemes. Using HMMs, a number of states may be presented, in which the states together represent a potential phoneme (or other acoustic unit, such as a triphone) and each state may be associated with a model, such as a Gaussian mixture model or a deep belief network. Transitions between states may also have an associated probability, representing a likelihood that a current state may be reached from a previous state. Received sounds may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 458, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path may represent a progression of phonemes that potentially match the audio data represented by the feature vectors. One path may overlap with one or more other paths depending on the recognition scores calculated for each phoneme. Certain probabilities may be associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 458 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 5:
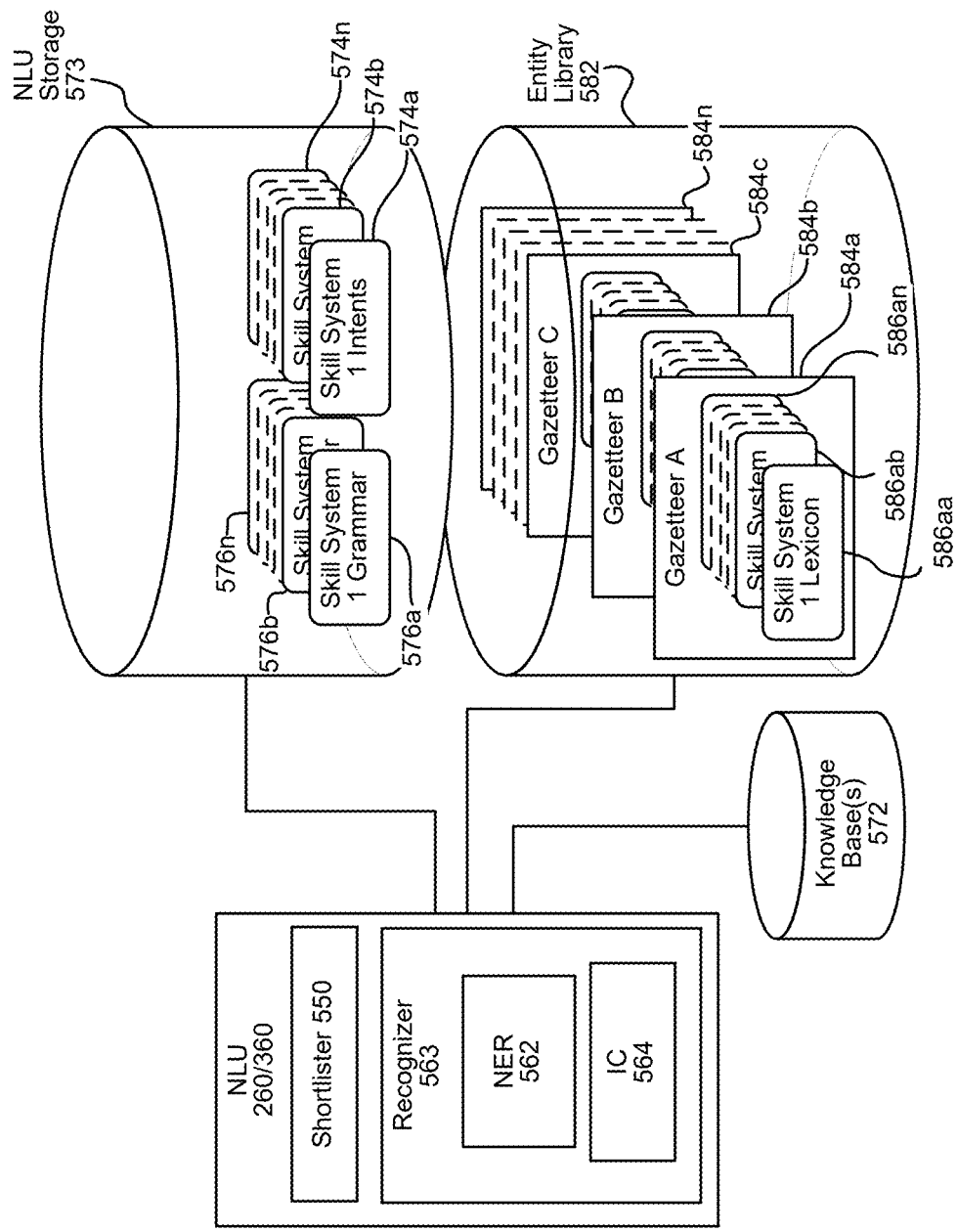
FIG. 5 is a conceptual diagram of how natural language processing may be performed, according to some embodiments of the present disclosure.
Figure 6:
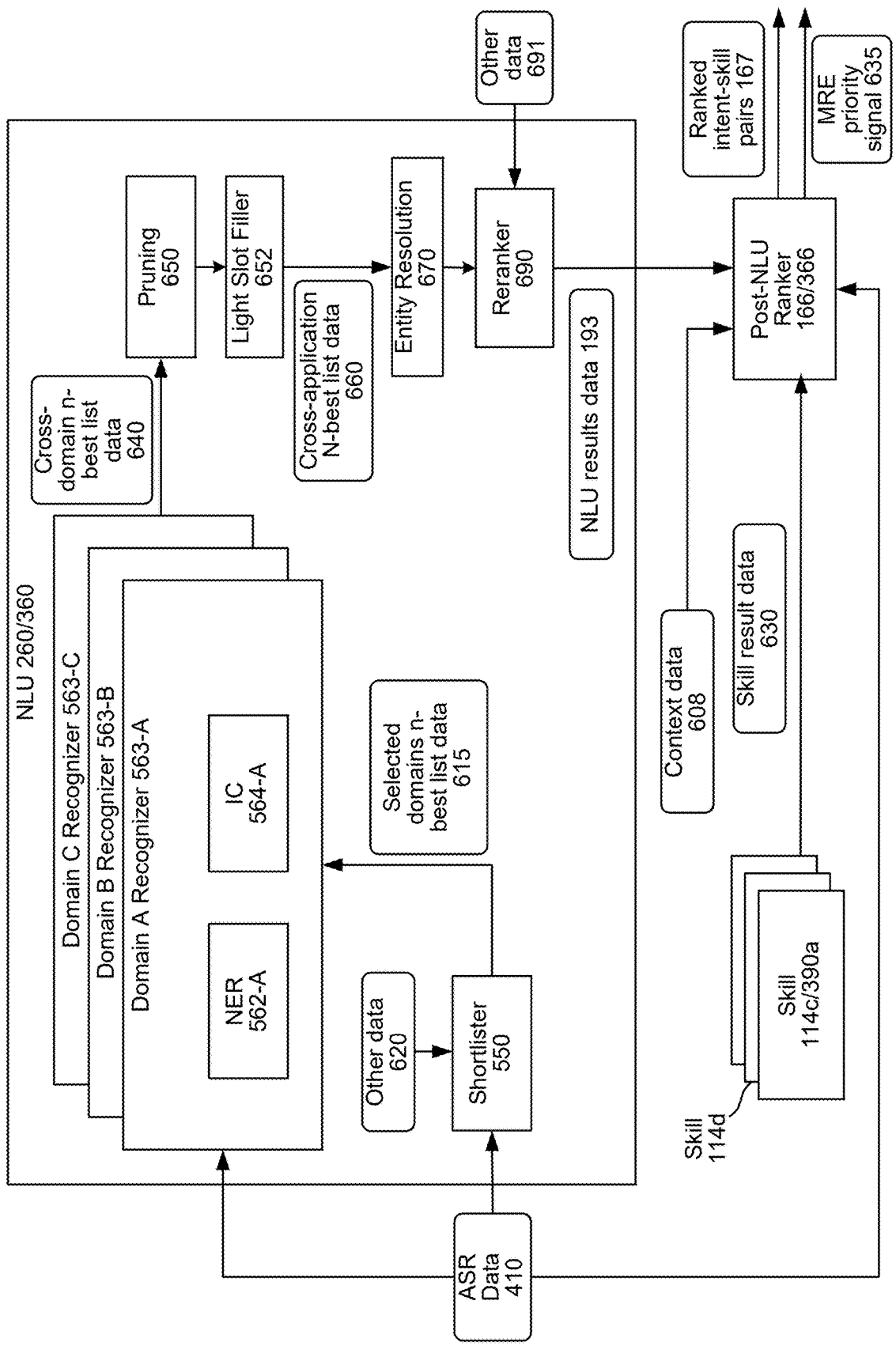
FIG. 6 is a conceptual diagram of how natural language processing may be performed, according to some embodiments of the present disclosure.
Figure 7:
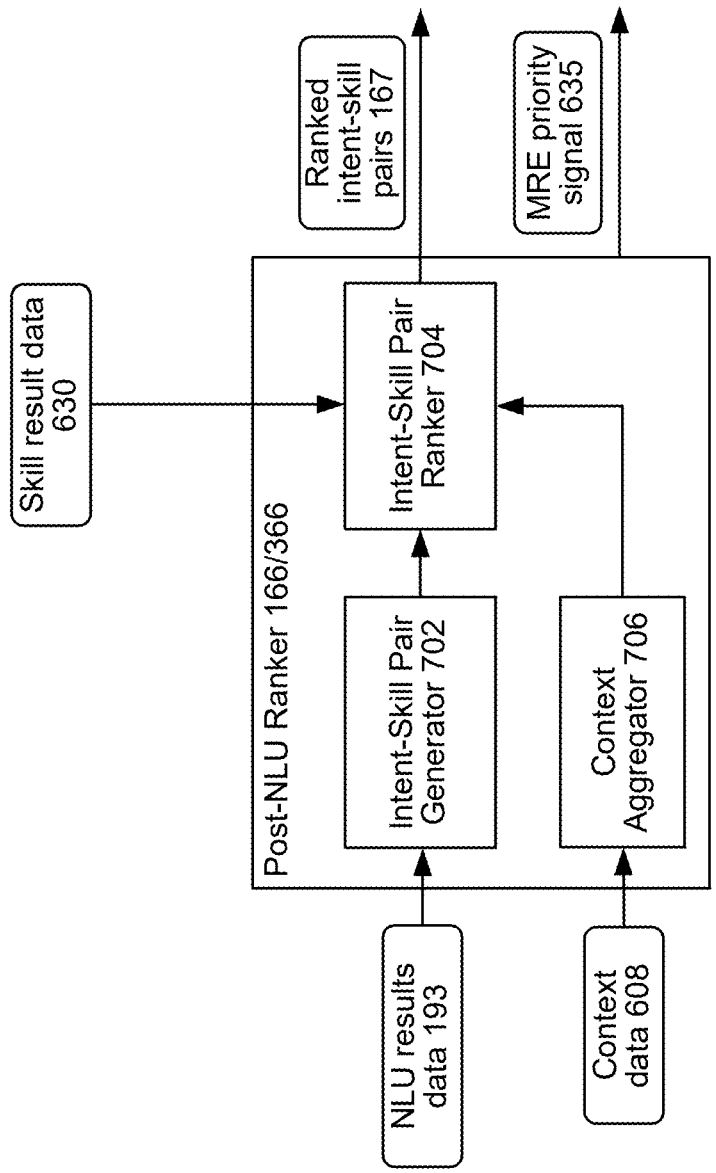
FIG. 7 is a conceptual diagram illustrating how the post-NLU ranker component shown in FIGS. 1B, 1C, 2, 3, and 6 may operate according to some embodiments of the present disclosure.

FIGS. 5 and 6 are conceptual diagrams illustrating how the NLU component 260/360 and related components, e.g., the post-NLU ranker component 166, may perform NLU processing. FIG. 7 is a conceptual diagram illustrating additional details of the post-NLU ranker component 166/366.

FIG. 5 illustrates how NLU processing may be performed on text data. The NLU component 260 may process text data including several ASR hypotheses of a single user input. For example, if the ASR component 250 outputs text data including an N-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may include a shortlister component 550. The shortlister component 550 may select skills that are likely able to execute with respect to ASR output data 410 input to the NLU component 260 (e.g., applications that are likely capable of executing with respect to the user input). The ASR output data 410 (which may also be referred to as ASR data 410) may include representations of text of an utterance, such as words, subword units, or the like. The shortlister component 550 may thus limit downstream, more resource intensive NLU processes to being performed with respect to skills that are likely able to execute with respect to the user input.

Without a shortlister component 550, the NLU component 260 may process ASR output data 410 input thereto with respect to every skill of the system, either in parallel, in series, or using some combination thereof. By implementing a shortlister component 550, the NLU component 260 may process ASR output data 410 with respect to only the skills that are likely capable of executing with respect to the user input. This reduces total compute power and latency attributed to NLU processing.

The shortlister component 550 may include one or more machine learning (ML) models. Such model(s) may be trained to recognize various forms of user inputs that may be received by the system component(s) 120. For example, during a training period, the skill support system component(s) 225 associated with a skill may provide the system component(s) 120 with training text data representing sample user inputs that may be provided by a user to invoke the skill. For example, for a ride sharing skill, the skill support system component(s) 225 associated with the ride sharing skill may provide the system component(s) 120 with training text data including text corresponding to "get me a cab to [location]," "get me a ride to [location]," "book me a cab to [location]," "book me a ride to [location]," etc. The ML model(s) that will be used by the shortlister component 550 may be trained, using the training text data representing sample user inputs, to determine other potentially related user input structures that users may try to use to invoke the particular skill. During training, the system component(s) 120 may solicit the skill support system component(s) 225 associated with the skill regarding whether the determined other user input structures are permissible, from the perspective of the skill support system component(s) 225, to be used to invoke the skill. The alternate user input structures may be derived by one or more ML models during model training and/or may be based on user input structures provided by different skills. The skill support system component(s) 225 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input.

Each ML model of the shortlister component 550 may be trained with respect to a different skill. Alternatively, the shortlister component 550 may use one ML model per domain, such as one ML model for skills associated with a weather domain, one ML model for skills associated with a ride sharing domain, etc.

The system component(s) 120 may use the sample user inputs provided by the skill support system component(s) 225, and related sample user inputs potentially determined during training, as binary examples to train a model associated with a skill associated with the skill support system component(s) 225. The model associated with the particular skill may then be operated at runtime by the shortlister component 550. For example, some sample user inputs may be positive examples (e.g., user inputs that may be used to invoke the skill). Other sample user inputs may be negative examples (e.g., user inputs that may not be used to invoke the skill).

As described above, the shortlister component 550 may include a different ML model for each skill of the system, a different ML model for each domain, or some other arrangement of ML model(s). For example, the shortlister component 550 may alternatively include a single ML model. The single ML model may include a portion trained with respect to characteristics (e.g., semantic characteristics) shared by all skills of the system. The single ML model may also include skill-specific portions, with each skill-specific portion being trained with respect to a specific skill of the system. Implementing a single ML model with skill-specific portions may result in less latency than implementing a different ML model for each skill because the single ML model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 550 to output indications of only a portion of the skills that the ASR output data 410 may relate to. For example, a user input may correspond to "tell me about Tom Collins." If the model is clustered based on domain, the shortlister component 550 may determine the user input corresponds to a recipe skill (e.g., a drink recipe) even though the user input may also correspond to an information skill (e.g., including information about a person named Tom Collins).

The NLU component 260 may include one or more recognizers 563. In at least some embodiments, a recognizer 563 may be associated with one or more skill support system components 225 (e.g., a given recognizer 563 may be configured to interpret text data corresponding to a particular skill support system component(s) 225). In at least some other examples, a recognizer 563 may be associated with a domain, such as smart home, video, music, weather, custom, etc. (e.g., a given recognizer 563 may be configured to interpret text data corresponding to a particular domain).

If the shortlister component 550 determines ASR output data 410 is potentially associated with multiple domains, the recognizers 563 associated with the domains may process the ASR output data 410, while recognizers 563 not indicated in the output of the shortlister component(s) 550 may not process the ASR output data 410. The "shortlisted" recognizers 563 may process the ASR output data 410 in parallel, in series, partially in parallel, etc. For example, if ASR output data 410 potentially relates to both a communications domain and a music domain, a recognizer 563 associated with the communications domain may process the ASR output data 410 in parallel, or partially in parallel, with a recognizer 563 associated with the music domain.

Each recognizer 563 may include a named entity recognition (NER) component 562. The NER component 562 may attempt to identify grammars and lexical information that may be used to construe meaning with respect to text data input therein. The NER component 562 may identify portions of text data that correspond to a named entity that is associated with a domain with which the recognizer 563 implementing the NER component 562 is associated. The NER component 562 (or other component of the NLU component 260) may also determine whether a word refers to an entity whose identity is not explicitly mentioned in the text data, for example "him," "her," "it" or other anaphora, exophora, or the like.

Each recognizer 563, and more specifically each NER component 562, may be associated with a particular grammar framework 576, a particular set of intents/actions 574, and a particular personalized lexicon 586. The grammar framework 576, and intents/actions 574 may be stored in an NLU storage 573. Each gazetteer 584 may include domain/skill-indexed lexical information associated with a particular user and/or device 110. For example, a Gazetteer A (584*a*) may include skill-indexed lexical information 586*aa* to 586*an*. A user's music domain lexical information might include album titles, artist names, and song names, for example, whereas a user's communications domain lexical information might include the names of contacts. Since every user's music collection and contact list is presumably different, this personalized information may improve later performed entity resolution.

An NER component 562 may apply information in the grammar framework 576 and lexical information 586 associated with a domain (associated with the recognizer 563 implementing the NER component 562) to determine a mention of one or more entities in text data. In this manner, the NER component 562 may identify "slots" (each corresponding to one or more particular words in text data) that may be useful for later processing. The NER component 562 may also label each slot with a type (e.g., noun, place, city, artist name, song name, etc.).

Each grammar framework 576 may include the names of entities (i.e., nouns) commonly found in speech about the particular domain to which the grammar framework 576 relates, whereas the lexical information 586 may be personalized to the user and/or the device 110 from which the user input originated. For example, a grammar framework 576 associated with a shopping domain may include a database of words commonly used when people discuss shopping.

A downstream process called entity resolution (discussed in detail elsewhere herein) may link a slot of text data to a specific entity known to the system. To perform entity resolution, the NLU component 260 may utilize gazetteer information (584*a*-584*n*) stored in an entity library storage 582. The gazetteer information 584 may be used to match text data (representing a portion of the user input) with text data representing known entities, such as song titles, contact names, etc. The gazetteers 584 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 563 may also include an intent classification (IC) component 564. An IC component 564 may parse text data to determine one or more intents (associated with the domain associated with the recognizer 563 implementing the IC component 564) that potentially represents the user input. An intent may represent an action a user desires be performed. An IC component 564 may communicate with a database of words linked to intents. For example, a music intent database may link words and phrases such as "quiet," "volume off," and "mute" to a <Mute> intent. An IC component 564 may identify potential intents by comparing words and phrases in text data (representing at least a portion of the user input) to the words and phrases in an intents database (associated with the domain that is associated with the recognizer 563 implementing the IC component 564).

The intents identifiable by a specific IC component 564 may be linked to domain-specific (e.g., the domain associated with the recognizer 563 implementing the IC component 564) grammar frameworks 576 with "slots" to be filled. Each slot of a grammar framework 576 may correspond to a portion of text data that the system believes corresponds to an entity. For example, a grammar framework 576 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 576 may not be structured as sentences, but rather based on associating slots with grammatical tags.

For example, an NER component 562 may parse text data to identify words as subject, object, verb, preposition, etc., based on grammar rules and/or models prior to recognizing named entities in the text data. An IC component 564 (implemented by the same recognizer 563 as the NER component 562) may use the identified verb to identify an intent. The NER component 562 may then determine a grammar model 576 associated with the identified intent. For example, a grammar model 576 for an intent corresponding to <PlayMusic> may specify a list of slots applicable to play the identified "object" and any object modifier (e.g., a prepositional phrase), such as {Artist Name}, {Album Name}, {Song name}, etc. The NER component 562 may then search corresponding fields in a lexicon 586 (associated with the domain associated with the recognizer 563 implementing the NER component 562), attempting to match words and phrases in text data the NER component 562 previously tagged as a grammatical object or object modifier with those identified in the lexicon 586.

An NER component 562 may perform semantic tagging, which is the labeling of a word or combination of words according to their type/semantic meaning. An NER component 562 may parse text data using heuristic grammar rules, or a model may be constructed using techniques such as Hidden Markov Models, maximum entropy models, log linear models, conditional random fields (CRF), and the like. For example, an NER component 562 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." In such case, the NER component 562 may identify "Play" as a verb based on a word database associated with the music domain, which an IC component 564 (also implemented by the music domain recognizer) may determine corresponds to a <PlayMusic> intent. At this stage, no determination has been made as to the meaning of "mother's little helper" or "the rolling stones," but based on grammar rules and models, the NER component 562 has determined the text of these phrases relates to the grammatical object (i.e., entity) of the user input represented in the text data.

An NER component 562 may tag text data to attribute meaning thereto. For example, an NER component 562 may tag "play mother's little helper by the rolling stones" as: {domain} Music, {intent}<PlayMusic>, {artist name} rolling stones, {media type} SONG, and {song title} mother's little helper. For further example, the NER component 562 may tag "play songs by the rolling stones" as: {domain} Music, {intent}<PlayMusic>, {artist name} rolling stones, and {media type} SONG.

As shown in FIG. 6, the shortlister component 550 may receive ASR output data 410 output from the ASR component 250 (or output from a device 110). The ASR component 250 may embed the ASR output data 410 into a form processable by the ML model(s) using sentence embedding techniques as known in the art. Sentence embedding results in the ASR output data 410 including text in a structure that enables the ML models of the shortlister component 550 to operate on the ASR output data 410. For example, an embedding of the ASR output data 410 may be a vector representation of the ASR output data 410.

The shortlister component 550 may make binary determinations (e.g., yes or no) regarding which domains relate to the ASR output data 410. The shortlister component 550 may make such determinations using the one or more of the ML models described above. In some implementations, if the shortlister component 550 implements a single ML model for each domain, the shortlister component 550 may simply run the models that are associated with enabled domains as indicated in a user profile associated with the device 110 and/or user that originated the user input.

As shown in FIG. 6, the shortlister component 550 may generate N-best list data 615 representing domains that are likely capable of exec with respect to the user input represented in the ASR output data 410. The size of the N-best list represented in the N-best list data 615 is configurable. In an example, the N-best list data 615 may indicate every domain of the system as well as contain an indication, for each domain, regarding whether the domain is likely capable of executing the user input represented in the ASR output data 410. In another example, instead of indicating every domain of the system, the N-best list data 615 may only indicate the domains that are likely to be able to execute the user input represented in the ASR output data 410. In yet another example, the shortlister component 550 may implement thresholding such that the N-best list data 615 may indicate no more than a maximum number of domains that are likely able to execute the user input represented in the ASR output data 410. In an example, the threshold number of domains that may be represented in the N-best list data 615 is ten. In another example, the domains included in the N-best list data 615 may be limited by a threshold a score, where only domains indicating a likelihood of being able to handle the user input is above a certain score (as determined by processing the ASR output data 410 by the shortlister component 550 relative to such domains) are included in the N-best list data 615.

The ASR output data 410 may correspond to more than one ASR hypothesis. When this occurs, the shortlister component 550 may output a different N-best list (represented in the N-best list data 615) for each ASR hypothesis. Alternatively, the shortlister component 550 may output a single N-best list representing the domains that are related to the multiple ASR hypotheses represented in the ASR output data 410.

As indicated above, the shortlister component 550 may implement thresholding such that the N-best list data 615 output therefrom includes no more than a threshold number of entries. If the ASR output data 410 includes more than one ASR hypothesis, the N-best list data 615 output by the shortlister component 550 may include no more than a threshold number of entries irrespective of the number of ASR hypotheses output by the ASR component 250. Alternatively or in addition, the N-best list data 615 output by the shortlister component 550 may include no more than a threshold number of entries for each ASR hypothesis (e.g., no more than five entries for a first ASR hypothesis, no more than five entries for a second ASR hypothesis, etc.).

In addition to making a binary determination regarding whether a domain likely relates to the ASR output data 410, the shortlister component 550 may generate confidence scores representing likelihoods that domains relate to the ASR output data 410. If the shortlister component 550 implements a different ML model for each domain, the shortlister component 550 may generate a different confidence score for each individual domain ML model that is run. If the shortlister component 550 runs ML models of every domain when ASR output data 410 is received, the shortlister component 550 may generate a different confidence score for each domain of the system. If the shortlister component 550 runs ML models of only the domains that are associated with skills indicated as enabled in a user profile associated with the device 110 and/or the user 105 who originated the user input, the shortlister component 550 may generate a different confidence score only for each domain that is associated with at least one enabled skill. If the shortlister component 550 implements a single ML model with domain specifically trained portions, the shortlister component 550 may generate a different confidence score for each domain for which a specifically trained portion is run. In some implementations, the shortlister component 550 may perform matrix vector modification to obtain confidence scores for all domains of the system in a single instance of processing of the ASR output data 410.

The N-best list data 615, including confidence scores, that may be output by the shortlister component 550 may be represented as, for example:

Search domain, 0.67
Recipe domain, 0.62
Information domain, 0.57
Shopping domain, 0.42

As indicated, the confidence scores output by the shortlister component 550 may be numeric values. The confidence scores output by the shortlister component 550 may alternatively be binned values (e.g., high, medium, low).

In some implementations, the N-best list data 615 may include entries only for domains having a confidence score satisfying (e.g., equaling or exceeding) a minimum threshold confidence score. Alternatively, the shortlister component 550 may include entries for all domains associated with user enabled skills, even if one or more of the domains are associated with confidence scores that do not satisfy the minimum threshold confidence score.

As illustrated in FIG. 6, the shortlister component 550 may consider other data 620 when determining which domains likely relate to the user input represented in the ASR output data 410 as well as respective confidence scores. The other data 620 may include, for example, usage history data associated with the device 110 and/or the user 105 who originated the user input. For example, a confidence score of a domain may be increased if user inputs originated by the device 110 and/or the user 105 routinely invoke that domain. Conversely, a confidence score of a domain may be decreased if user inputs originated by the device 110 and/or the user 105 rarely invoke the domain. Thus, the other data 620 may include an indicator of the user 105 associated with the ASR output data 410, for example, as determined by the user recognition component 295.

In some implementations, the other data 620 may be character embedded prior to being input to the shortlister component 550. The other data 620 may alternatively be embedded using other techniques known in the art prior to being input to the shortlister component 550.

The other data 620 may additionally or alternatively include data indicating the domains associated with skills that are enabled with respect to the device 110 and/or the user 105 who originated the user input. The shortlister component 550 may use such data to determine which domain-specific ML models to run. That is, the shortlister component 550 may determine to run only the ML models corresponding to domains that are associated with user-enabled skills. The shortlister component 550 may additionally or alternatively use such data to alter confidence scores of domains.

As an example, considering two domains, e.g., a first domain associated with at least one enabled skill and a second domain not associated with any user-enabled skills of the user 105 who originated the user input, the shortlister component 550 may run a first ML model specific to the first domain as well as a second ML model specific to the second domain. Alternatively, the shortlister component 550 may run an ML model configured to determine a score for each of the first and second domains. The shortlister component 550 may determine the same confidence score for the first and second domains in the first instance. The shortlister component 550 may then alter those confidence scores based on which domains is associated with at least one skill enabled by the present user. For example, the shortlister component 550 may increase the confidence score associated with the domain associated with at least one enabled skill while leaving the confidence score associated with the other domain unchanged. Alternatively, the shortlister component 550 may leave the confidence score associated with the domain associated with at least one enabled skill unchanged while decreasing the confidence score associated with the other domain. Moreover, the shortlister component 550 may increase the confidence score associated with the domain associated with at least one enabled skill as well as decrease the confidence score associated with the other domain.

As indicated, a user profile may indicate which skills a corresponding user 105 has enabled (e.g., authorized to execute using data associated with the user). Such indications may be stored in the profile storage 270. When the shortlister component 550 receives the ASR output data 410, the shortlister component 550 may determine whether profile data associated with the user 105 and/or the device 110 that originated the command includes an indication of enabled skills.

The other data 620 may additionally or alternatively include data indicating the type of the device 110. The type of a device 110 may indicate the output capabilities of the device 110. For example, a type of device 110 may correspond to a device 110 with a visual display, a headless (e.g., displayless) device, whether a device 110 is mobile or stationary, whether a device 110 includes audio playback capabilities, whether a device 110 includes a camera, other device hardware configurations, etc. The shortlister component 550 may use such data to determine which domain-specific ML models to run. For example, if the device 110 corresponds to a displayless type device, the shortlister component 550 may determine not to run ML models specific to domains that output video data. The shortlister component 550 may additionally or alternatively use such data to alter confidence scores of domains.

As an example, considering two domains, e.g., one that outputs audio data and another that outputs video data, the shortlister component 550 may run a first ML model specific to the domain that generates audio data as well as a second ML model specific to the domain that generates video data. Alternatively, the shortlister component 550 may run a model configured to determine a score for each such domain. The shortlister component 550 may determine a same confidence score for each of the domains in the first instance. The shortlister component 550 may then alter the original confidence scores based on the type of the device 110 that originated the user input corresponding to the ASR output data 410. For example, if the device 110 is a displayless device, the shortlister component 550 may increase the confidence score associated with the domain that generates audio data while leaving the confidence score associated with the domain that generates video data unchanged. Alternatively, if the device 110 is a displayless device, the shortlister component 550 may leave the confidence score associated with the domain that generates audio data unchanged while decreasing the confidence score associated with the domain that generates video data. Moreover, if the device 110 is a displayless device, the shortlister component 550 may increase the confidence score associated with the domain that generates audio data as well as decrease the confidence score associated with the domain that generates video data.

The type of device 110 information represented in the other data 620 may additionally or alternatively represent output capabilities of the device 110 to be used to output content to the user 105, which may not necessarily be the user input originating device 110. For example, a user 105 may input a spoken user input corresponding to "play Game of Thrones" to a device 110 not including a display. The system 100 may determine a smart TV or other display device (associated with the same user profile) for outputting Game of Thrones. Thus, the other data 620 may represent the smart TV of other display device, and not the displayless device 110 that captured the spoken user input.

The other data 620 may also include data indicating the user input originating device's speed, location, or other mobility information. For example, the device 110 may correspond to a vehicle including a display. If the vehicle is moving, the shortlister component 550 may decrease the confidence score associated with a domain that generates video data as it may be undesirable to output video content to a user while the user 105 is driving. The device 110 may output data to the system component(s) 120 indicating when the device 110 is moving.

The other data 620 may additionally or alternatively include data indicating a currently invoked domain. For example, a user 105 may speak a first (e.g., a previous) user input causing the system 100 to invoke a music domain skill to output music to the user 105. As the system 100 is outputting music to the user 105, the system 100 may receive a second (e.g., the current) user input. The shortlister component 550 may use such data to alter confidence scores of domains. For example, the shortlister component 550 may run a first ML model specific to a first domain as well as a second ML model specific to a second domain. Alternatively, the shortlister component 550 may run an ML model configured to determine a score for each such domain. The shortlister component 550 may determine the same confidence score for each of the domains in the first instance. The shortlister component 550 may then alter the original confidence scores based on the first domain being invoked to cause the system 100 to output content while the current user input was received. Based on the first domain being invoked, the shortlister component 550 may (i) increase the confidence score associated with the first domain while leaving the confidence score associated with the second domain unchanged, (ii) leave the confidence score associated with the first domain unchanged while decreasing the confidence score associated with the second domain, or (iii) increase the confidence score associated with the first domain as well as decrease the confidence score associated with the second domain.

In some implementations, the thresholding implemented with respect to the N-best list data 615 generated by the shortlister component 550 as well as the different types of other data 620 considered by the shortlister component 550 may be configurable. For example, the shortlister component 550 may update confidence scores as more other data 620 is considered. For further example, the N-best list data 615 may exclude relevant domains if thresholding is implemented. Thus, for example, the shortlister component 550 may include an indication of a domain in the N-best list 615 unless the shortlister component 550 is one hundred percent confident that the domain is not capable of executing the user input represented in the ASR output data 410 (e.g., when the shortlister component 550 determines a confidence score of zero for the domain).

As illustrated in FIG. 6, the shortlister component 550 may send the ASR output data 410 to the recognizers 563 associated with domains represented in the N-best list data 615. Alternatively, the shortlister component 550 may send the N-best list data 615 or some other indicator of the selected subset of domains to another component (such as the orchestrator component 112) which may in turn send the ASR output data 410 to the recognizers 563 corresponding to the domains included in the N-best list data 615 or otherwise indicated in the indicator. If the shortlister component 550 generates N-best list data 615 representing domains without any associated confidence scores, the shortlister component 550/orchestrator component 112 may send the ASR output data 410 to recognizers 563 associated with domains that the shortlister component 550 determines are likely capable of executing the user input. If the shortlister component 550 generates N-best list data 615 representing domains with associated confidence scores, the shortlister component 550/orchestrator component 112 may send the ASR output data 410 to recognizers 563 associated with domains associated with confidence scores satisfying (e.g., meeting or exceeding) a threshold minimum confidence score.

A recognizer 563 may output tagged text data generated by an NER component 562 and an IC component 564, as described above. The NLU component 260 may compile the output tagged text data of the recognizers 563 into a single cross-domain N-best list 640 and may send the cross-domain N-best list 640 to a pruning component 650. Each entry of tagged text (e.g., each NLU hypothesis) represented in the cross-domain N-best list data 640 may be associated with a respective score indicating a likelihood that the NLU hypothesis corresponds to the domain associated with the recognizer 563 from which the NLU hypothesis was output. For example, the cross-domain N-best list data 640 may be represented as (with each line corresponding to a different NLU hypothesis):

[0.95] Intent: <PlayMusic> ArtistName: Beethoven SongName: Waldstein Sonata

[0.70] Intent: <Play Video> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 650 may sort the NLU hypotheses represented in the cross-domain N-best list data 640 according to their respective scores. The pruning component 650 may perform score thresholding with respect to the cross-domain NLU hypotheses. For example, the pruning component 650 may select NLU hypotheses associated with scores satisfying (e.g., meeting and/or exceeding) a threshold score. The pruning component 650 may additionally or alternatively perform a number of other NLU hypothesis thresholding steps. For example, the pruning component 650 may select the top scoring NLU hypothesis(es). The pruning component 650 may output a portion of the NLU hypotheses input thereto. The pruning component 650 may thus operate primarily to create a reduced list of NLU hypotheses so that downstream, more resource intensive processes need only operate on the NLU hypotheses that most likely represent the user's intent.

The NLU component 260 may include a light slot filler component 652. The light slot filler component 652 may take text from slots represented in the NLU hypotheses output by the pruning component 650 and alter them to make the text more easily processed by downstream components. The light slot filler component 652 may perform low latency operations that do not involve heavy operations such as reference to a knowledge base (e.g., a knowledge base 572). The light slot filler component 652 may operate primarily to replace words with other words or values that may be more easily understood by downstream components. For example, if a NLU hypothesis includes the word "tomorrow," the light slot filler component 652 may replace the word "tomorrow" with an actual date for purposes of downstream processing. Similarly, the light slot filler component 652 may replace the word "CD" with "album" or the words "compact disc." The replaced words may then be included in the cross-domain N-best list data 660.

The cross-domain N-best list data 660 may be input to an entity resolution component 670. The entity resolution component 670 may apply rules or employ other techniques to standardize labels or tokens from previous stages into an intent/slot representation. The precise transformation may depend on the domain. For example, for a travel domain, the entity resolution component 670 may transform text corresponding to "Boston airport" to the standard BOS three-letter code referring to the airport. The entity resolution component 670 may refer to a knowledge base (e.g., a knowledge base 572) that can be used to specifically identify the precise entity referred to in each slot of each NLU hypothesis represented in the cross-domain N-best list data 660. Specific intent/slot combinations may also be tied to a particular source, which may then be used to resolve the text. In the example "play songs by the stones," the entity resolution component 670 may reference a personal music catalog, an Amazon Music account, a user profile, or the like. The entity resolution component 670 may output an altered N-best list that is based on the cross-domain N-best list 660 but that includes more detailed information (e.g., entity IDs) about the specific entities mentioned in the slots and/or more detailed slot data that can eventually be used by a skill. In some implementations, the NLU component 260 may include multiple entity resolution components 670, e.g., with each entity resolution component 670 being specific to one or more domains.

The NLU component 260 may further include a reranker 690. The reranker 690 may assign a particular confidence score to each NLU hypothesis input thereto, e.g., from one or more entity resolutions components 670. The confidence score of a particular NLU hypothesis may be affected by whether the NLU hypothesis has unfilled slots. For example, if an NLU hypothesis includes slots that are all filled/resolved, that NLU hypothesis may be assigned a higher confidence score than another NLU hypothesis including at least some slots that are unfilled/unresolved by the entity resolution component 670.

The reranker 690 may apply re-scoring, biasing, and/or other techniques. The reranker 690 may consider not only the data output by the entity resolution component(s) 670, but may also consider other data 691. The other data 691 may include a variety of information. For example, the other data 691 may include skill rating or popularity data. For example, if one skill has a high rating, the reranker 690 may increase the score of an NLU hypothesis that may be processed by the skill. The other data 691 may additionally or alternatively include information about skills that have been enabled by the user 105 that originated the user input. For example, the reranker 690 may assign higher scores to an NLU hypothesis that may be processed by enabled skills than an NLU hypothesis that may be processed by non-enabled skills. The other data 691 may also include data indicating user usage history, such as if the user that originated the user input regularly uses a particular skill or does so at particular times of day. The other data 691 may additionally or alternatively include data indicating a date, a time of day, a location, weather data, a type of device 110, a user identifier, and/or other contextual data, and possibly other information. For example, the reranker 690 may consider when any particular skill is currently active (e.g., music being played, a game being played, etc.).

As illustrated and described, in some implementations, the entity resolution component 670 may be implemented prior to the reranker 690. The entity resolution component 670 may, however, alternatively be implemented after the reranker 690. Implementing the entity resolution component 670 after the reranker 690 may serve to limit the NLU hypotheses processed by the entity resolution component 670 to only those hypotheses that successfully pass through the reranker 690.

The reranker 690 may be a global reranker (e.g., one that is not specific to any particular domain). Alternatively, the NLU component 260 may implement one or more domain-specific rerankers. Each domain-specific reranker may rerank NLU hypotheses associated with a respective domain. Each domain-specific reranker may output an N-best list of reranked hypotheses (e.g., 5-10 hypotheses).

The NLU component 260 may perform the NLU processing described above with respect to domains associated with skills wholly implemented as part of the system component(s) 120 (e.g., designated 114 in FIG. 2). The NLU component 260 may separately perform the NLU processing described above with respect to domains associated with skills that are at least partially implemented as part of the skill support system component(s) 225. In an example, the shortlister component 550 may process only with respect to these latter domains. Results of these two NLU processing paths may be merged into NLU results data 193, which may be sent to a post-NLU ranker component 166, which may be implemented by the system component(s) 120.

The post-NLU ranker component 166 may include a statistical component that produces ranked intent-skill pairs 167 with associated confidence scores. Example configurations and operations of the post-NLU ranker component 166 are shown in FIG. 7. As shown in FIG. 7, when the post-NLU ranker component 166 receives NLU results data 193, the NLU results data 193 may be sent to an intent-skill pair generator 702. The intent-skill pair generator 702 may include information about what skills are capable of handling what intents. Such information may be context agnostic, and may thus indicate what skills are capable of handling what intents generally, without regard to the context associated with the user input. The intent-skill pair generator 702 may thus receive the NLU results data 193 and identify what particular candidate skills may handle the intent for the respective NLU hypotheses. For example, if a NLU hypothesis includes a particular intent, the intent-skill pair generator 702 may identify each skill that can execute with respect to the intent. For further example, if the NLU results data 193 include multiple NLU hypotheses corresponding to multiple intents, the intent-skill pair generator 702 may associate each different NLU hypothesis with each skill that can execute with respect to the respective NLU hypotheses. As illustrated, in some implementations, the intent-skill pair generator 702 may be implemented as part of the post-NLU ranker component 166. In other implementations, the intent-skill pair generator 702 may instead be implemented as part of the NLU component 260 or in another component (e.g., the orchestrator component 112) without departing from the present disclosure. In such a case, the NLU results data 193 may include intent-skill pairs.

The post-NLU ranker component 166 may also include an intent-skill pair ranker 704 configured to rank the intent-skill pairs generated by the intent-skill pair generator 702 to determine ranked intent-skill pairs 167. The ranking performed by the intent-skill pair ranker 704 may be based on, for example, the number of filled slots of an NLU hypothesis, an NLU confidence score associated with an NLU hypothesis, context information output by a context aggregator 706, and/or other data.

The post-NLU ranker component 166 may include the context aggregator 706. The context aggregator 706 may receive context data 608 from various contextual sources. The context data 608 may include time data, which may represent a time of receipt of the user input by the device 110, a time of receipt of the user input by the system component(s) 120, a user identifier associated with the user input, a device identifier of the device 110, whether other devices are linked to the device 110, and/or other information. The context aggregator 706 may aggregate the context data 608 and put the context data 608 in a form that can be processed by the intent-skill pair ranker 704. Context data 608 may include data obtained from the device 110 or from other services connected to the system component(s) 120.

The system 100 may be configured with thousands, tens of thousands, etc., of skills. The intent-skill pair ranker 704 may enable the system 100 to better determine the best skill to execute the user input. For example, first and second NLU hypotheses in the NLU results data 193 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The context data 608 may include skill availability data. Such information may indicate what skills are available and authorized to process the user input. For example, if the user 105 has enabled only certain skills, the enabled skills may be noted in the skill availability data.

The context data 608 may also include dialogue data. A "dialogue" or "dialogue session," as used herein, may refer to data transmissions (such as relating to multiple user inputs and system(s) 120 outputs) between the system component(s) 120 and a local device (e.g., the device 110) that all relate to a single originating user input. Thus, the data transmissions of a dialogue session may share a dialogue identifier or other unique identifier that may be used by the orchestrator component 112, the skill component(s) 114, the skill support system component(s) 225, etc., to track information across the dialogue session. For example, the device 110 may send the system component(s) 120 data corresponding to "Alexa, play jeopardy." The system component(s) 120 may output data corresponding to a jeopardy statement to the device 110 for output to one or more users 5. A user 105 may then respond to the statement, and the device 110 may send data corresponding to the response to the system component(s) 120. The sending of data from the device 110 to the system component(s) 120 and the sending of data from the system component(s) 120 to the device 110 may all correspond to a single dialogue session related to the originating user input "play jeopardy." In some examples, a dialogue-initiating user input may start with a wakeword and end with a command, such as "Alexa, play jeopardy," where "Alexa" is the wakeword and "play jeopardy" is the command. Subsequent user inputs of the same dialogue session may or may not start with speaking of a wakeword. Each user input of a dialogue may be associated with a unique user input identifier such that multiple user input identifiers may be associated with a single dialogue session identifier.

Dialogue data may include interactive focus information, (e.g., representing which skill was most recently invoked to execute a previous user input for the user and/or device 110 associated with the present user input). Dialogue data may also include content focus information (e.g., representing a skill that is streaming data to the device 110 when the data corresponding to the current user input is received by the system component(s) 120). The context data 608 may be one portion of the data used by the intent-skill pair ranker 704 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 608 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may additionally or alternatively represent a skill with which the device 110 is associated. The device data may additionally or alternatively indicate whether the device 110 is currently streaming data or was streaming data when the user input was received and sent to the system component(s) 120. The context data 608 may include a metadata flag/indicator that represents whether the particular skill being executed is one that can handle a go-back (or other navigational) request.

The context data 608 may additionally or alternatively include user profile data. The user profile data may represent preferences and/or characteristics of the user that originated the current user input. Such data may be received from the profile storage 270.

The context data 608 may additionally or alternatively include information indicating a location of the device and/or user that originated the user input. The system may be configured with skills 114/390 that may only operate with respect to certain geographic locations. For example, a user may provide a user input corresponding to "when is the next train to Portland." A first skill component 114c may operate with respect to trains that arrive at, depart from, and pass through Portland, Oregon. A second skill component 114d may operate with respect to trains that arrive at, depart from, and pass through Portland, Maine. If the device and/or user that originated the user input is located in Seattle, Washington, the post-NLU ranker component 166 may increase the NLU processing confidence score associated with the first skill component 114c and/or decrease the NLU processing confidence score associated with the second skill component 114d. Likewise, if the device and/or user that originated the user input is located in Boston, Massachusetts, the post-NLU ranker component 166 may increase the NLU processing confidence score associated with the second skill component 114d and/or decrease the NLU processing confidence score associated with the first skill component 114c.

The context data 608 may additionally or alternatively include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

For example, while interacting with the system 100, the user may refer to an entity involved in a previous exchange in a manner that is not explicit. For example, after the system 100 answers a query with the location of the nearest Starbucks, the user 105 may wish to know the hours for that Starbucks and may ask the system "how late are they open?" Even though the user 105 did not explicitly state what "they" refers to, the user 105 may expect the system 100 to provide the hours (or the closing time) of the Starbucks that was just part of an exchange between the user 105 and the system 100. In another example, after asking the system 100 to "play Beethoven's 5$^{th}$ Symphony" the user 105 may ask the system 100 "when did he write that?" In order to answer the second query, the system 100 must understand that "he" refers to Beethoven and "that" refers to the musical work 5$^{th}$ Symphony. Words that refer to an entity but do not explicitly name the entity are an example of anaphora, namely a word referring to or replacing another word.

Other references to other text may additionally or alternatively be processed by the system 100. For example, exophora is a reference in text to something external to the text, endophora is a reference to something preceding or following the reference within the text, and cataphora is a reference to a following word or group or words. The system 100 may be configured to process these, and other similar types of references (which may generally be referred to below as anaphora). Further, while a language such as English may use unknown words to substitute for anaphora/ (e.g., pronouns), other languages, such as Japanese may allow phrasing of anaphora without a specific word to represent the anaphora (referred to as zero-phrase anaphora), and other languages may use other forms of reference. The system 100 may be used to resolve many such forms of anaphora across many different languages.

The context data 608 may additionally or alternatively include data regarding whether one or more skills are "in focus." A skill may be in interactive focus, meaning the skill was the most recent skill that executed a user input for a user 105 or a device 110 associated with a present user input and/or the skill may be involved with an open dialogue (e.g., series of user inputs and responses) with a particular device 110. Interactive focus attempts to continue a conversation between a user 105 and the system 100 and/or a skill for purposes of processing the dialogue. However, there may be instances where a user 105 inputs a command that may be handled by a skill that is currently in interactive focus, but which the user 105 does not intend to be executed by such skill. The system may process the context data 608 and other data to determine how best to process a user input when one or more skills may be in focus.

A skill may alternatively be in content focus, meaning the skill is associated with content that is streaming to the user 105 and/or the device 5 associated with a current user input when the current user input is received by the system 100. For example, a previous user input of "Play music" may result in the system 100 streaming music to a device 110 from a specific music skill. While the skill is streaming the music, the same user 105 may input a second user input. Since the second user input was received when the music skill was streaming the music, the system 100 may query that music skill in the first instance, even if the second user input is not necessarily intended for the music skill. The music skill may be configured to attempt to execute the subsequent user input (and potentially output an error) even though the user 105 may have intended another skill to execute such user input.

The context data 608 and/or other data 620/691 may also include information regarding what is being presented on the display 102 of device 110. For example, such data may include information indicating what GUI elements 104/106/108 are being presented on the display 102 and potentially in what order such that if a user speaks a command like "Alexa, do the third one" the system can use the information about what appears on the display 102 to interpret the utterance to execute a command/action associated with a third GUI element on the display. Further, the context data 608 and/or other data 620/691 may also include information regarding the precise skills being referenced, images being shown, text being displayed, or other information about the display 102, GUI elements 104/106/108, or the like. For example, some metadata may be associated with what is being shown on the display 102, such as a GUI element associated with a specific skill, an image of a particular object (hairbrush, album cover, artist image, etc.), text in a specific color, etc. Such metadata may be included in the context data 608 and/or other data 620/691 (or other data) usable by the system to interpret an utterance such as "Alexa, order the red hairbrush" or "Alexa, tell me more about that news article" which refers to an item shown on the display 102. The metadata may be used to identify the correct item/information shown on the display 102 and properly respond to the user's utterance.

The context data 608 may additionally or alternatively include other data not explicitly noted herein, such as one or more portions of the other data 620 described above.

The intent-skill pair ranker 704 may operate one or more ML models that are configured to process the intent-skill pairs generated by the intent-skill pair generator 702, the skill result data 630, and context data 608 aggregated by the context aggregator 706 in order to determine the ranked intent skill pairs 167. The intent-skill pair ranker 704 may send queries to candidate skills 114 identified by the intent-skill pair generator 702 (e.g. a first skill component 114c and a second skill component 114d-shown in FIG. 6), to provide potential result data indicating whether the skill component 114 can handle the intent at the particular moment and if so, what the output data for the particular skill would be (e.g., data the skill would provide to a user 105 if the skill component 114 were selected to execute the user input) based on the NLU results data 193. For example, the intent-skill pair ranker 704 may send a first NLU hypothesis, associated with the first skill component 114c, to the first skill component 114c along with a request for the first skill component 114c to at least partially execute with respect to the first NLU hypothesis. The intent-skill pair ranker 704 may also send a second NLU hypothesis, associated with the second skill component 114d, to the second skill component 114d along with a request for the second skill component 114d to at least partially execute with respect to the second NLU hypothesis.

The intent-skill pair ranker 704 may receive, from the first skill component 114c, first result data 630a generated from the first skill's execution with respect to the first NLU hypothesis. The intent-skill pair ranker 704 may also receive, from the second skill component 114d, second results data 630b generated from the second skill's execution with respect to the second NLU hypothesis. Based on the first results data 630a, a first NLU confidence score associated with the first NLU hypothesis, the second results data 630b, a second NLU confidence score associated with the second NLU hypothesis, and the context data 608 aggregated by the context aggregator 706, the intent-skill pair ranker 704 may determine ranked intent-skill pairs 167. The output of the intent-skill pair ranker 704 may thus represent a ranked list of intent-skill pairs (e.g., ranked from best to worst) for executing the current user input. In some implementations, each of the intent-skill pairs represented in the ranked intent-skill pairs 167 may be include a corresponding confidence score determined by the intent-skill pair ranker 704, e.g., by adjusting the NLU confidence scores reflected in the NLU results data 193 based on the skill result data 630 and/or the context data 608.

In some implementations, the post-NLU ranker component 166 may additionally generate an MRE priority signal 635 which, as described in more detail below, may be used by the MRE plan determination component 146 and/or the MRE shortlister component 140 to determine whether to invoke an MRE interaction. The MRE priority signal 635 may represent a priority for displaying an MRE output as determined by the post-NLU ranker component 166. The post-NLU ranker component 166 may include component(s) that can evaluate various data (such as NLU likelihood scores, audio quality, an indication of multiple uncertainties, context data 608, etc.) to determine whether the particular situation calls for an MRE interaction. The MRE priority signal 635 may include a numerical value (e.g., 0-1) to indicate the priority or may indicate another value (e.g., low, medium, or high). In some implementations, the MRE priority signal 635 may be sent to, and used by, the MRE plan determination component 146 as one input for the MRE plan determination component 146 to process when determining the MRE plan 124.

As illustrated in FIG. 8, in some implementations, the ranked intent-skill pairs 167 may be sent to an ambiguity identifier component 142. Skill support system components 225, represented in the ranked intent-skill pairs 167, may correspond to different domains, or all the skill support system components 225 may correspond to a single domain.

The ambiguity identifier component 142 may be configured to determine whether the ranked intent-skill pairs 167 are sufficiently disambiguated (e.g., the confidence scores of the top-scoring ranked intent-skill pairs 167 are sufficiently spread out) such that the ambiguity identifier component 142 is sufficiently confident that the top-scoring skill support system component 225 (e.g., corresponding to the top-ranked intent-skill pair in the ranked intent-skill pairs 167) is to be invoked rather than a different skill support system component 225 (represented in the ranked intent-skill pairs 167). In situations where the ambiguity identifier component 142 determines the ranked intent-skill pairs 167 are not sufficiently disambiguated, the ambiguity identifier component 142 may determine what information is needed from a user to sufficiently disambiguate the intent-skill pairs 167. Policies, implemented by the ambiguity identifier component 142, may be generated from configured rules and/or statistical models.

The ambiguity identifier component 142 may include a context accumulator component 810. The context accumulator component 810 may query a context storage 820 for context data 805. The context data 805 may include various pieces of contextual information that may influence processing of other components of the ambiguity identifier component 142. For example, the context accumulator component 810 may query the context storage 820 for context data 805 associated with top-scoring user identifier output by the user recognition component 295, and representing one or more previous instances when the received ranked intent-skill pairs 167 were previously received from the post-NLU ranker component 166 (e.g., via the orchestrator component 112). Such contextual information may influence processing of other components of the ambiguity identifier component 142 because, if the context data 805 represents a previous instance when the ranked intent-skill pairs 167 were received and a certain skill support system component 225 was invoked to execute, the ambiguity identifier component 142 may determine that skill support system component 225 should be invoked at present as well. Other types of contextual information may additionally or alternatively be represented in the context data 805.

Context data 805, in the context storage 820, representing a previous instance when a skill support system component 225, corresponding to one pair in ranked intent-skill pairs 167, was invoked may have a decay algorithm applied thereto. The decay algorithm may cause a weighting, applied to such context data 805 in calculations by components of the ambiguity identifier component 142, to decrease over time. This is based on the premise that context data 805 may become less relevant as time transpires from when the context data 805 was stored in the context storage 820. The decay rate applied to a given context data type may be determined using a statistical model.

The context accumulator component 810 may send, to an evaluation component 830 of the ambiguity identifier component 142, the ranked intent-skill pairs 167 and the context data 805. The evaluation component 830 may implement one or more rules and/or one or more trained models for evaluating whether scores, in the ranked intent-skill pairs 167, are sufficiently separated such that the evaluation component 830 may determine, with at least a threshold confidence, that one or more skill support system components 225, corresponding to the top-scoring intent-skill pair in the ranked intent-skill pairs 167, is to be invoked to execute. In other words, the evaluation component 830 may determine whether a difference between scores, of the ranked intent-skill pairs 167, is less than a threshold difference.

In at least some examples, the threshold difference may be configurable based on the context data 805. For example, the threshold difference may be less if the context data 805 represents a previous instance of the same ranked intent-skill pairs 167 in which a skill support system component 225 was invoked. This is because such context data may provide the evaluation component 830 with greater confidence (represented by the smaller threshold difference that need be satisfied) that that same skill support system component 225 is to be invoked in the present instance.

If the evaluation component 830 determines a difference between two or more of the greatest scores, in the intent-skill pairs 167, satisfies (e.g., meets or exceeds) the threshold difference, the evaluation component 830 may determine that the NLU results are not ambiguous enough to warrant interrupting the user 105 with a question. If, instead, the evaluation component 830 determines a difference between two or more of the greatest scores, in the intent-skill pairs 167, fails to satisfy the threshold difference, the evaluation component 830 may send, to a decision component 840 of the ambiguity identifier component 142, at least the two top-scoring intent-skill pairs 815 of the ranked intent-skill pairs 167.

As noted above, the system 100 may use different ranges of similarity to determine which MRE layout to present. For example, one range of similarity may correspond to an indication of potential ambiguity associated with explicit disambiguation (e.g., the example of FIG. 1C). In another example, a different range of similarity may correspond to an indication of potential ambiguity associated with indirect disambiguation, for example executing one action but still presenting information regarding an alternate NLU interpretation (e.g., the example of FIG. 1B). The scores to compare with regard to such ranges of similarity may be scores determined by an NLU component (e.g., output by NLU 260/360 as part of ranked intent/skill pairs 167) and/or may be scores determined by the ambiguity identifier component 142, which may reflect the impact of other information (e.g., context data 805, user profile data, etc.). The scores determined by the ambiguity identifier component 142 may thus be determined based on information such as data indicating a user prefers disambiguation (which may result in a more likely decision by decision component 840 to trigger a disambiguation along the lines of FIG. 1C), data indicating a user disfavors disambiguation (which may result in less likely decision by decision component 840 to trigger a disambiguation), information that one of the potential hypotheses does not apply to a particular utterance for some reason, for example, calls for data unable to be output by a device 110, calls for data inappropriate for user 105 (e.g., adult content for a child), information that one of the particularly hypotheses is particularly relevant to the user even if it has a lower score (the relevance may be determined using user profile data), etc. Thus, to the extent such information is not already incorporated in the NLU processing that resulted in the ranked intent-skill pairs data 167, it may be (or it may also be) considered by the ambiguity identifier component 142.

The decision component 840 may determine what type of ambiguity exists (e.g., determine what further information is needed from the user in order for a difference between the scores, corresponding to the at least two top-scoring intent-skill pairs 815, to satisfy the threshold difference (e.g., to be sufficiently separated)). For example, the decision component 840 may determine a shared intent ambiguity exists when the at least two top-scoring intent-skill pairs 815 correspond to the same intent but different skill support system components 225. For further example, the decision component 840 may determine a multi-intent and multi-skill system ambiguity exists when the at least two top-scoring intent-skill pairs 815 correspond to different intents and skill support system components 225. In another example, the decision component 840 may determine sensitivity/security confirmation should be provided when the top-scoring intent-skill pair corresponds to a low confidence score (e.g., a confidence score below a threshold confidence score), or sensitive processing to be performed by a skill support system component 225 (e.g., as represented by the intent). Sensitive processing refers to processing performed to execute a sensitive action. Example sensitive actions include outputting bank account information, making a purchase, or other actions that require the use of sensitive user information. In another example, the decision component 840 may determine intent ambiguity exists when NLU processing was unable to determine an intent with at least a threshold confidence. In a further example, the decision component 840 may receive an ASR processing confidence score(s) and determine ambiguity exists when the decision component 840 determines the confidence score(s) fails to satisfy a threshold confidence score (representing ASR has low confidence in the ASR results data).

The decision component 840 may make decisions in view of previous question data 825 received from a previous question storage 850. Even though the evaluation component 830 may indicate further information is needed from the user (as represented by the evaluation component 830 sending the at least two top-scoring intent-skill pairs 815 to the decision component 840), there may be instances when a benefit of querying the user 105 for such further information may be outweighed by a decrease in user experience. The previous question storage 850 may store previous instance of when further information was queried from users, indexed by user identifier. The decision component 840 may query the previous question storage 850 for previous question data 825 associated with the top-scoring user identifier, output by the user recognition component 295, in the previous question storage 850.

The decision component 840 may determine whether a timestamp corresponding to most recent instance when the user was queried, represented in the previous question data 825 is within a past length of time. If the decision component 840 determines the most recent timestamp is within the past length of time, the decision component 840 may determine the user 105 should not be queried for additional information. If, instead, the decision component 840 determines the most recent timestamp is not within the past length of time, the decision component 840 may send to the MRE plan determination component 146 (e.g., via the orchestrator component 112) disambiguation data 137 representing the two of more ranked intent-skill pairs 167 that were determined to be sufficiently ambiguous to warrant interrupting the user 105 with a question to ascertain the user's actual intent). Example configurations of the MRE plan determination component 146, and ways in which the MRE plan determination component 146 may process the disambiguation data 137, are described below in connection with FIG. 9.

In some scenarios, the disambiguation data 137 may additionally or alternatively be sent to a question formulator component (not illustrated) configured to formulate a question for output by a speaker of the device 110, e.g., as audio generated by the TTS component 280.

FIG. 9 shows an example implementation of the MRE plan determination component 146 introduced above. The MRE plan determination component 146 may be responsible for generating the MRE plan 124 that is to be used to enable an MRE interaction with the user. As noted above, the MRE plan 124 may be sent to the MRE shortlister component 140 to enable the MRE shortlister component 140 to determine ranked MRE layout data 145. An example implementation of the MRE shortlister component 140 is described below in connection with FIG. 10.

As shown in FIG. 9, the MRE plan determination component 146 may receive ranked intent-skill pairs 167 from the post-NLU ranker component 166. As also shown, in at least some circumstances, the MRE plan determination component 146 may also receive data 135 representing other skills that could potentially be of interest to the user 5 (e.g., predicted next actions, advertising content, etc.) and/or disambiguation data 137 from the ambiguity identifier component 142 (e.g., if the ambiguity identifier component 142 identified an ambiguity in need of resolution). Further, in some implementations, the MRE plan determination component 146 may additionally receive the MRE priority signal 635 that was generated by the post-NLU ranker component 166.

When the MRE plan determination component 146 receives disambiguation data 137 from the ambiguity identifier component 142, the MRE plan determination component 146 may determine that an explicit visual disambiguation (EVD) experience is to be provided to the user 105, if possible. For an EVD experience, the user 105 may be provided with a group of GUI elements 108 corresponding to the two or more NLU results (and corresponding skills) that the ambiguity identifier component 142 determined were in need of disambiguation, and the user 105 may be prompted to select one of the displayed GUI elements 108. Depending on the number and type of NLU results represented in the disambiguation data 137, and possibly also profile data 925 received from the profile storage 270 and/or context data 935 received from the context storage 820, the MRE plan determination component 146 formulate the MRE plan 124 to identify only two or more secondary skills. As an example, if the ambiguity identifier component 142 determined that the two top ranking NLU results both corresponded to a request to play a song having a particular name, but was unable to determine the artist for the song, the MRE plan determination component 146 may formulate the MRE plan 124 to identify one secondary skill corresponding to playing the song by a first artist and another secondary skill corresponding to playing the song by a second artist.

For the foregoing scenario, when the plan generation component 126 subsequently sends the MRE plan data 128 for the MRE plan 124 to the MRE shortlister component 140 (see the arrow 113*a* in FIG. 1A), the MRE shortlister component 140 may retrieve, e.g., from the layout template storage 1040 (see FIG. 10), one or more available MRE layout templates 1045 for a pair of GUI elements 108 that are sized and/or configured to present on the display 102 of the device 110 images of album covers or other indicia of musical artists. The MRE shortlister component 140 may then associate sources of visual content (e.g., images) with the respective GUI elements 108 identified in the retrieved MRE layout templates 1045 to generate the ranked MRE layout data 145, e.g., layouts L1 through L7 shown in FIG. 1E. That ranked MRE layout data 145 may then be sent to the secondary plan execution component(s) 138 and the MRE composer component 150 for processing, as described further below.

When the MRE plan determination component 146 does not receive disambiguation data 137 from the ambiguity identifier component 142, the MRE plan determination component 146 may determine that a visual exploration (VE) experience of the type shown in FIG. 1B, e.g., in which content for a top-ranked NLU result (for which an corresponding action is automatically performed) may presented as part of a primary GUI element 104, and content for one or more other available skills/actions may be presented as a part of one or more secondary GUI elements 106, is to be provided to the user 105, if possible. In such a scenario, the MRE plan determination component 146 may be responsible for identifying candidate skills for potential presentation to the user as a part of such a VE experience. In some implementations, the MRE plan determination component 146 may take the MRE priority signal 635 into account when determining whether to formulate the MRE plan 124 to present such a VE experience. In the event that the MRE plan determination component 146 decides against presenting a VE experience (due to a value of the MRE priority signal 635 or otherwise), the MRE plan determination component 146 may refrain from identifying any secondary skills in the MRE plan 124. As such, the MRE shortlister component 140 may refrain from attempting to assign secondary skills to any secondary skill windows. Alternatively, the MRE priority signal 635 may instead be provided to the MRE shortlister component 140 and may be taken into account by that component when determining whether to present a layout for an MRE interaction.

As shown in FIG. 9, the MRE plan determination component 146 may have access to profile data 925 stored in the profile storage 270 and/or context data 935 stored in the context storage 820. The context data 935 used by the MRE plan determination component 146 may represent, for example, a type of the device 110, display capabilities of the device 110, a current volume setting of the device 110, the identity of the user 105 (for example as determined by user recognition component 295/395), etc. The MRE plan determination component 146 may also process user the profile data 925 from profile storage 270 which may indicate history or preferences of the user 105 with respect to the EVD experiences and/or MREs in general, as well as user affinities or other data which may indicate information that may be of potential interest to the user, etc.

The MRE plan determination component 146 may evaluate the ranked intent-skill pairs 167 and the other skill data 135 (if any), possibly in light of the profile data 925 and/or the context data 935, to identify one or more secondary skills that are the most likely to be of interest to the user 5. In some implementations, one or more machine learning models may be trained and used for this purpose. The MRE plan determination component 146 may thus take into account preferences of the user 5 and/or contextual information about the user 5, the device 110, etc., when determining which lower-ranked NLU results, predicted next actions, advertising content, etc., should be presented by the device 110 as secondary skills, e.g., by way of secondary GUI elements 106, as shown in FIG. 1B.

As noted previously, the MRE plan determination component 146 may be responsible for identifying candidate skills for possible invocation via secondary GUI elements 106 (e.g., as shown in FIG. 1B), with the primary GUI element 104 being used to present content concerning an action that is taken automatically in response to the audio 107. As shown in FIG. 9, the MRE plan determination component 146 may receive ranked intent-skill pairs 167 from one or more upstream components, e.g., the post-NLU ranker component 166 shown in FIG. 7. As described above, the ranked intent-skill pairs 167 may represent a ranked set of intents and associated skills that the system 100 determined likely correspond to the audio 107 uttered by the user 105. The ranked intent-skill pairs 167 may thus include both (A) a top ranked skill/intent corresponding to an action that the system 100 has determined to take automatically in response to the audio 107, and (B) one or more skills/intents corresponding to lower-ranking NLU results that the system 100 will not take absent further input by the user 105.

Further, in some implementations, the MRE plan determination component 146 may also receive other data 135 representing one or more other skills/actions that the system 100 has determined may of potential interest to the user 105 who uttered the audio 107. As noted previously, the data 135 may, for example, represent (A) one or more skills that do not correspond to lower-ranking NLU result but that have been determined to be of potential interest to the user (for example, based on past interactions, other user profile data, etc.), (B) one or more skills corresponding to predicted next actions of the user, (C) information and/or skill(s) corresponding to available advertising content, etc. Still further, in some implementations, the MRE plan determination component 146 may receive an MRE priority signal 635 (e.g., from the post-NLU ranker component 166) indicating a preference level for invoking an MRE interaction with the user 105. As noted above, the MRE priority signal 635 may, for example, correspond to one of a set of defined levels (e.g., "low," "medium," or "high"). For example, MRE plan determination component 146 (and/or post-NLU ranker component 166) may determine a predicted probability that, based on context data 608/935, profile data, etc. that a user is likely to request a certain next action following the one represented by a previous utterance. If the predicted probability satisfies a condition (e.g., is above a threshold, below a threshold, within a range) and/or the time to receiving the predicted next action is within a certain expected amount of time, the MRE priority signal 635 may be high and/or the MRE plan determination component 146 may determine that information related to the predicted action should be included as part of MRE plan 124.

The MRE plan determination component 146 may employ one or more rules and/or ML models to evaluate the ranked intent-skill pairs 167, the other skill data 135, the MRE priority signal 635, the profile data 925, and the context data 935 to determine whether to invoke an MRE interaction with the user 105, as well as to select one or more of the ranked intent-skill pairs 167 and/or the skills/actions represented by the data 135 and pass those selected ranked intent-skill pairs 167/data 135 to the plan generation component 126 as part of the MRE plan 124.

The MRE plan determination component 146 may also use confidence data and/or probability data to determine the skill candidates to include in the MRE plan 124. For example, the confidence data for certain NLU hypotheses (which may be included in ranked intent-skill pairs data 167) may be used with respect to probability data such as that described above with regard to predicted next actions, potentially interesting other information, etc., to determine and rank the MRE skill candidates and/or to determine (for example, by the MRE shortlister component 140) to determine the ranked MRE layout data 145. The MRE shortlister component 140 (for example by the MRE plan determination component 146 or by some other component) may receive confidence score and/or probability score data and may process such data to create a normalized score to allow different data from different sources (e.g., some from alternate NLU hypotheses, some from predicted actions, some from potentially interesting information/advertising content) to be ranked with respect to each other to determine their relative priority for purposes of ultimately determining ranked MRE layout data 145 which may determine which GUI elements 104/106/108 are given what priority/order of display in what is ultimately presented on the display 102 of the device 110.

Figure 10:
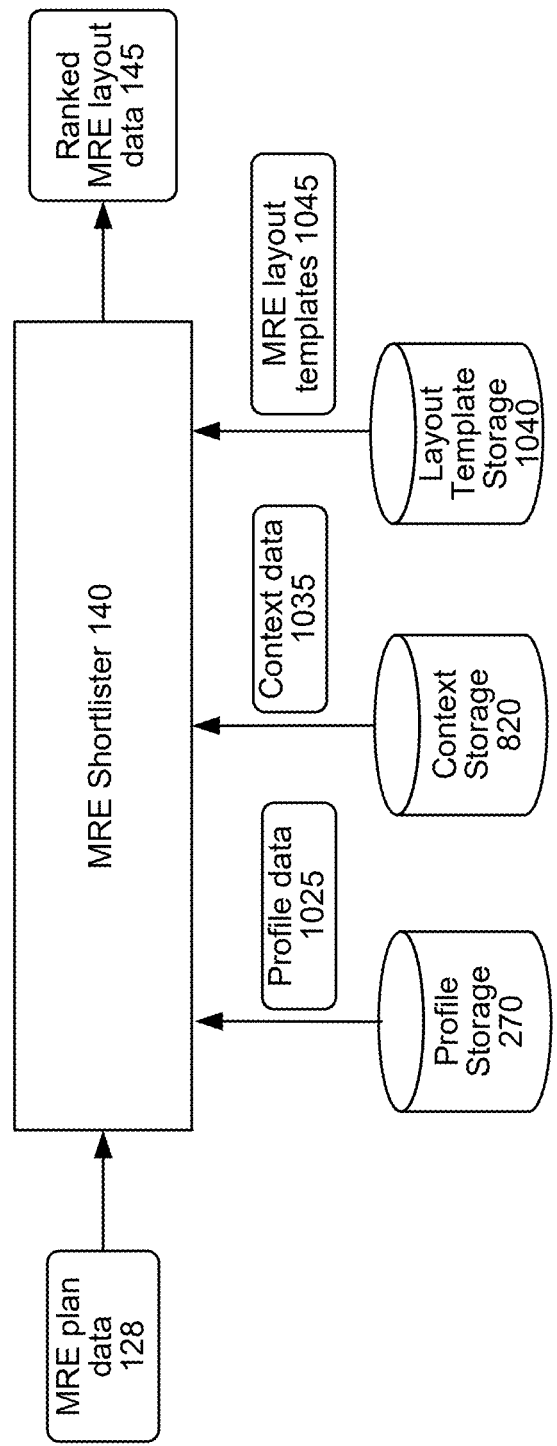
FIG. 10 is a conceptual diagram illustrating how the MRE shortlister component shown in FIGS. 1A-1C, 2 and 3 may operate according to some embodiments of the present disclosure.

As shown in FIG. 10, the MRE shortlister component 140 may have access to MRE layout templates 1045 stored in a layout template storage 1040, and possibly also profile data 1025 stored in the profile storage 270 and/or context data 1035 stored in the context storage 820. Similar to the context data 935 used by the MRE plan determination component 146, the context data 1035 used by the MRE shortlister component 140 may represent, for example, a type of the device 110, display capabilities of the device 110, a current volume setting of the device 110, the identity of the user 105 (for example as determined by user recognition component 295/395), etc. The MRE shortlister component 140 may also process user profile information from profile storage 270 which may indicate history or preferences of the user 105 with respect to the EVD experiences and/or MREs in general, as well as user affinities or other data which may indicate information that may be of potential interest to the user, etc.

Depending on the number and type of MRE skill candidates that are identified in the MRE plan data 128 the MRE shortlister component 140 receives from the plan generation component 126, and possibly also the profile data 1025 and/or the context data 1035, the MRE shortlister component 140 may retrieve suitable MRE layout templates 1045 from the layout template storage 1040. As an example, if the top ranked NLU result represented in the ranked intent-skill pairs 167 is to view video from a particular Ring camera, a second-ranked NLU result represented in the ranked intent-skill pairs 167 is to purchase a Ring camera, and predicted next action determined by the system is to call the police, the MRE layout selector 1120 may retrieve one or more available MRE layout templates 1045 that can accommodate a primary GUI element 104 that is sized and/or configured to present on the display 102 of the device 110 a window showing streamed video from a camera, as well as to present one secondary GUI element 106a that is sized and/or configured to present an image of an item available for sale and another, secondary GUI element 106b that is sized and/or configured to present an image or icon corresponding to a request to place a call to the local police department. The MRE shortlister component 140 may then associate sources of visual content (e.g., images) with the respective GUI elements 108 identified in the retrieved MRE layout templates 1045 to generate ranked MRE layout data 145, e.g., layouts L1 through L7 shown in FIG. 1E. That ranked MRE layout data 145 may then be sent to the secondary plan execution component(s) 138 and the MRE composer component 150 for processing, as described further below.

Figure 11:
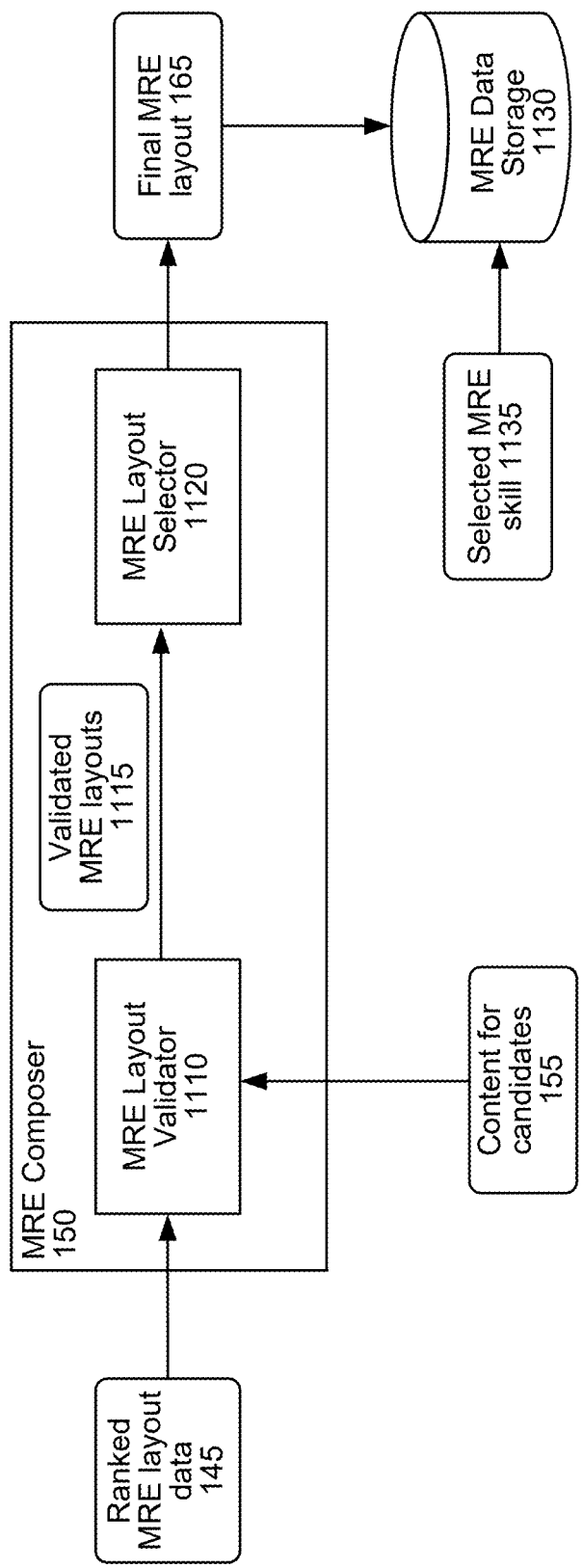
FIG. 11 is a conceptual diagram illustrating how the MRE composer component shown in FIGS. 1A-1C, 2 and 3 may operate according to some embodiments of the present disclosure.

As shown in FIG. 11, the MRE composer component 150 may include an MRE layout validator component 1110 and a MRE layout selector component 1120. Upon receiving the ranked MRE layout data 145 from the MRE shortlister component 140, the MRE layout validator component 1110 may await receipt of content 155 (e.g., the primary skill content 155*a* and the secondary skill content 155*b* shown in FIG. 1A) from the content sources identified in the ranked MRE layout data 145. As illustrated, the MRE layout validator component 1110 may receive content 155 for at least some of the skill/action candidates. The content 155 may include visual content that can be used to populate and/or enhance GUI elements 104, 106, 108 such as those described above in connection with FIGS. 1B and 1C. Examples of such visual content include music album covers, images or icons corresponding to games, images of products available for purchase, images or icons corresponding to informational skills, e.g., a weather forecast skill, images or icons corresponding to tasks that can be taken, e.g., calling the local police or a person in a contact list, setting a timer, etc.

The MRE layout validator component 1110 may determine whether suitable content 155 has been received for the GUI elements 104, 106, 108 included in the respective ranked MRE layout data 145. For each MRE layout represented in the ranked MRE layout data 145 for which the MRE layout validator component 1110 is able to retrieve suitable content 155, e.g., images or icons, for all of the GUI elements 104, 106, 108 in that layout, the MRE layout validator component 1110 may pass the fully populated layout to the MRE layout selector component 1120, e.g., as one of the validated MRE layout templates 1115 shown in FIG. 11. The validated MRE layout templates 1115 may thus correspond to a subset of the ranked MRE layout data 145 for which the GUI elements 104, 106, 108 have been fully populated with content 155. The MRE layout selector component 1120 may then select one of the validated MRE layout templates 1115, e.g., the validated MRE layout template 1115 having the highest ranking, and cause the device 110 to present that layout on its display 102, e.g., as shown in FIGS. 1B and 1C.

As additionally shown in FIG. 11, in some implementations, the final MRE layout data 165 may also be stored in a storage medium, e.g., an MRE data storage 1130. Further, as also illustrated, when one of the GUI elements 106, 108 is selected by a user 105, data indicating the selected GUI element 106, 108 may additionally be stored in the MRE data storage 1130. Such data may be used, for example, to improve one or more upstream components, such as by retraining one or more ML models used for NLU processing (e.g., one or ML models used by the language processing component(s) 192 and/or the post-NLU ranker component 166 described above), one or more ML models used by the MRE plan determination component 146, etc. In some implementations, the MRE data storage 1130 may store (A) an identifier (ID) of the MRE output that was presented to the user 105, a list of the skills that were made available to the user 105 as GUI elements 106, 108, as well as the skill corresponding to the primary GUI element 104, if any, that was presented to the user 105, and (C) the identify of any GUI element 106, 108 that was actually selected by the user 105 after it was displayed (represented by selected MRE skill data 1135). Such collected data may be used, for example, as supervision to train a routing value function that estimates the value of actions (e.g., MRE candidate invocations) given a particular context. In this manner various components may be retrained/reconfigured.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 12:
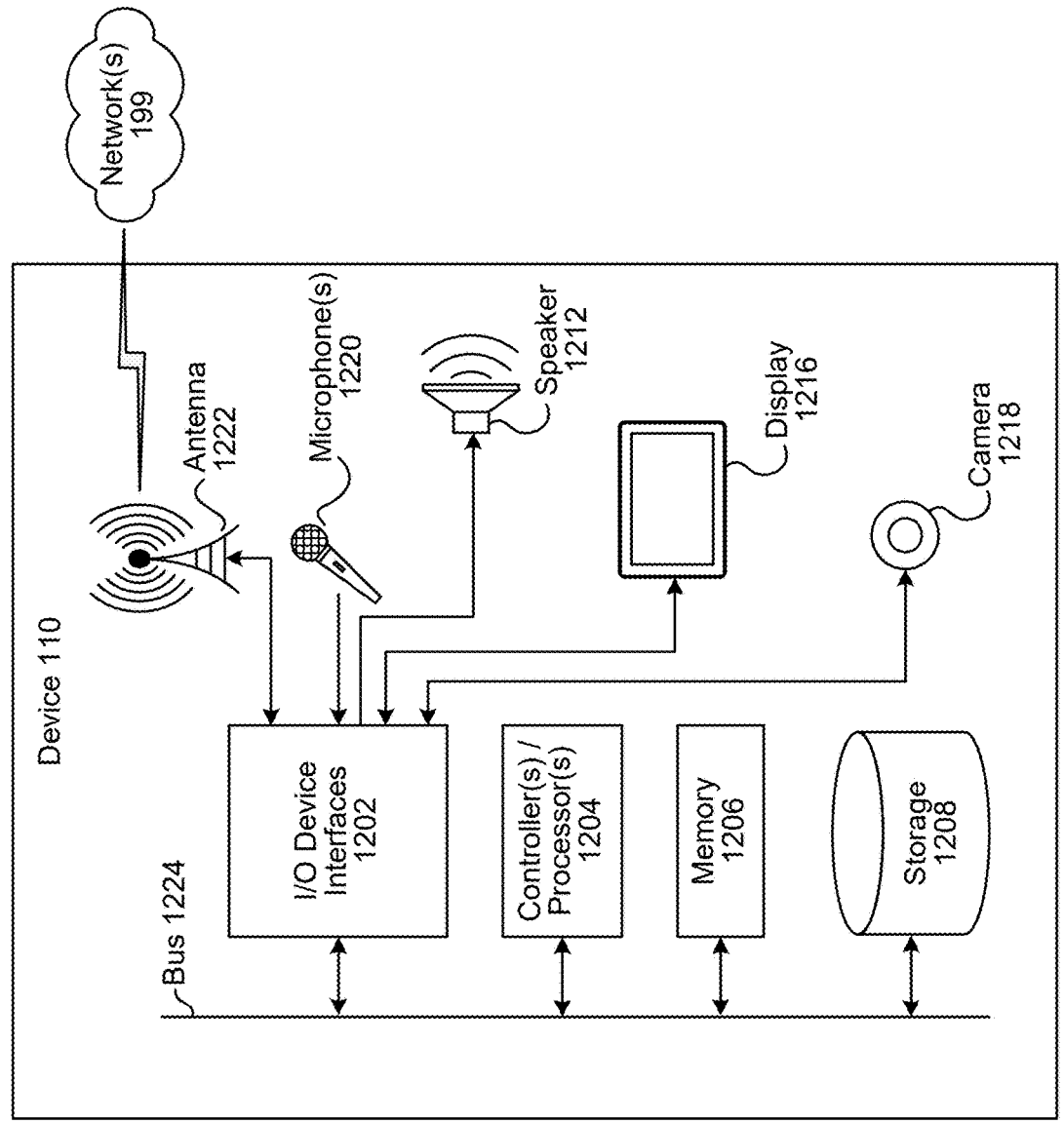
FIG. 12 is a block diagram conceptually illustrating example components of a device, according to some embodiments of the present disclosure.
Figure 13:
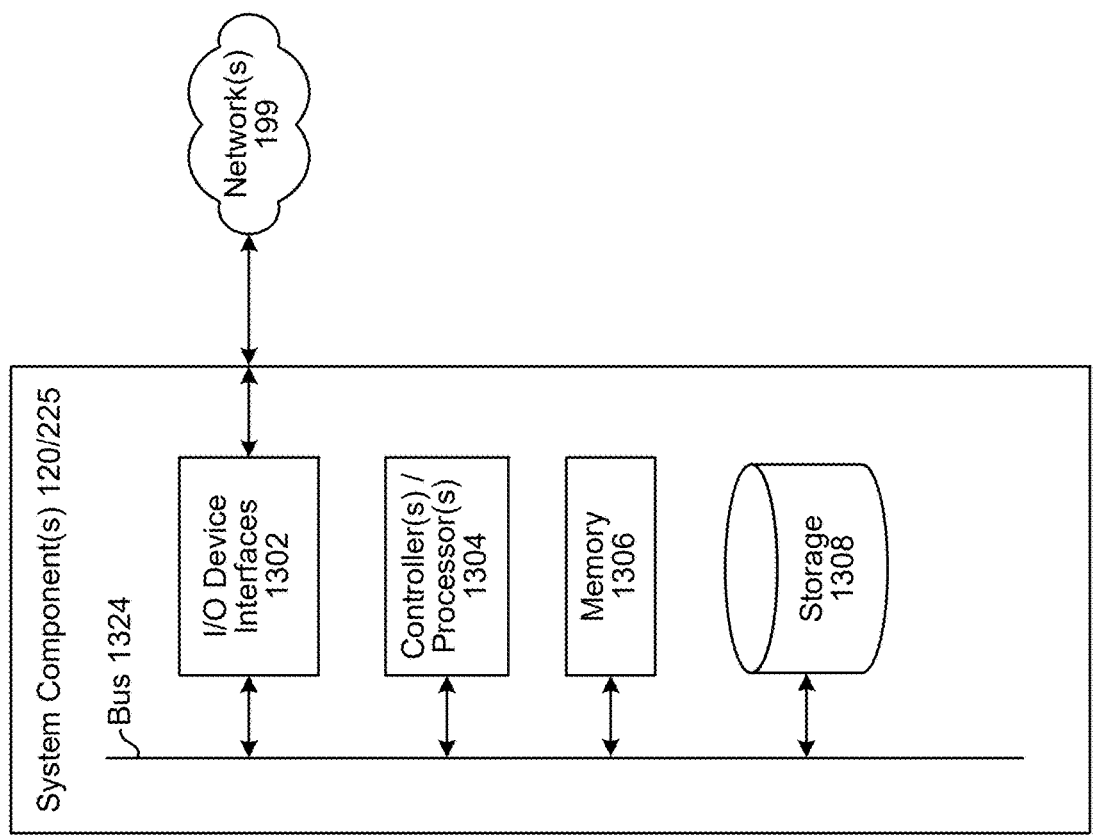
FIG. 13 is a block diagram conceptually illustrating example components of a system, according to some embodiments of the present disclosure.

FIG. 12 is a block diagram conceptually illustrating a device 110 that may be used with the system. FIG. 13 is a block diagram conceptually illustrating example components of a remote device, such as the virtual assistant/natural language command processing system component(s) 120, which may assist with ASR processing, NLU processing, etc., and one or more skill support system components 225. A system component (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) 120 may be located remotely from the device 110 as its operations may not require proximity to the user. The server/system component(s) 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) 120 being in a user's home/business is that data used to process a command/return a response may be kept within the user's home, thus reducing potential privacy concerns.

Multiple system component(s) (120/225) may be included in the overall system 100 of the present disclosure, such as one or more natural language processing system component(s) 120 for performing ASR processing, one or more natural language processing system component(s) 120 for performing NLU processing, one or more skill support system components 225, etc. In operation, each of these systems may include computer-readable and computer-executable instructions that reside on the respective device (120/225), as will be discussed further below.

Each of these devices (110/120/225) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/225) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1202/1302).

Computer instructions for operating each device (110/120/225) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/225) includes input/output device interfaces (1202/1302). A variety of components may be connected through the input/output device interfaces (1202/1302), as will be discussed further below. Additionally, each device (110/120/225) may include an address/data bus (1224/1324) for conveying data among components of the respective device. Each component within a device (110/120/225) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1222, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) 110, the natural language command processing system component(s) 120, or one or more skill support system components 225 may include their own dedicated processors, memory, and/or storage. Alternatively, one or more of the components of the device(s) 110, the natural language command processing system component(s) 120, or one more skill support system components 225 may utilize the I/O interfaces (1202/1302), processor(s) (1204/1304), memory (1206/1306), and/or storage (1208/1308) of the device(s) 110, natural language command processing system 120, or the skill support system component(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and one or more skill support system components 225, as described herein, are illustrative, and may be located as a stand-alone device or may be included, in whole or in part, as a component of a larger device or system. As can be appreciated, a number of components may exist either on a system 120 and/or on device 110. For example, language processing component(s) 192/392 (which may include ASR 250/350), language output 293/393 (which may include NLG 279/379 and TTS 280/380), etc., for example as illustrated in FIGS. 2 and 3. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 14, multiple devices (110a-110n, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the natural language command processing system 120, the skill support system component(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    receiving first input audio data corresponding to a first utterance detected by a device;
    performing speech processing using the first input audio data to determine at least a first natural language understanding (NLU) hypothesis and a second NLU hypothesis for the first utterance;
    determining that the first NLU hypothesis corresponds to a first intent;
    determining that the second NLU hypothesis corresponds to a second intent;
    determining, that the first NLU hypothesis more likely represents what the first utterance meant than the second NLU hypothesis;
    using a first component to obtain, from a first skill component associated with the first intent, first visual content and results data responsive to the first utterance;
    causing the device to present the first visual content;
    performing speech synthesis using the results data to generate output audio data responsive to the first utterance;
    causing the device to present output audio corresponding to the output audio data;
    in response to the first input audio data, using a second component to obtain, from a second skill component, second visual content;
    causing the device to present the second visual content while presenting the first visual content;
    receiving, from the device, input data corresponding to a second input;
    determining that the second input corresponds to the second visual content;

obtaining output content corresponding to the second skill component and responsive to the second input; and causing the device to present the output content.

2. The computer-implemented method of claim 1, further comprising:

determining a user profile corresponding to the device;

determining, based at least in part on the user profile and the first input audio data, a probability that an action is likely to be requested following the first utterance;

based at least in part on the probability, using a third component to obtain, from a third skill component, third visual content associated with the action; and causing the device to present, together with the first visual content and the second visual content, a display element that represents the third visual content and is selectable to cause execution of the action.

3. The computer-implemented method of claim 1, further comprising:

receiving first data identifying the first skill component as corresponding to a primary skill and the second skill component as corresponding to a secondary skill;

in response to receipt of the first data, using the first component to begin interacting with the first skill component to obtain the first visual content; and after the first component has begun interacting with the first skill component, begin using the second component to obtain the second visual content.

4. The computer-implemented method of claim 1, further comprising:

sending, from the first component to a third component, the first visual content;

sending, from the second component to the third component, the second visual content;

determining, by the third component, layout data corresponding to the first visual content and the second visual content; and sending, to the device, the layout data.

5. A computer-implemented method, comprising:

receiving, from a device, first input data corresponding to a first natural language input;

processing the first input data to determine at least a first natural language understanding (NLU) hypothesis for the first natural language input;

receiving, by a first component, first data identifying a first application associated with the first NLU hypothesis;

receiving, by the first component and based at least in part on the first data, second data corresponding to first visual content and third data corresponding to first audio content, the first visual content and first audio content corresponding to the first application;

receiving, by a second component, fourth data identifying a second application;

receiving, by the second component and based at least in part on the fourth data, fifth data corresponding to second visual content corresponding to the second application;

causing the device to output the first visual content, the first audio content, and the second visual content;

receiving, from the device, second input data corresponding to a second input;

determining that the second input corresponds to the second visual content; and causing the device to output content corresponding to the second application in response to the second input.

6. The computer-implemented method of claim 5, further comprising:

sending, from the first component to a third component, the second data;

sending, from the second component to the third component, the fifth data;

determining, by the third component, layout data corresponding to the first visual content and the second visual content; and sending, to the device, the layout data.

7. The computer-implemented method of claim 5, further comprising:

receiving sixth data identifying both the first application and the second application;

in response to receipt of the sixth data, using the first component to begin interacting with the first application to obtain the second data; and after the first component has begun interacting with the first application, beginning using the second component to obtain the fifth data.

8. The computer-implemented method of claim 7, further comprising:

based on the sixth data, determining seventh data representing a layout for presenting the first visual content and the second visual content on a screen of the device;

wherein the second component begins a process to obtain the second visual content after the seventh data has been determined.

9. The computer-implemented method of claim 5, further comprising:

processing the first input data to determine a second NLU hypothesis for the first natural language input; and determining that the second NLU hypothesis corresponds to the second application.

10. The computer-implemented method of claim 5, wherein:

establishing a first connection between the first component and the first application;

receiving, by the first component, the second data from the first application via the first connection;

establishing a second connection, different from the first connection, between the second component and the second application; and receiving, by the second component, the fifth data from the second application via the second connection.

11. The computer-implemented method of claim 5, further comprising:

determining a user profile corresponding to the device;

determining, based at least in part on the user profile and the first input data, a predicted action likely to be requested following the first natural language input;

receiving, by a third component, third data identifying a third application associated with the predicted action;

receiving, by the third component and based at least in part on the third data, third visual content corresponding to the third application; and causing the device to present, together with the first visual content and the second visual content, third visual content that is associated with a selectable interface element to cause execution of the predicted action.

12. The computer-implemented method of claim 5, wherein:

the second component is used to obtain the fifth data during at least a portion of a period during which the first component is being used to obtain the second data.

13. A system, comprising:
at least one processor; and
at least one non-transitory computer-readable medium encoded with instructions which, when executed by the at least one processor, cause the system to:
  receive, from a device, first input data corresponding to a first natural language input;
  process the first input data to determine at least a first natural language understanding (NLU) hypothesis for the first natural language input;
  receive, by a first component, first data identifying a first application associated with the first NLU hypothesis;
  receive, by the first component and based at least in part on the first data, second data corresponding to first visual content and third data corresponding to first audio content, the first visual content and first audio content corresponding to the first application;
  receive, by a second component, fourth data identifying a second application;
  receive, by the second component and based at least in part on the fourth data, fifth data corresponding to second visual content corresponding to the second application;
  cause the device to output the first visual content, the first audio content, and the second visual content;
  receive, from the device, second input data corresponding to a second input;
  determine that the second input corresponds to the second visual content; and
  cause the device to output content corresponding to the second application in response to the second input.

14. The system of claim 13, wherein the at least one non-transitory computer-readable medium is further encoded with additional instructions which, when executed by the at least one processor, further cause the system to:
  send, from the first component to a third component, the second data;
  send, from the second component to the third component, the fifth data;
  determine, by the third component, layout data corresponding to the first visual content and the second visual content; and
  send, to the device, the layout data.

15. The system of claim 13, wherein the at least one non-transitory computer-readable medium is further encoded with additional instructions which, when executed by the at least one processor, further cause the system to:
  receive sixth data identifying both the first application and the second application;
  in response to receipt of the sixth data, use the first component to begin interacting with the first application to obtain the second data; and
  after the first component has begun interacting with the first application, begin using the second component to obtain the fifth data.

16. The system of claim 15, wherein the at least one non-transitory computer-readable medium is further encoded with additional instructions which, when executed by the at least one processor, further cause the system to:
  based on the sixth data, determine seventh data representing a layout for presenting the first visual content and the second visual content on a screen of the device;
  wherein the second component begins a process to obtain the second visual content after the seventh data has been determined.

17. The system of claim 13, wherein the at least one non-transitory computer-readable medium is further encoded with additional instructions which, when executed by the at least one processor, further cause the system to:
  process the first input data to determine a second NLU hypothesis for the first natural language input; and
  determine that the second NLU hypothesis corresponds to the second application.

18. The system of claim 13, wherein the at least one non-transitory computer-readable medium is further encoded with additional instructions which, when executed by the at least one processor, further cause the system to:
  establish a first connection between the first component and the first application;
  receive, by the first component, the second data from the first application via the first connection;
  establish a second connection, different from the first connection, between the second component and the second application; and
  receive, by the second component, the fifth data from the second application via the second connection.

19. The system of claim 13, wherein the at least one non-transitory computer-readable medium is further encoded with additional instructions which, when executed by the at least one processor, further cause the system to:
  determine a user profile corresponding to the device;
  determine, based at least in part on the user profile and the first input data, a predicted action likely to be requested following the first natural language input;
  receive, by a third component, third data identifying a third application associated with the predicted action;
  receive, by the third component and based at least in part on the third data, third visual content corresponding to the third application; and
  cause the device to present, together with the first visual content and the second visual content, third visual content that is associated with a selectable interface element to cause execution of the predicted action.

20. The system of claim 13, wherein the at least one non-transitory computer-readable medium is further encoded with additional instructions which, when executed by the at least one processor, further cause the system to:
  use the second component to obtain the fifth data during at least a portion of a period during which the first component is being used to obtain the second data.

* * * * *